US012775682B1

(12) United States Patent
Amine

(10) Patent No.: US 12,775,682 B1
(45) Date of Patent: Oct. 27, 2026

(54) LICENSE-TIERED RUNTIME PROTECTION FOR THREE-DIMENSIONAL GAMING ASSETS

(71) Applicant: Battery Controls LLC, Austin, TX (US)

(72) Inventor: Gilbert A. Amine, Austin, TX (US)

( * ) Notice: Subject to any disclaimer, the term of this patent is extended or adjusted under 35 U.S.C. 154(b) by 0 days.

(21) Appl. No.: 19/363,494

(22) Filed: Oct. 20, 2025

Related U.S. Application Data

(60) Provisional application No. 63/892,040, filed on Oct. 2, 2025, provisional application No. 63/882,886, filed on Sep. 16, 2025.

(51) Int. Cl.
*G06Q 20/40* (2012.01)
*G06F 21/10* (2013.01)

(52) U.S. Cl.
CPC .......... *G06F 21/105* (2013.01); *G06F 21/106* (2023.08)

(58) Field of Classification Search
CPC ................ G06F 21/105; G06F 21/106; G06Q 20/00–425
See application file for complete search history.

(56) References Cited

U.S. PATENT DOCUMENTS 6,334,189 B1 12/2001 Granger et al.
6,792,113 B1 9/2004 Ansell et al.
7,103,574 B1 * 9/2006 Peinado .................. G06F 21/84 705/57
10,114,933 B2 10/2018 Gabler et al.
10,438,311 B2 10/2019 Lee et al.
(Continued)

FOREIGN PATENT DOCUMENTS

WO 2025038396 A1 2/2025

OTHER PUBLICATIONS

Coalition for Content Provenance and Authenticity, "C2PA Technical Specification v2.2", 2025.
(Continued)

*Primary Examiner* — Patrick Mcatee
*Assistant Examiner* — Christina C Stevenson

(57) ABSTRACT

Systems and methods for integrated, license-tiered digital rights management (DRM) of three-dimensional (3D) assets. A packaging module generates multiple fidelity tiers linked by a cryptographic tier-map manifest, while a license service issues entitlements specifying permitted tiers, validity periods, and revocation epochs. Runtime adapters integrated into engines such as Unity, Unreal, and WebGL validate entitlements and enforce deterministic fidelity transitions at frame boundaries, operating independently of performance-based level-of-detail (LOD) systems. An integrated adversarial-protection and fingerprinting subsystem applies imperceptible perturbations and error-corrected identifiers that resist machine-learning model extraction and persist through compression or transformation. A monitoring module provides anomaly detection, adaptive protection updates, and telemetry for royalty tracking. Optional Coalition for Content Provenance and Authenticity (C2PA) integration links entitlements and manifests to verifiable provenance records. The system supports single-user and multi-user gaming applications and persistent virtual world environments with context-aware fidelity controls.

25 Claims, 19 Drawing Sheets

(56) References Cited

U.S. PATENT DOCUMENTS

Figure 1:
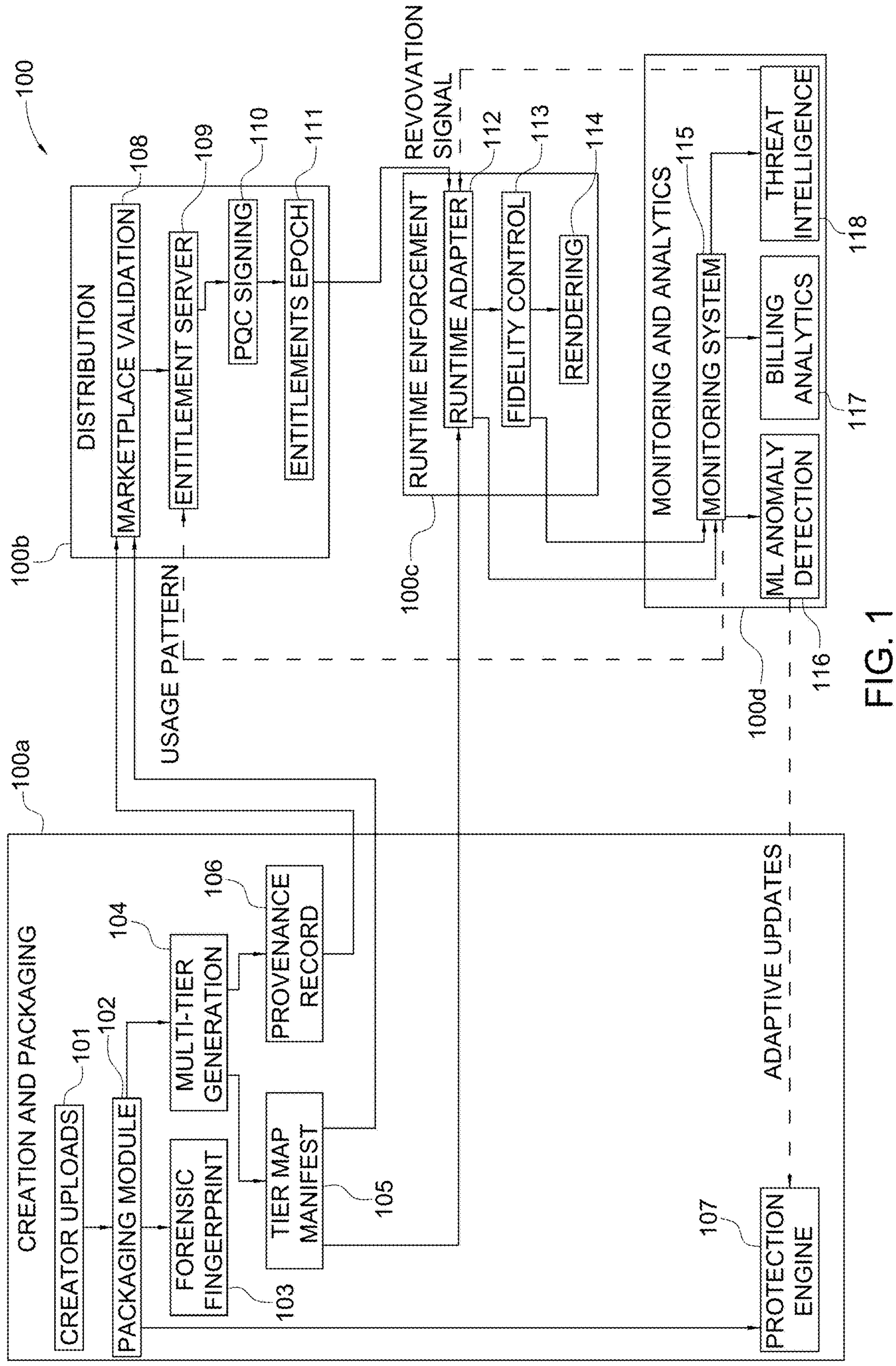

| | | | | |
|---|---|---|---|---|
| 10,542,034 | B1 | 1/2020 | Shintre et al. | |
| 10,628,561 | B2 | 4/2020 | Gabler et al. | |
| 10,715,851 | B1 | 7/2020 | Shankar et al. | |
| 10,769,745 | B2 | 9/2020 | Lee et al. | |
| 12,174,923 | B1 | 12/2024 | Jiang et al. | |
| 12,231,577 | B2 | 2/2025 | Hanna et al. | |
| 12,389,087 | B1 | 8/2025 | Bogacz et al. | |
| 12,413,828 | B1 | 9/2025 | Yoo et al. | |
| 2009/0199296 | A1* | 8/2009 | Xie | G06F 21/316 726/23 |
| 2013/0305380 | A1* | 11/2013 | Diehl | G06T 1/0021 726/26 |
| 2018/0060544 | A1* | 3/2018 | Koo | G06F 21/602 |
| 2025/0191310 | A1 | 6/2025 | Park et al. | |

OTHER PUBLICATIONS

Khronos Group / glTF Working Group, “glTF 2.0 Specification”, 2017.

X. Liu et al., IEEE CVPR Proc., “Adversarial Robustness for 3D Meshes”, 2022.

A. Kutter et al., ACM T-MM, “3D Model Watermarking and Fingerprinting Techniques for Game Asset Protection”, 2021.

Y. Xiang et al., CVPR, “3D Adversarial Point Clouds”, 2019.

M. Narendra et al., Scientific Reports, “Levenberg—Marquardt deep neural watermarking for 3D mesh using nearest centroid salient point learning”, 2024.

H. Shah et al., ICVS, “Data-Free Model Extraction Attacks in the Context of Object Detection”, 2023.

D. Liu et al., ECCV, “Adversarial Shape Perturbations on 3D Point Clouds”, 2020.

D. Shapiro et al., International Symposium on Digital Forensics and Security, “Protection of 3D Models by QIM Watermarking with Reduced Distortion”, 2025.

M. Hamidi et al., ATSIP, “A robust blind 3-D mesh watermarking based on wavelet transform for copyright protection”, 2017.

Petrangeli, S., et al., “Integrating Content Authenticity with DASH Video Streaming,” Proceedings of the 15th ACM Multimedia Systems Conference (MMSys ’24), ACM, 2024.

Coalition for Content Provenance and Authenticity, C2PA Security Considerations, Version 1.0, Dec. 22, 2021, available at https://c2pa.org/specifications/specifications/1.0/security/Security_Considerations.html.

* cited by examiner

LICENSE-TIERED RUNTIME PROTECTION FOR THREE-DIMENSIONAL GAMING ASSETS

1. CROSS-REFERENCE TO RELATED APPLICATIONS

This application claims priority under 35 U.S.C. § 119(e) and is a Continuation-in-Part (CIP) of:

U.S. Provisional Patent Application No. 63/882,886, filed on Sep. 16, 2025, titled "Digital Rights Management of Three-Dimensional Assets with Progressive Fidelity, Engagement Proofs, and Physical-Digital Authentication."

U.S. Provisional Patent Application No. 63/892,040, filed on Oct. 2, 2025, titled "Digital Rights Management System for Three-Dimensional Assets with Adaptive Adversarial Protection."

The entire contents of each of the foregoing provisional applications are incorporated herein by reference in their entirety.

2. STATEMENT REGARDING FEDERALLY SPONSORED RESEARCH OR DEVELOPMENT

No federal government funding, sponsorship, or support was received in connection with the research or development of the subject matter described in this application.

3. FIELD OF THE INVENTION

The present invention relates to digital rights management (DRM) systems for three-dimensional (3D) assets, and more particularly, to runtime enforcement of license-based fidelity tiers in gaming, virtual world, and rendering environments through cryptographic validation independent of performance-based level-of-detail systems, and to integrated mechanisms for adaptive adversarial protection and forensic fingerprinting that operate within the same runtime DRM framework to prevent unauthorized model extraction and ensure persistent license compliance.

4. BACKGROUND OF THE INVENTION

4.1 Limitations of Existing 3D DRM Systems

Conventional DRM technologies secure executable binaries or media files but fail to address runtime control of interactive three-dimensional (3D) assets. Game engines such as Unity and Unreal typically rely on file-level encryption or obfuscation that ceases to apply once assets are loaded into memory. After decryption, high-fidelity models can be copied or captured without restriction, undermining licensing integrity and royalty protection.

Unlike static media such as movies or audio files, 3D content is decompressed, tessellated, and streamed dynamically into Graphics Processing Unit (GPU) buffers, making file-based encryption ineffective once geometry is resident in memory. Existing DRM software-development kits (SDKs) enforce only binary activation checks and lack mechanisms to govern individual asset fidelity. Consequently, licensing granularity stops at the executable or package level rather than the component-asset level where most creative value resides.

The present invention operates post-decryption at the rendering-pipeline level, distinguishing it from file-encryption DRM systems (e.g., Denuvo, PlayReady) that protect only until memory loading. Rather than embedding static identifiers like traditional watermarking solutions, the disclosed system combines dynamic tier-based access control with adaptive adversarial protection and session-specific forensic markers that persist through runtime enforcement.

4.2 Problems in Cross-Runtime Enforcement

Each rendering runtime applies its own performance-driven level-of-detail (LOD) rules that adjust fidelity based on viewpoint or frame rate. These heuristic LOD methods are inconsistent and cannot be governed by license terms. Because each engine interprets scene complexity, shader features, and asset compression differently, fidelity outcomes vary even under identical hardware conditions. There is no standard mechanism for expressing a canonical "license map" that can be interpreted consistently by multiple runtimes. This inconsistency leads to nondeterministic rendering quality and makes it impossible for a licensor to enforce contractually defined asset tiers. A content owner therefore lacks a deterministic way to enforce license-tiered visual quality across multiple engines or devices.

Performance-based LOD systems automatically adjust model complexity based on camera distance, frame-rate targets, and hardware capabilities. These LOD decisions occur independently of any licensing considerations, allowing unauthorized users to access high-fidelity assets merely by adjusting camera position or graphics settings. The present invention addresses this by implementing license-based fidelity control that operates independently of and overrides performance-based LOD systems.

4.3 Lack of Coordinated License State Across Distributed Systems

Existing DRM architectures perform entitlement validation locally on individual devices or within a single runtime instance but do not maintain synchronized license states across distributed or multi-user environments. When an entitlement expires or is revoked, remote clients may continue rendering previously authorized high-fidelity assets until a manual refresh occurs, resulting in inconsistent enforcement and potential revenue leakage. Cloud-rendering platforms, content-delivery networks, and multiplayer games further amplify this inconsistency because DRM enforcement is decoupled from the central license authority. The present invention introduces a coordinated entitlement-distribution and revocation framework that propagates updated license epochs in real time across all participating runtimes, ensuring deterministic, simultaneous fidelity control throughout a distributed ecosystem.

4.4 Vulnerabilities to Artificial Intelligence (AI) and Data Extraction

Recent advances in machine learning allow high-fidelity assets to be used for training unauthorized models. Existing DRM mechanisms do not include protections against AI-based reconstruction or style transfer. In practice, stolen or scraped 3D models are now used to train generative adversarial networks, diffusion pipelines, or neural-radiance-field (NeRF) systems that replicate commercial art styles or product geometries. Because traditional DRM terminates at runtime, it cannot detect whether a protected asset is being rendered or used as input to a machine-learning pipeline. Known watermarking schemes also fail against mesh retopology, UV remapping, and texture-space sanitization performed by automated preprocessing tools. These weaknesses enable persistent data leakage and irreversible dilution of digital-asset value across AI-generated derivatives. A new approach is needed to combine license enforcement with adaptive adversarial defense and forensic traceability.

4.5 Absence of Runtime Provenance and Auditability

Existing provenance frameworks—such as the Coalition for Content Provenance and Authenticity (C2PA)—primarily verify authenticity at the time of publication or file download, but they do not extend into the runtime environment. Once a 3D asset is loaded into memory, conventional systems lose linkage between its provenance record and the live-rendered instance, whereas the present invention maintains that linkage through canonical manifest hashes validated at runtime. There is no mechanism in prior art to verify that the displayed asset corresponds to a valid license state or to log authenticated playback events for royalty reconciliation.

Consequently, creators and marketplaces lack an auditable chain of custody from authoring through real-time rendering, leaving significant gaps in compliance verification and revenue tracking.

4.6 Limitations of Current Marketplace Licensing Mechanisms

Digital-asset marketplaces rely mainly on terms-of-service enforcement and coarse license keys that grant perpetual or seat-based access. These systems cannot differentiate between preview, standard, or premium asset tiers at runtime, nor can they prevent redistribution of decrypted files. There is also no standardized application-programming interface (API) for third-party engines to verify marketplace-issued entitlements during rendering. As a result, license compliance depends on user behavior rather than automated enforcement, leading to widespread asset leakage and under-reported usage.

4.7 Emerging Cryptographic Risks

Conventional RSA and elliptic-curve signatures used in DRM systems are expected to become vulnerable to quantum-computing attacks within the foreseeable future. This risk affects not only license tokens but also long-lived provenance records that must remain verifiable for years.

Current DRM infrastructures do not provide a transition path to post-quantum cryptographic primitives such as lattice- or hash-based signatures. Without such measures, assets protected today could be retroactively compromised by quantum-enabled adversaries, jeopardizing future license integrity and proof of authorship.

The disclosed system provides a forward-compatible option for integrating post-quantum cryptographic primitives, ensuring long-term verifiability without mandating their use in all deployments.

4.8 Limitations of Detection-Only Approaches

Recent systems focus on detecting 3D model clones or unauthorized copies after extraction has already occurred. While detection can identify theft retrospectively, it cannot prevent the initial extraction, unauthorized training of AI models, or distribution of stolen assets. By the time detection occurs, the economic damage is done—the assets have been compromised, potentially used to train competing AI systems, and may have been widely distributed. A preventive approach that enforces licensing during runtime, rather than detecting violations after the fact, is needed to protect the economic value of 3D assets.

4.9 Summary of Preferred Solution

The present invention addresses the foregoing limitations through a unified license-tiered DRM architecture that operates post-decryption within the rendering pipeline. In preferred embodiments, the system includes a packaging module that generates multi-fidelity asset tiers and a canonical tier-map manifest, a license-and-entitlement service issuing cryptographically secured tokens, and a runtime adapter enforcing deterministic fidelity control at frame boundaries. Optional modules—such as forensic fingerprinting, adversarial protection against machine-learning extraction, and provenance verification—extend enforcement beyond static file protection to live-rendered 3D content. This integrated approach provides continuous, cross-platform license control and adaptive resilience against emerging cryptographic and AI-based threats.

4.10 Unified Technical Solution

The runtime DRM system disclosed herein addresses multiple but related deficiencies of prior art—namely, the lack of license enforcement after asset decryption and the absence of protective mechanisms against automated model extraction. Both vulnerabilities stem from the same structural gap: once a 3D asset is decrypted and rendered in memory, existing DRM systems relinquish control of how that data is used. The invention resolves this by integrating adaptive adversarial protection, forensic fingerprinting, and provenance verification into the same runtime license-enforcement loop. These components share the same data structures, entitlement logic, and monitoring telemetry, ensuring that all protective functions operate as coordinated subsystems within a single DRM architecture rather than as independent inventions.

5. SUMMARY OF THE INVENTION

The invention provides a license-tiered digital rights management system specifically designed for three-dimensional (3D) assets used within interactive rendering environments and marketplaces. Unlike conventional DRM frameworks that terminate protection at the file or executable level, the disclosed system enforces license conditions dynamically at runtime, after an asset has been decrypted and loaded into memory. Unlike current systems described in § 4, which terminate protection at the file or executable level (such as Denuvo) or rely on passive watermarking (such as KAIST patents), the present invention maintains active license enforcement throughout the entire runtime rendering pipeline.

6. BRIEF DESCRIPTION OF THE DRAWINGS

The accompanying drawings, which form a part of the present disclosure, illustrate exemplary embodiments of the invention. These drawings, together with the description, serve to explain the principles of the invention without limiting its scope. All figures are schematic representations and are not drawn to scale.

FIG. 1—System Architecture Overview

Block diagram illustrating the end-to-end DRM architecture including the packaging module, license-and-entitlement service, runtime adapter, fidelity-control engine, monitoring system, and adversarial-protection engine.

Figure 2:
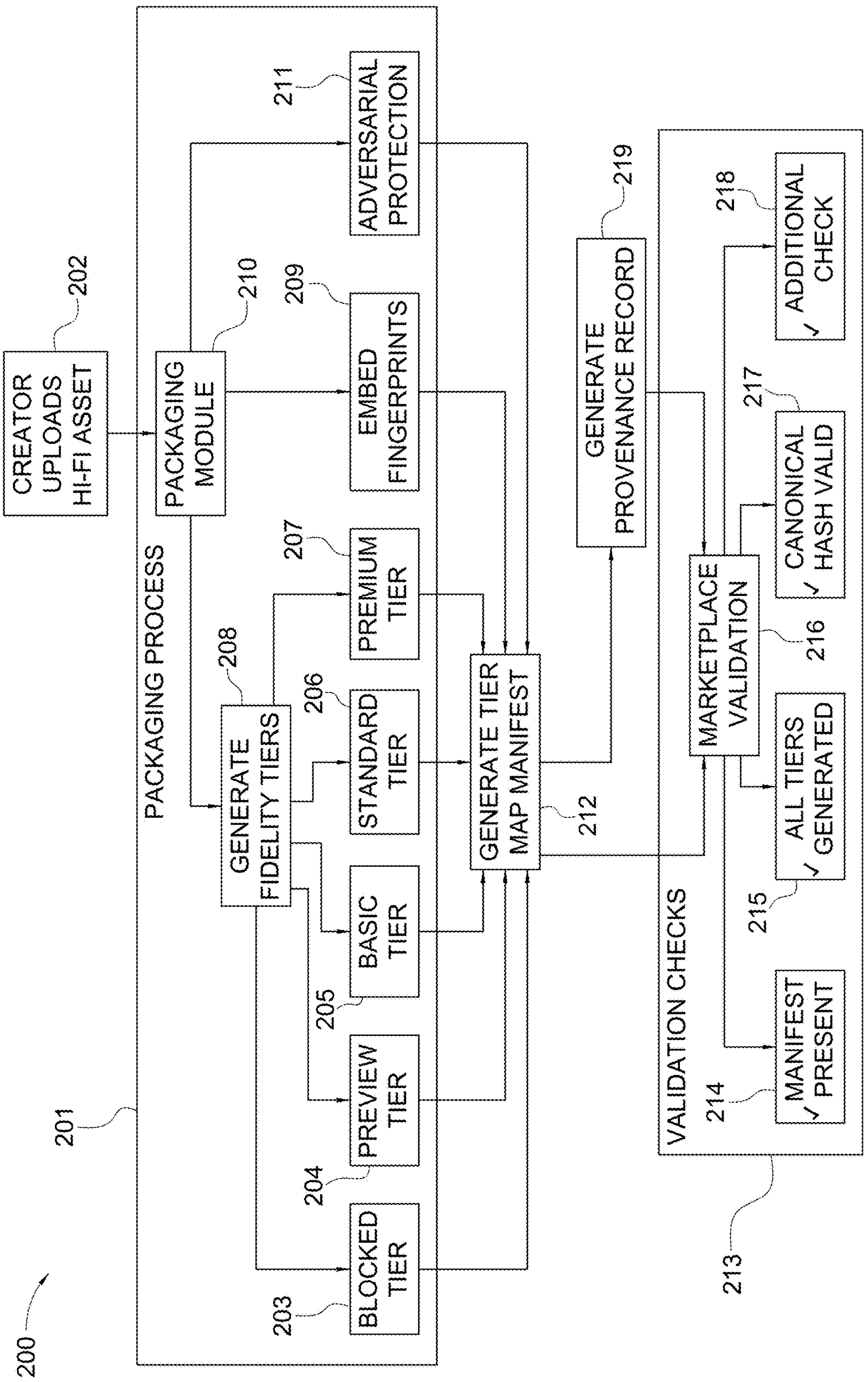

FIG. 2—Marketplace Upload and Packaging Flow

Process flow showing creator upload of a high-fidelity asset, automatic generation of multiple fidelity tiers, and creation of the tier-map manifest and provenance record prior to marketplace listing.

Figure 3:
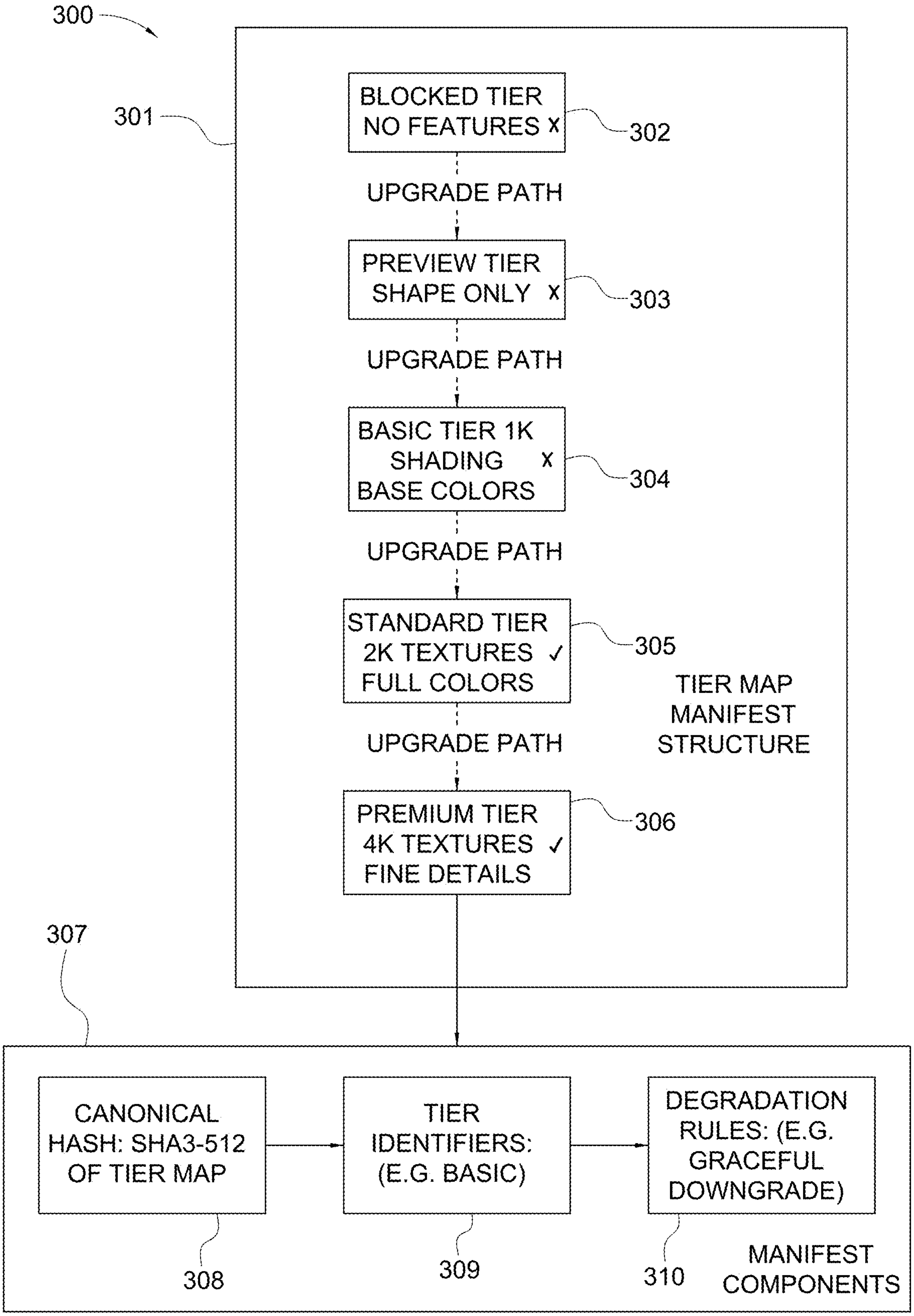

FIG. 3—Tier Map and Manifest Structure

Schematic showing relationships among fidelity tiers, canonical hash identifiers, and degradation rules within the tier-map manifest. Percentages indicate relative fidelity compared to original asset.

Figure 4:
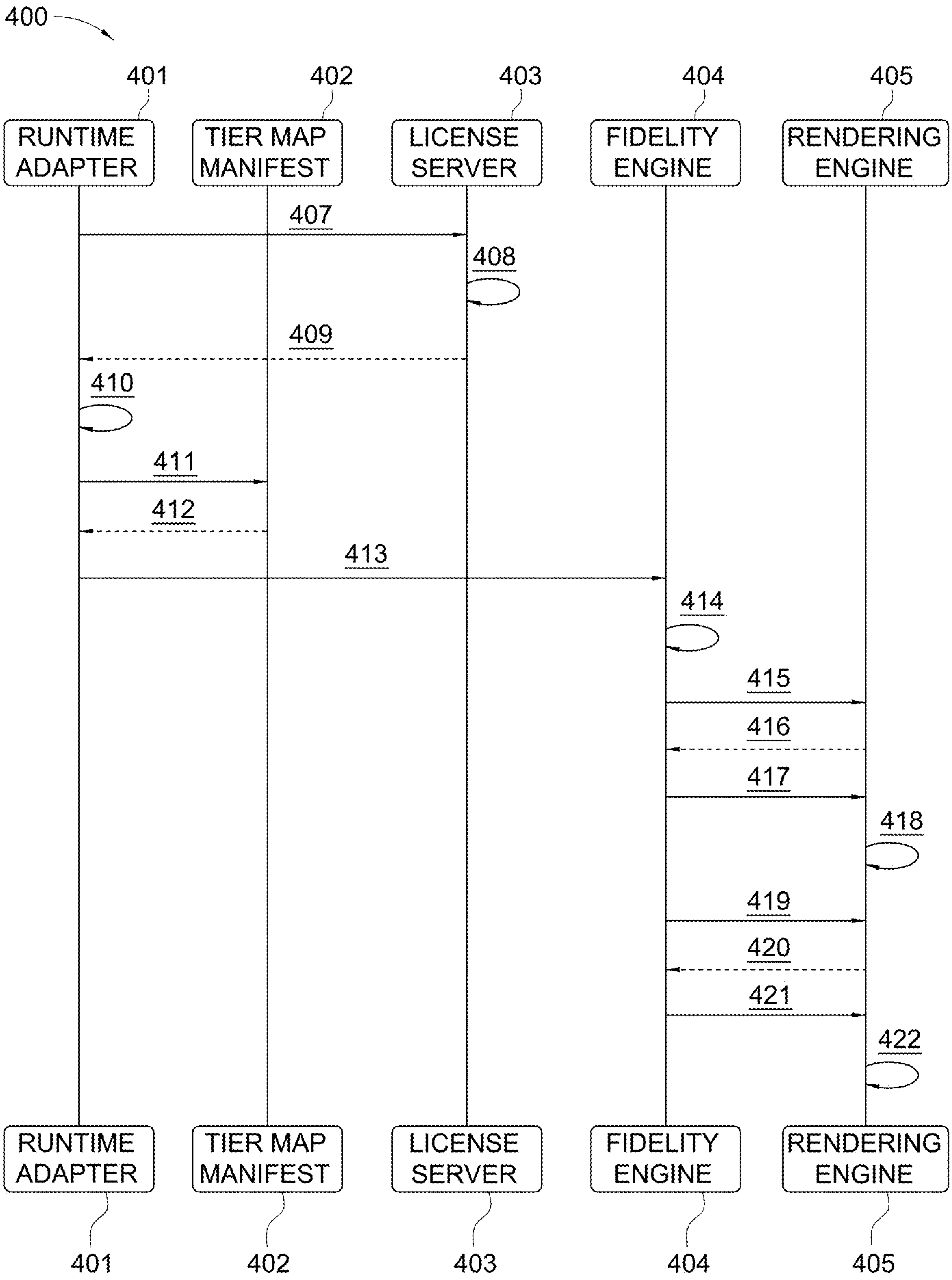

FIG. 4—Runtime Enforcement Sequence

Sequence diagram illustrating entitlement validation, frame-boundary fidelity enforcement, and graceful downgrade on token expiration or revocation.

Figure 5:
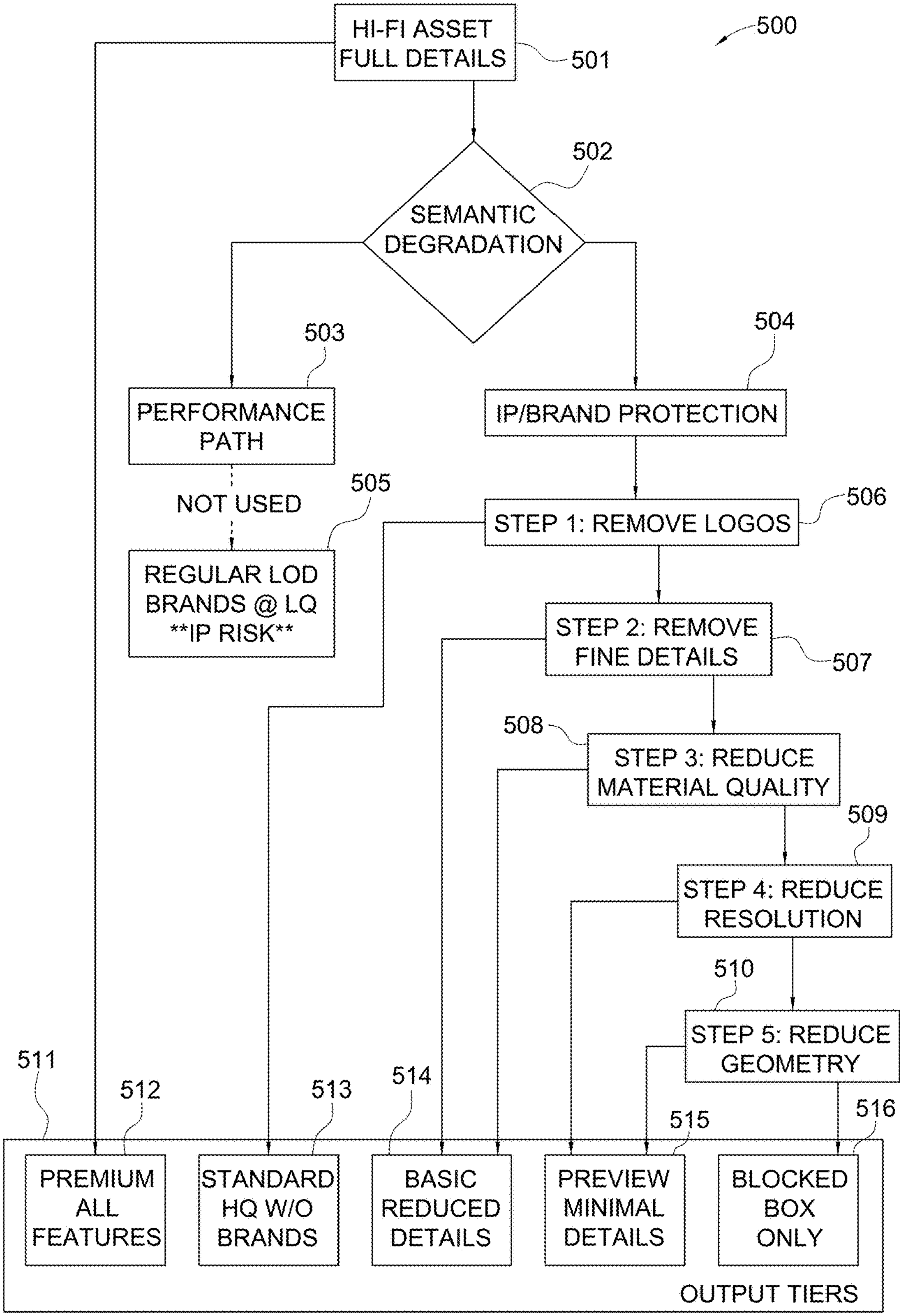

FIG. 5—Semantic Degradation Hierarchy

Hierarchical diagram depicting ordered removal of brand identifiers, texture-resolution reduction, and geometry decimation to generate preview tiers.

Figure 6:
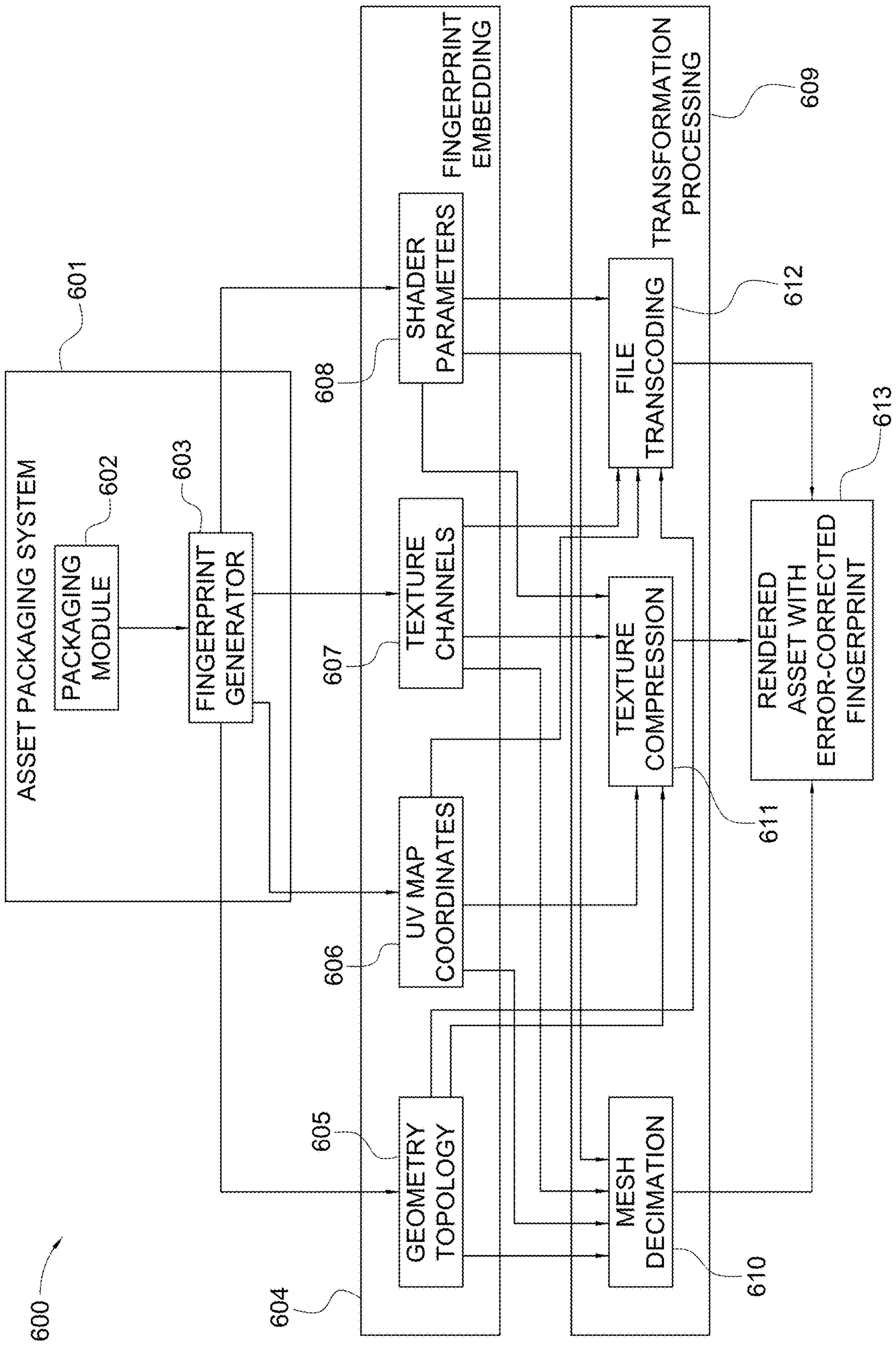

FIG. 6—Forensic Fingerprinting Embedding

Conceptual diagram showing embedding of redundant forensic fingerprints across geometry topology, UV coordinates, texture channels, and shader parameters using error-corrected encoding to ensure persistent attribution through compression or transformation.

Figure 7:
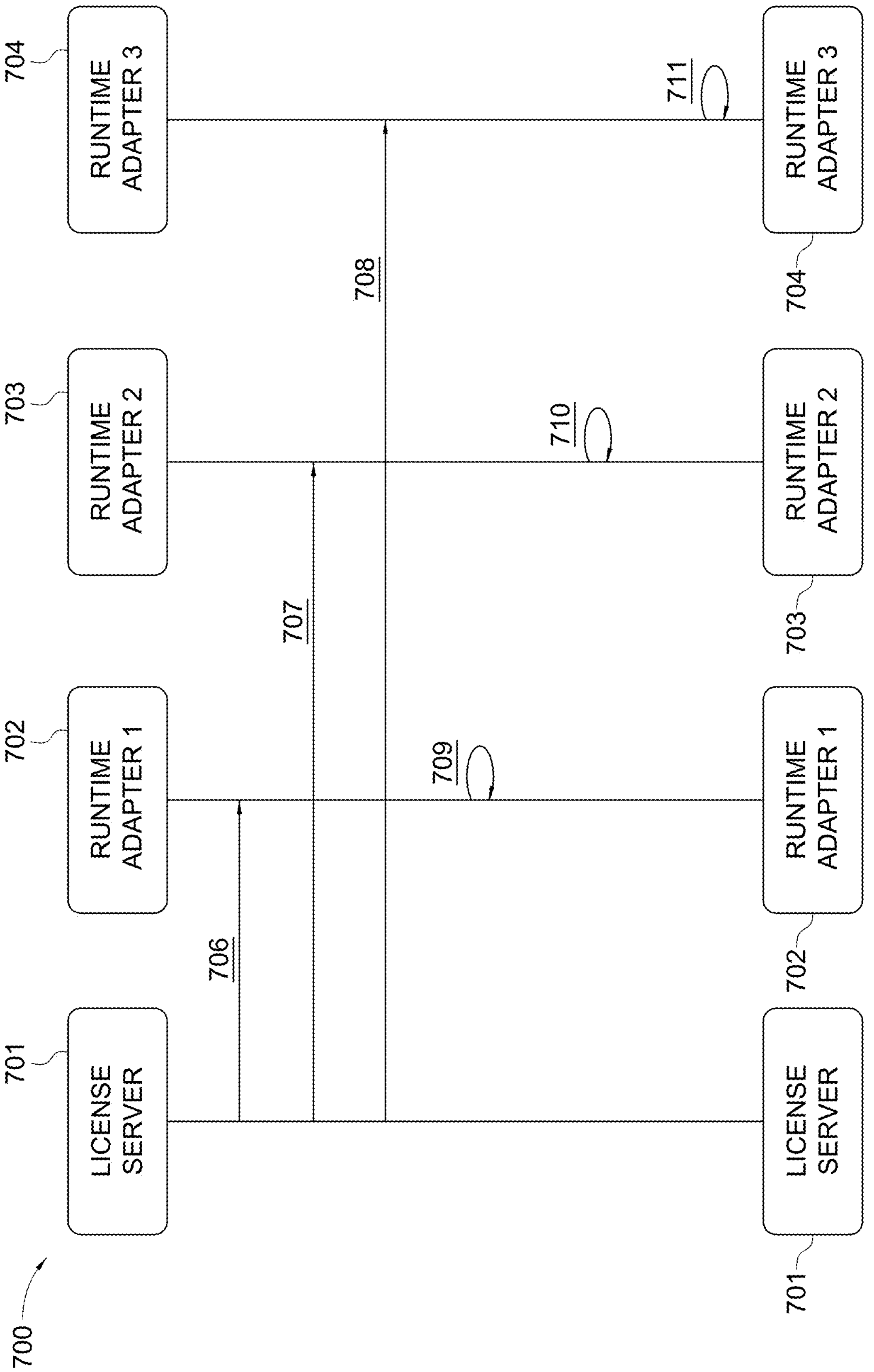

FIG. 7—Revocation and Downgrade Flow

Flowchart illustrating broadcast of revocation epochs from the license server and synchronized fidelity downgrades across distributed runtimes.

Figure 8:
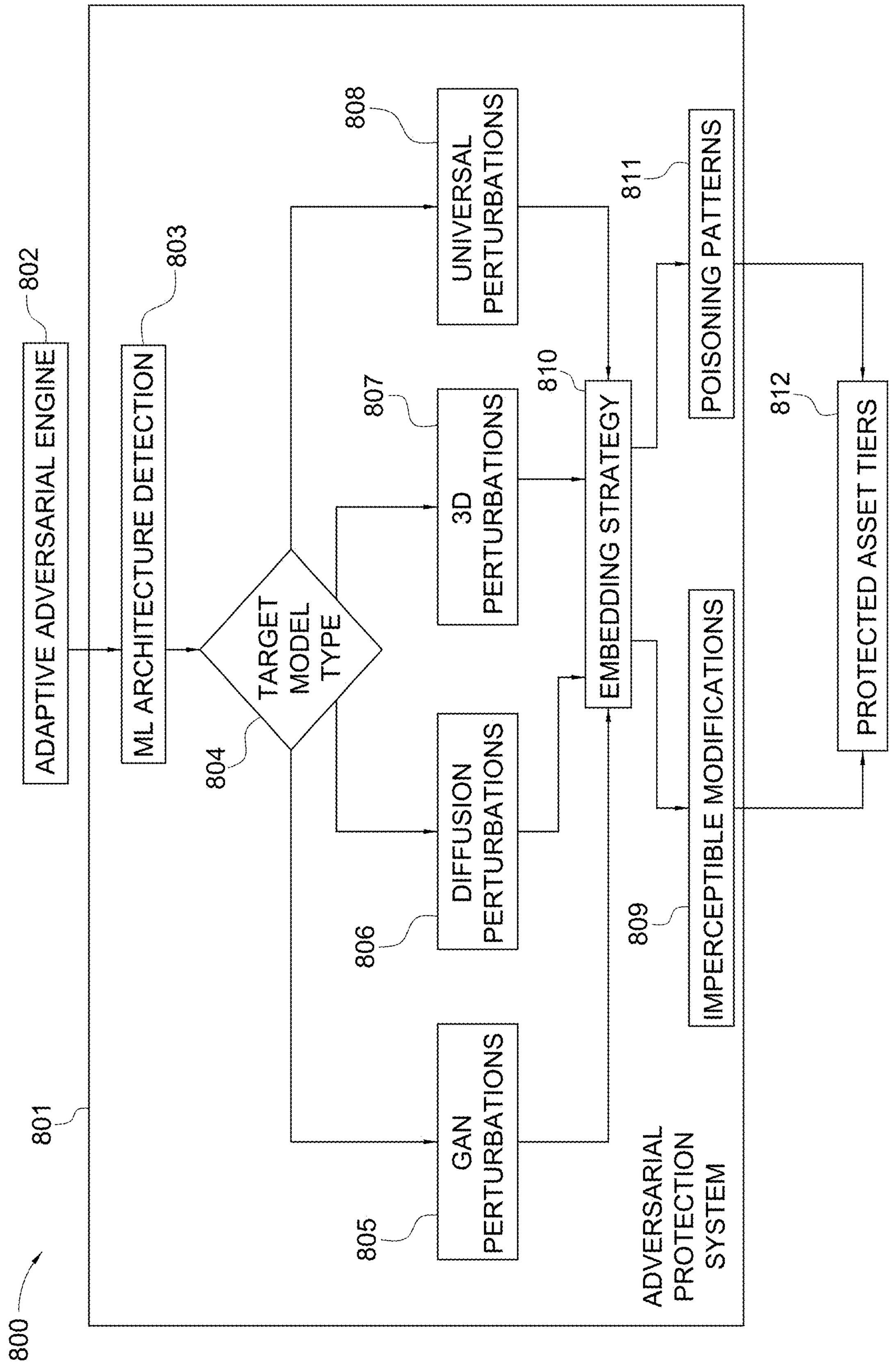

FIG. 8—Adaptive Adversarial Protection

Block diagram of the adversarial-protection engine applying imperceptible perturbations and poisoning patterns with closed-loop monitoring feedback.

Figure 9:
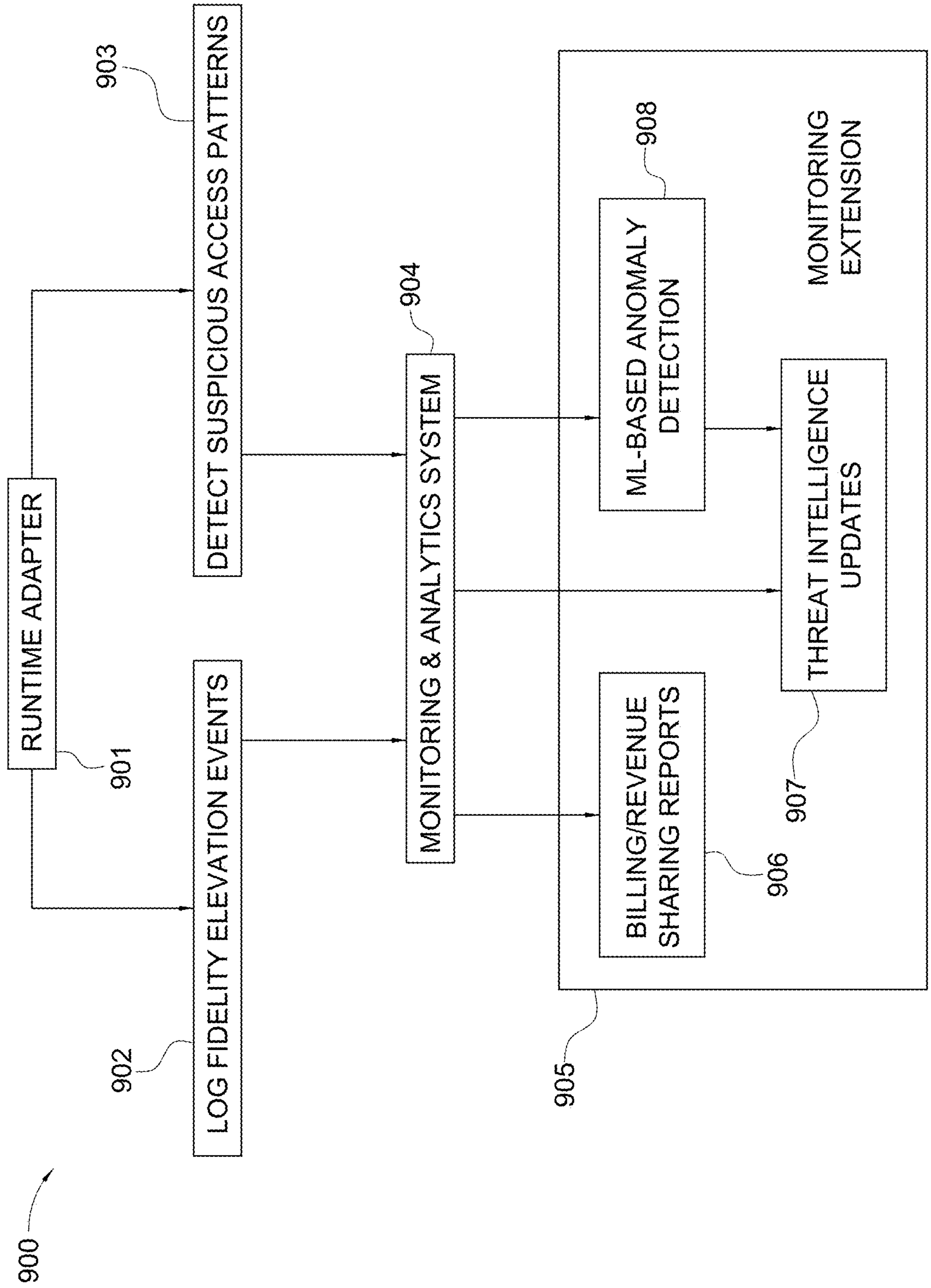

FIG. 9—Monitoring and Analytics Flow

Data-flow diagram showing event capture from runtime adapters, machine-learning-based anomaly detection, billing integration, and threat-intelligence updates.

Figure 10:
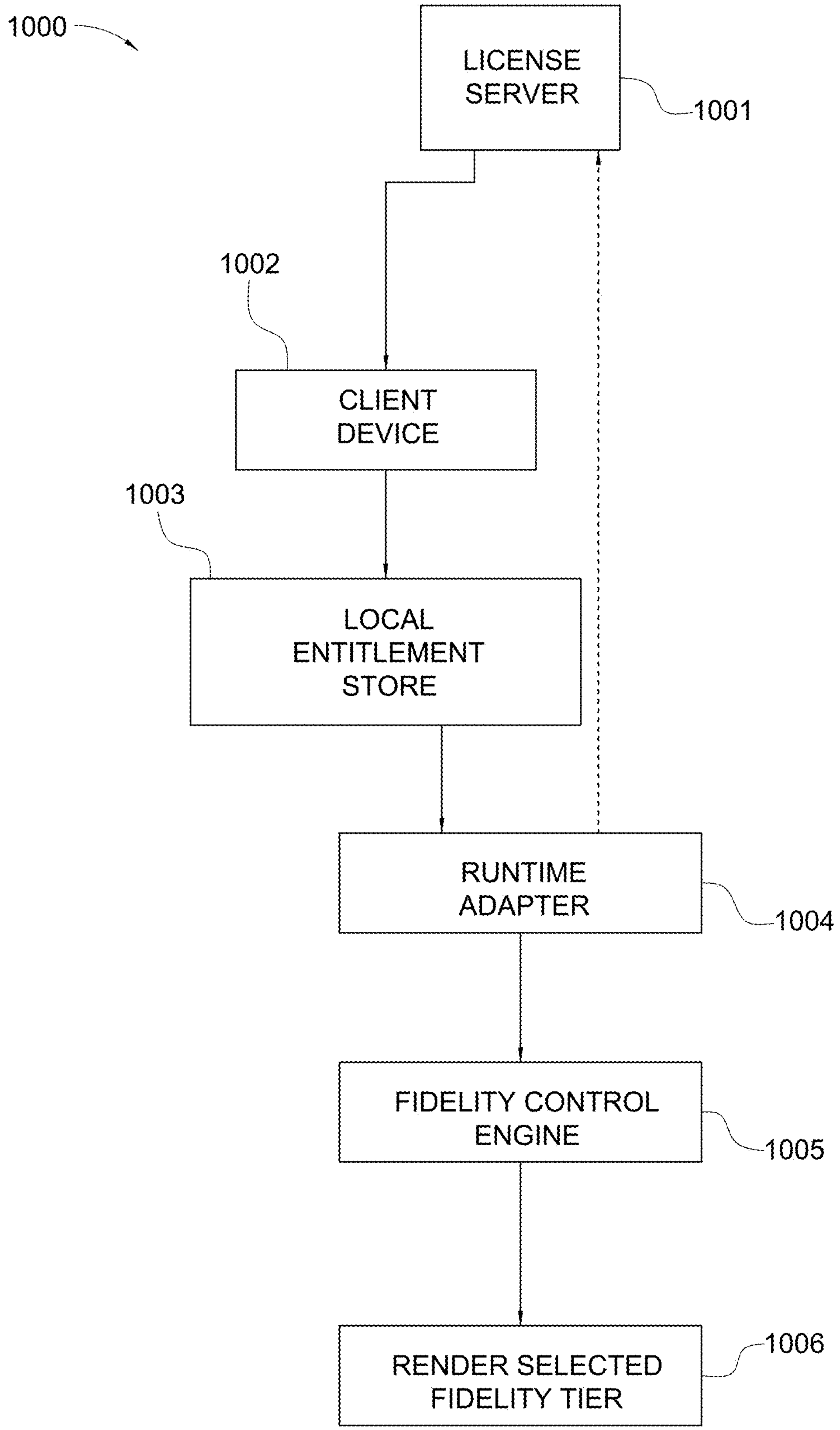

FIG. 10—Offline and Edge Enforcement

Flow diagram showing issuance of time-limited entitlements, local validation without network access, and renewal upon connectivity restoration.

Figure 11:
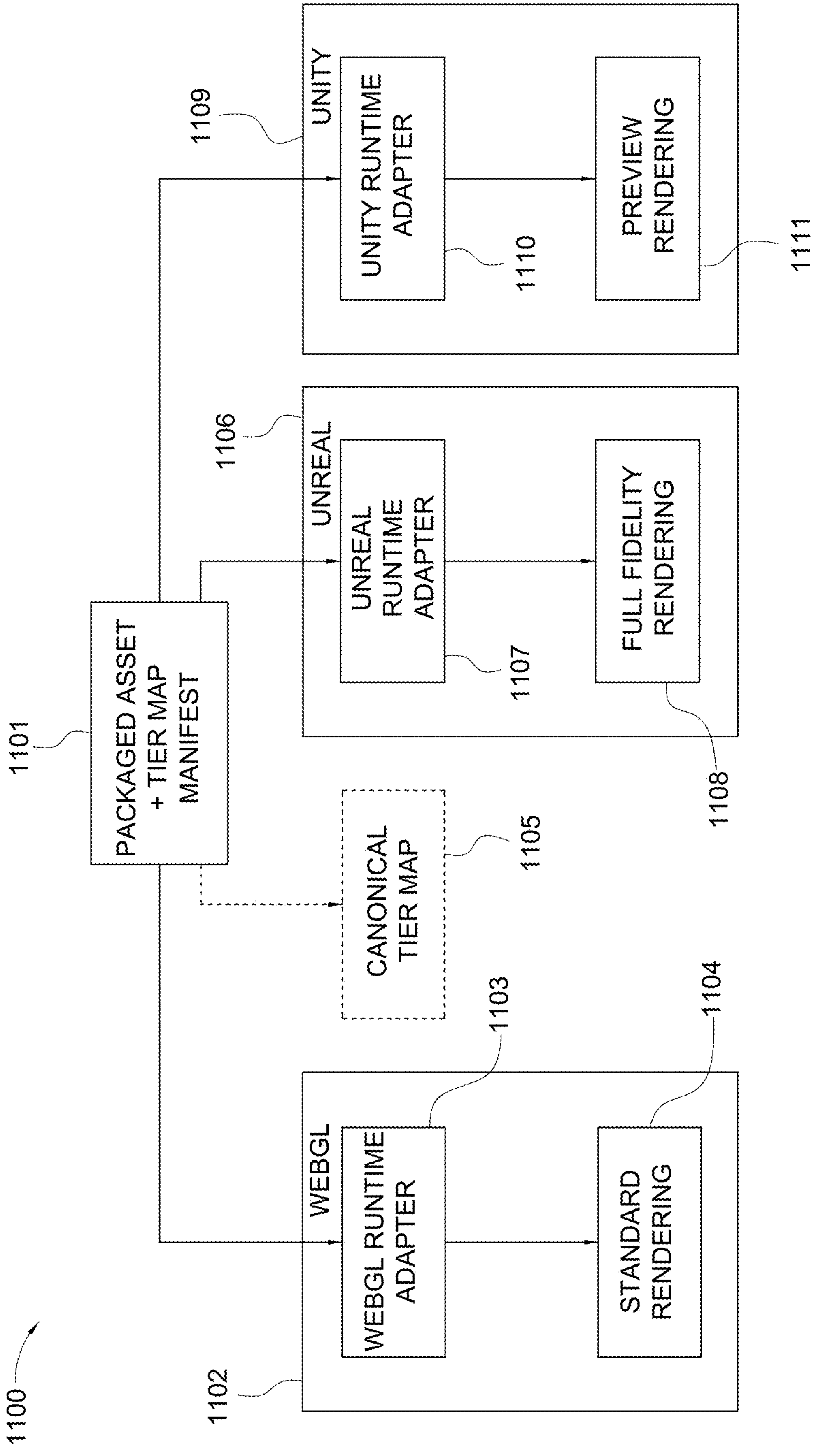

FIG. 11—Cross-Platform Runtime Enforcement Example

Illustration demonstrating deterministic license enforcement across heterogeneous runtimes such as Unity, Unreal, and WebGL.

Figure 12:
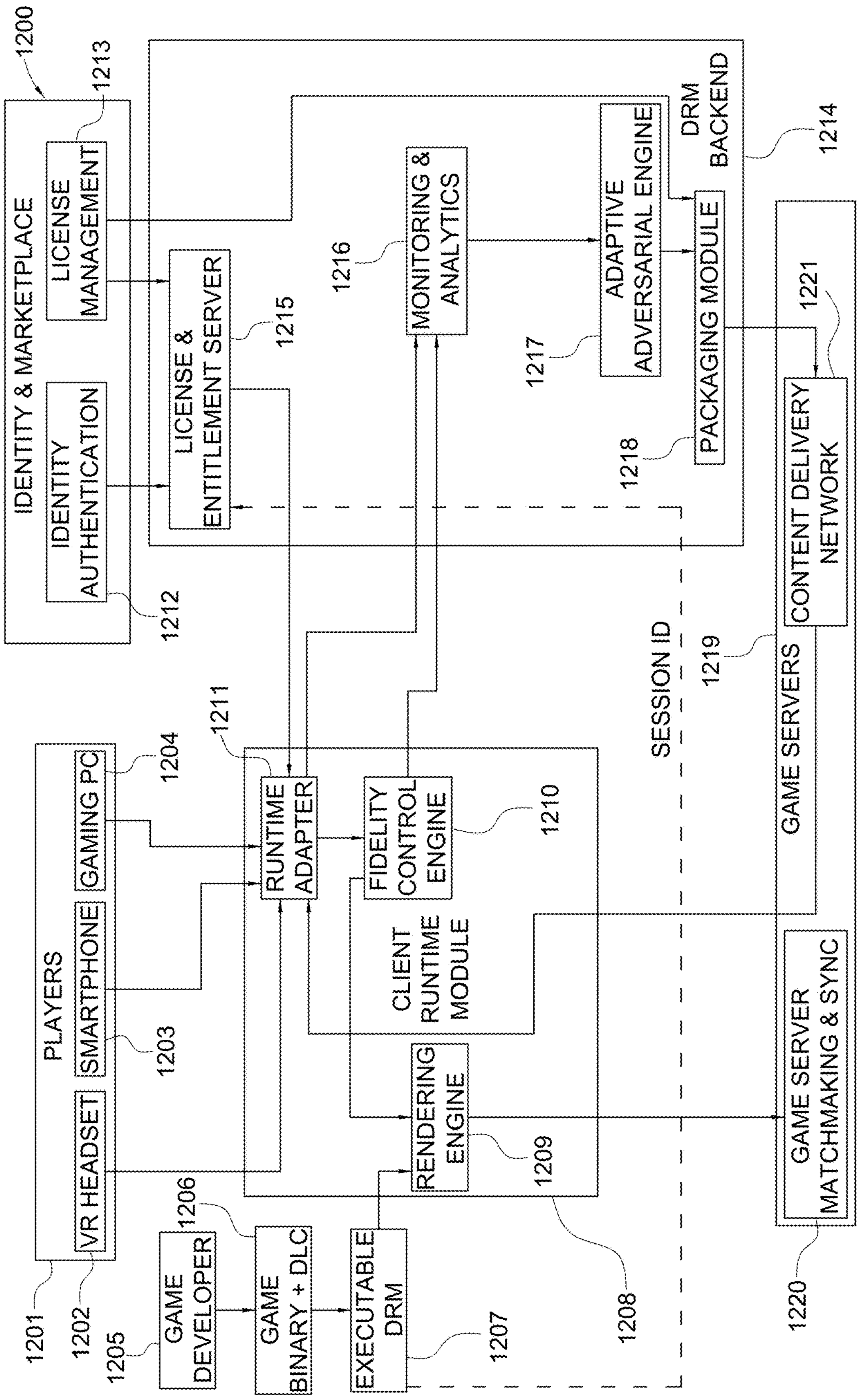

FIG. 12—Gaming System with Multiple Devices

System diagram of a multiplayer environment including desktop, mobile, and head-mounted devices executing runtime adapters with synchronized DRM enforcement.

Figure 13:
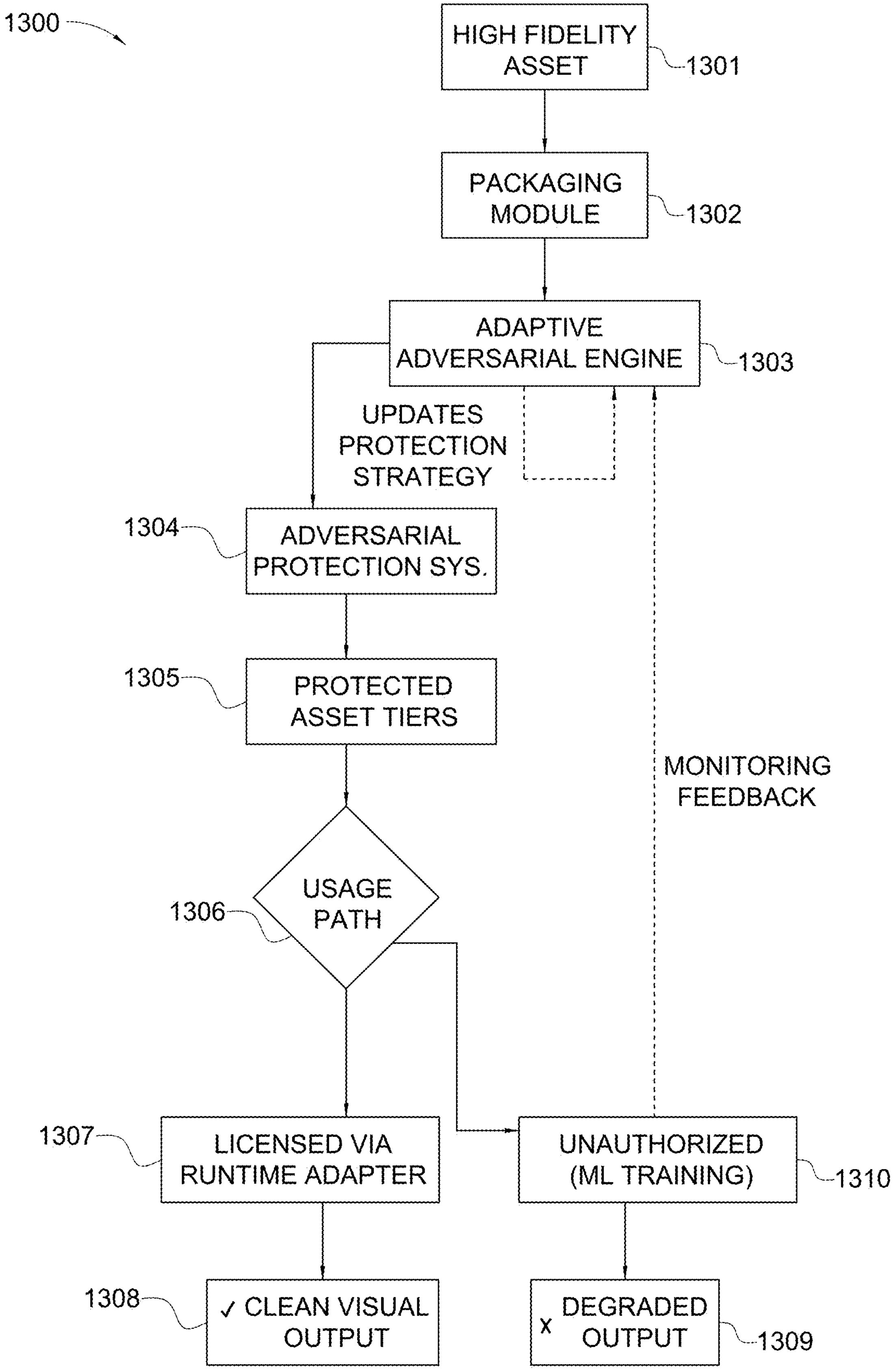

FIG. 13—Adversarial Protection Against AI Training

Diagram showing imperceptible perturbations that preserve licensed visual fidelity while degrading unauthorized machine-learning model training.

Figure 14:
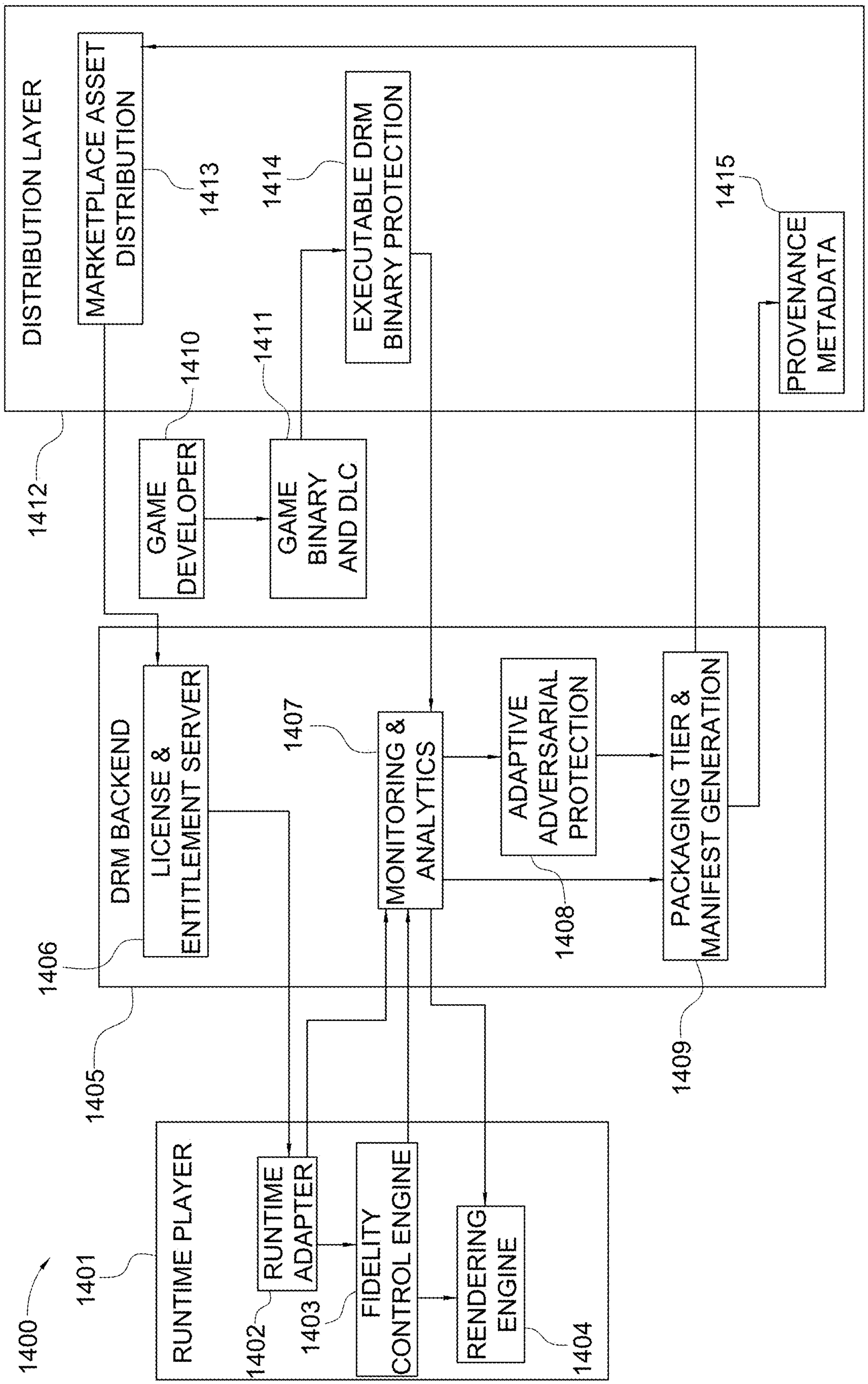

FIG. 14—Integrated System Architecture

Layered architectural diagram showing coordination among distribution, DRM-backend, and runtime-enforcement layers for packaging, licensing, monitoring, and adaptive adversarial protection.

Figure 15:
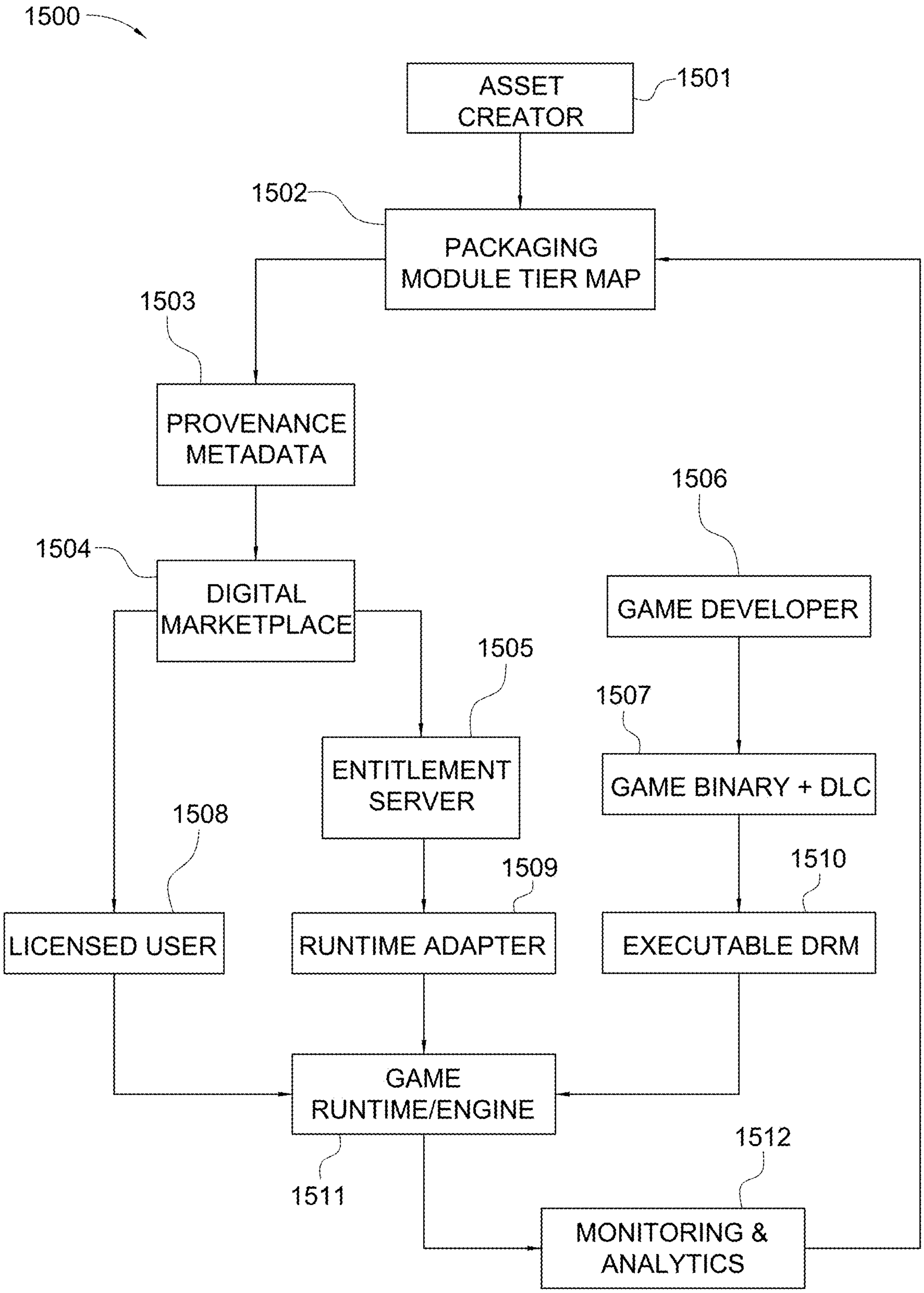

FIG. 15—Combined Content Protection Flow

Flowchart illustrating cooperative operation of executable-level and asset-level DRM, marketplace validation, and provenance metadata within a unified content-protection pipeline.

Figure 16:
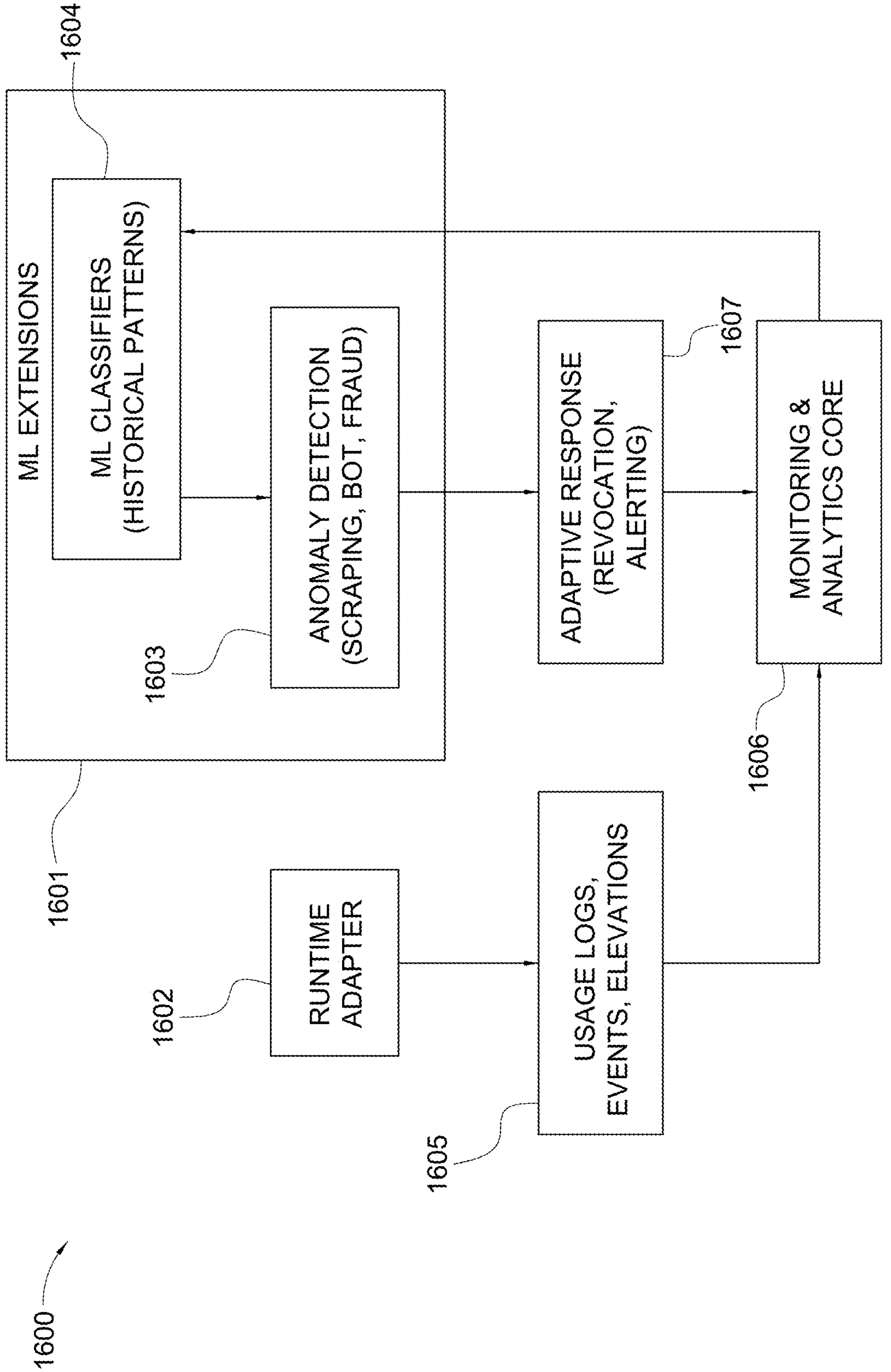

FIG. 16—AI/ML Monitoring Extension

Block diagram showing machine-learning classifiers trained on runtime telemetry to detect anomalies and trigger adaptive revocation or policy updates.

Figure 17:
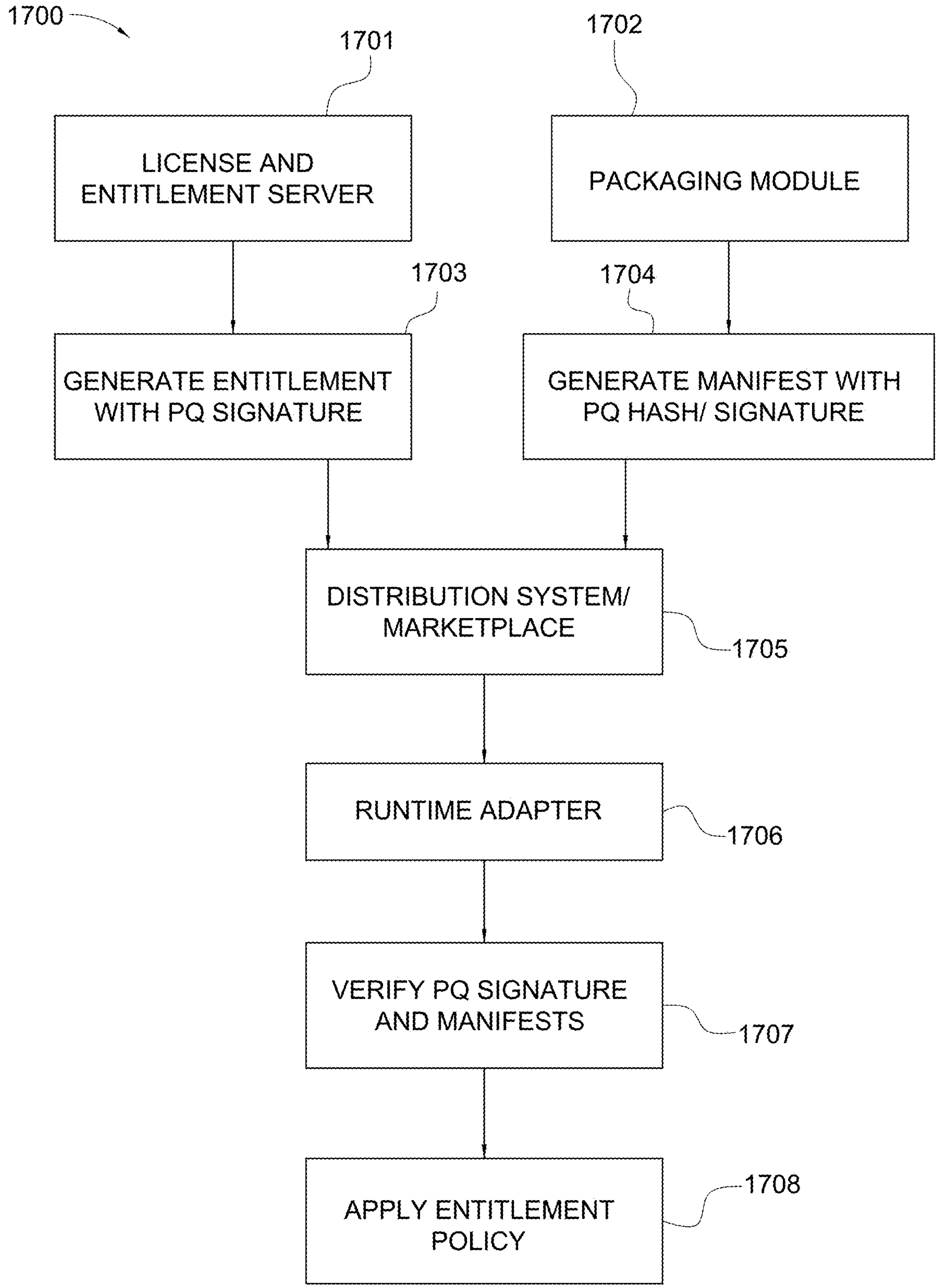

FIG. 17—Post-Quantum Cryptography Flow

Diagram showing use of lattice- or hash-based post-quantum cryptographic primitives for entitlement signing and manifest validation.

Figure 18:
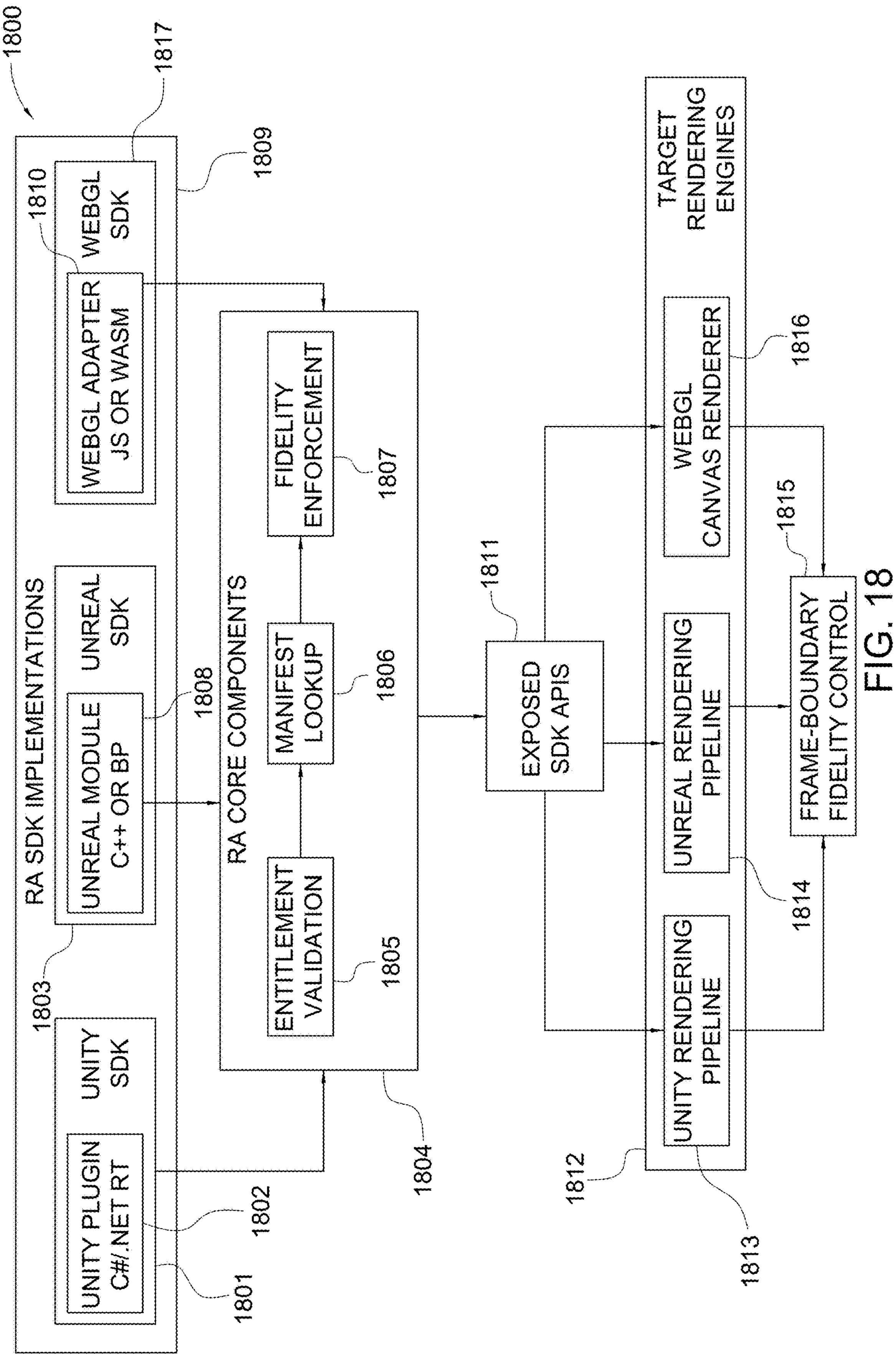

FIG. 18—SDK Runtime Adapter Architecture

Schematic illustrating SDK implementations for Unity (C#), Unreal (C++/Blueprints), and WebGL (JavaScript/WASM) with shared validation and enforcement APIs.

Figure 19:
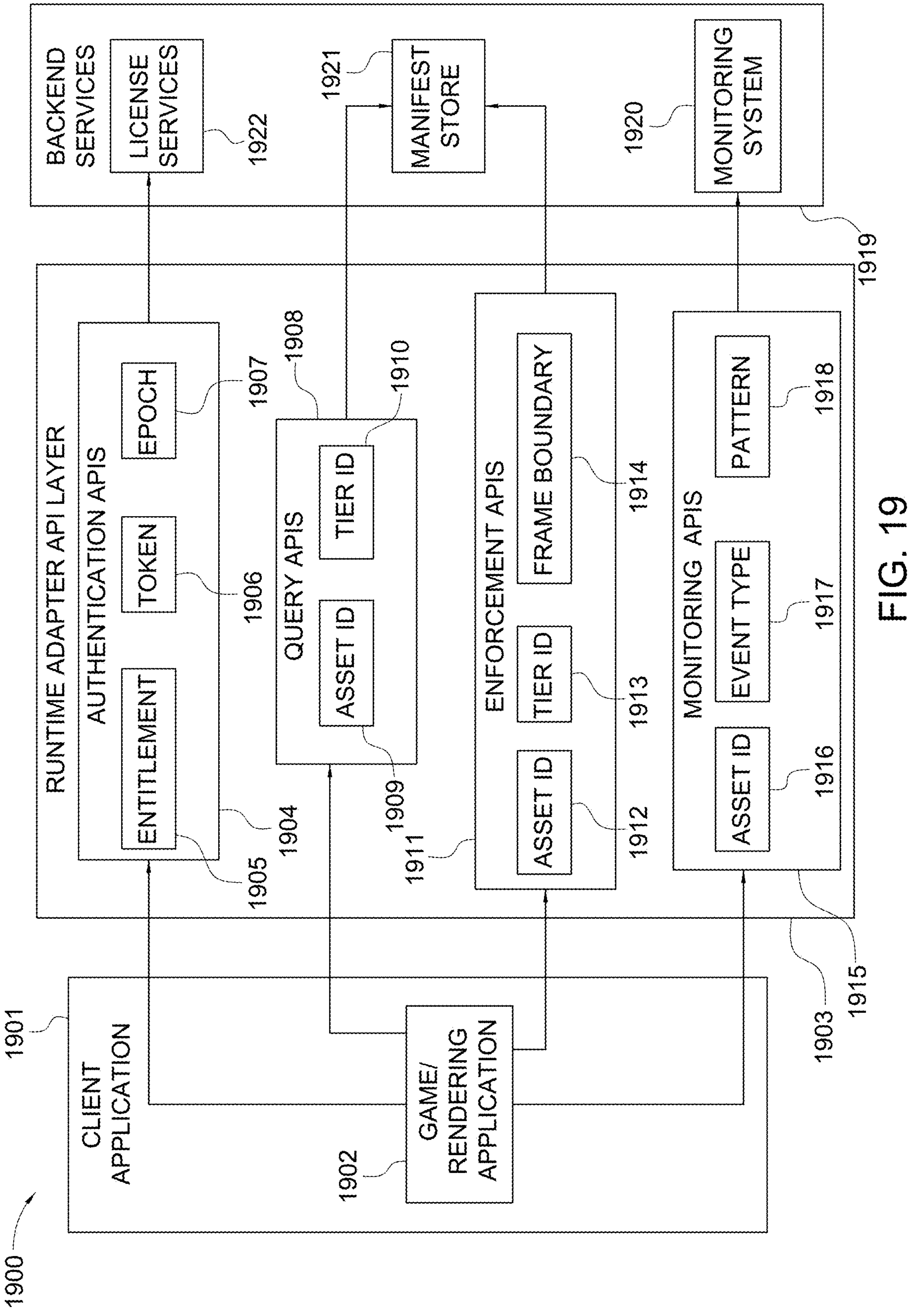

FIG. 19—Runtime Adapter API Interfaces

Block diagram showing authentication, query, enforcement, and monitoring APIs-validateToken, getPermittedTier, and enforce Tier—that bridge client applications with license, manifest, and analytics services.

Note Regarding Numerical Values in Figures: All polygon counts, texture resolutions, percentage values, and other numerical specifications shown in the figures are illustrative examples only and do not constitute fixed requirements or limitations of the invention. For instance, polygon counts (e.g., 5K, 15K, 30K, 50K) and fidelity percentages (e.g., 10%, 30%, 60%, 100%) are representative values that may vary based on asset type, artistic requirements, and licensing agreements. The actual values implemented may differ while maintaining the hierarchical tier relationships and degradation principles described herein.

7. DETAILED DESCRIPTION OF THE EMBODIMENTS

Definitions (non-limiting)

The following definitions are provided for clarity and do not restrict claim scope. Equivalent terms or variations may be used in implementation.

- Adversarial Protection Module—A packaging component that applies imperceptible perturbations or poisoning patterns to deter unauthorized machine-learning extraction.
- Avatar A—three-dimensional character representation of a user within a virtual world, subject to license-tiered fidelity control.
- Context-Aware Fidelity Enforcement—Dynamic adjustment of permitted fidelity tiers based on runtime factors including user subscription level, virtual location, proximity to other users, or event participation.
- Cross-Platform Synchronization—Maintaining consistent entitlement state and fidelity enforcement across heterogeneous platforms through shared manifests and license registries.
- Entitlement—A cryptographically signed token specifying permitted fidelity tiers, validity period, and revocation epoch for a licensed 3D asset.
- Event Context—Metadata indicating user participation in time-limited virtual events that may grant temporary fidelity upgrades or modify access permissions.
- Fidelity-Control Engine—A runtime module that applies license-driven fidelity selection independently of performance-based level-of-detail operations.
- Forensic Fingerprint—A session-specific identifier embedded redundantly across geometry, UV coordinates, texture channels, and shader parameters, recoverable through error-corrected decoding.
- gRPC—A high-performance, remote-procedure-call framework that uses HTTP/2 and protocol buffers to enable efficient communication between distributed services.
- Hybrid Rendering—A rendering architecture combining cloud-based server rendering for high-fidelity assets with local client rendering for cached lower-fidelity assets.
- Metaverse—A persistent virtual world environment operating continuously where three-dimensional assets are rendered with context-aware fidelity control based on user location, proximity, subscription level, or event participation.
- MQTT (Message Queuing Telemetry Transport)—A lightweight publish-subscribe messaging protocol used for reliable event distribution in constrained or edge network environments.
- Persistent Virtual World—A continuously operating virtual environment where world state persists between individual user sessions.

Provenance Record—A cryptographically verifiable assertion (e.g., C2PA) capturing authorship, packaging events, and license metadata associated with a 3D asset.

Proximity-Based Rendering—Fidelity enforcement that varies based on distance between users or objects, rendering nearby elements at higher fidelity while reducing fidelity for distant elements.

Revocation Epoch—A synchronization interval at which issued entitlements expire or downgrade across distributed runtimes.

Runtime Adapter—An SDK component integrated into rendering engines (e.g., Unity, Unreal, WebGL) that validates entitlements, enforces fidelity rules, and interfaces with the fidelity-control engine.

Semantic Degradation—A controlled reduction in asset quality in which brand identifiers or proprietary textures are removed prior to geometric or texture-resolution decimation.

Session-Specific Identifier—A unique cryptographic marker embedded within rendered assets associating the instance with a particular user session for forensic traceability.

Tier-Map Manifest—A data structure linking each fidelity tier of a 3D asset to a unique identifier and canonical hash, ensuring deterministic runtime enforcement.

Time-Limited Entitlement—A license grant that expires after a predetermined duration, triggering automatic fidelity downgrade or access revocation.

TLS (Transport Layer Security)—A cryptographic protocol that provides secure, authenticated, and encrypted communication over computer networks.

UV coordinates—two-dimensional texture-mapping coordinates defining how a 2D image is projected onto a 3D model's surface.

Wearable Item—A three-dimensional asset representing clothing or accessories equippable to avatars, subject to license-based rendering restrictions.

WebSocket—A bidirectional communication protocol that enables persistent, real-time data exchange between clients and servers over a single TCP connection.

The foregoing description of specific embodiments is intended to illustrate the broad principles of the invention and enable its implementation, not to limit its scope. Variations, substitutions, and modifications may be made by those skilled in the art without departing from the spirit and scope of the invention as defined by the appended claims. Features described in connection with one embodiment may be combined or interchanged with those of other embodiments where such combinations are technically feasible. The claims should therefore be interpreted to encompass all such modifications, equivalents, and alternatives consistent with this disclosure.

The invention provides a license-tiered digital rights management system specifically designed for three-dimensional (3D) assets used within interactive rendering environments and marketplaces. Unlike conventional DRM frameworks that terminate protection at the file or executable level, the disclosed system enforces license conditions dynamically at runtime, after an asset has been decrypted and loaded into memory. Unlike current systems described in § 4, which terminate protection at the file or executable level (such as Denuvo) or rely on passive watermarking (such as KAIST patents), the present invention maintains active license enforcement throughout the entire runtime rendering pipeline.

A packaging module 102 analyzes and preprocesses high-fidelity 3D assets to generate multiple fidelity tiers 104, such as Preview, Standard, and Premium, each derived from the original source data through deterministic degradation rules. A tier-map manifest 105 is produced, linking each fidelity tier to a canonical hash identifier and a corresponding degradation profile. This manifest 105 enables consistent enforcement of visual quality across heterogeneous rendering runtimes including Unity, Unreal Engine, WebGL, and XR platforms.

A license and entitlement service 109 issues cryptographically signed entitlements specifying permitted fidelity tiers, validity periods, and revocation epochs 111. The entitlements are bound to user sessions, devices, and optionally geolocations, ensuring that each runtime instance operates under verifiable license constraints. The system supports post-quantum cryptographic (PQC) signature algorithms 110 to ensure long-term resilience against quantum-capable adversaries.

A runtime adapter 112, implemented as an SDK or plug-in for the rendering engine, validates the entitlement against the tier-map manifest 105 and invokes a fidelity-control engine 113 that applies fidelity selection at deterministic frame boundaries. The runtime adapter 112 prevents unauthorized tier elevation, even under variable performance conditions, by decoupling license logic from performance-driven LOD functions native to the engine. In applications such as gaming, this runtime enforcement **100*c*** operates as a computer program product that can be distributed through digital storefronts, integrated into game executables, or provided as downloadable content. The enforcement remains active throughout gameplay, ensuring that license restrictions cannot be circumvented through in-game actions, settings adjustments, or modifications to configuration files.

A monitoring and analytics module **100*d* continuously records runtime activity including entitlement validations, tier changes, and potential anomalies 116. These logs enable revenue and billing tracking 117, threat intelligence 118**, and automated revocation triggers. In one embodiment, runtime events are linked to C2PA-compliant provenance records, providing an auditable, end-to-end chain of custody from packaging to playback.

An adversarial-protection engine 107 introduces imperceptible perturbations or poisoning patterns into selected tiers during packaging. This adversarial-protection engine operates as a dependent module within the same runtime-enforcement framework, sharing telemetry inputs from the monitoring and analytics subsystem 115 and configuration data from the packaging module 102. Its operation relies on the same entitlement-validation and fidelity-mapping structures that govern standard license enforcement, ensuring that all AI-resistant protections are implemented through the unified DRM pipeline. These alterations maintain full visual fidelity for licensed users while degrading the output of unauthorized machine-learning or data-extraction pipelines. The perturbation parameters are dynamically updated in response to feedback from the monitoring system, providing an adaptive defense layer against AI-based model theft.

Finally, a forensic-fingerprinting subsystem 604 embeds session-specific identifiers across multiple carriers—geometry topology 605, UV coordinates 606, texture channels 607, and shader parameters 608—using error-corrected encoding. These fingerprints remain recoverable after mesh simplification, compression, or transcoding, ensuring traceability of redistributed or modified assets.

Collectively, these components form a multi-layer DRM framework that starts with content creation and packaging 100*a*, maintains license enforcement 100*c*, provenance verification, and AI resistance 100*d* throughout the entire asset lifecycle—from marketplace distribution 100*b* to runtime enforcement 100*c*.

In an alternative embodiment, the system architecture extends to persistent virtual world environments (metaverse platforms), where the runtime adapter 112 implements context-aware fidelity enforcement based on user subscription level, virtual location, proximity to other users, and event participation. Entitlements persist across multiple sessions and synchronize across different virtual world platforms, enabling protection of metaverse objects including avatars, virtual real estate, wearable items, and virtual goods. This extensibility is described in § 7.21.5.

Advantages

1. Runtime Enforcement: Enforces license terms after asset decryption, preventing unauthorized fidelity elevation in memory.
2. Deterministic Tier Mapping: Ensures identical fidelity outcomes across different engines and hardware configurations.
3. Integrated Provenance: Links runtime entitlement verification with C2PA provenance records for auditability.
4. Post-Quantum Security: Utilizes lattice- or hash-based signature algorithms to safeguard entitlements and manifests.
5. AI-Safe Packaging: Incorporates adaptive perturbations and forensic fingerprints to deter and trace AI model theft.
6. Semantic Degradation: Provides controlled preview tiers that remove branding and reduce quality in a defined hierarchy.
7. Cross-Runtime SDK: Offers a common API layer (validateToken, getPermittedTier, enforceTier) for Unity, Unreal, WebGL, and XR runtimes.
8. Offline and Edge Operation: Allows short-lived entitlements and local validation for disconnected environments.
9. Marketplace Compatibility: Integrates with existing asset stores to automate license verification and royalty tracking.
10. Hardware-Assisted Enforcement: Enables secure execution within trusted-execution or GPU-isolated modules.
11. Adaptive Feedback Loop: Enables continuous adjustment of perturbation and fingerprint parameters based on monitoring telemetry, improving protection with real-world data.
12. Non-Disruptive Updates: Applies security updates asynchronously through entitlement refresh and manifest renewal without interrupting normal rendering.
13. Integrated ML Defense: Combines commercial DRM enforcement with adaptive machine-learning resilience that preserves licensed fidelity while blocking unauthorized model training.
14. Coordinated Multi-Layer Protection: Unifies fingerprinting, adversarial perturbation, and analytics under a single adaptive control policy for stronger, synchronized defense.
15. Context-Aware Metaverse Support: Extends enforcement to persistent virtual worlds with location-based, proximity-based, and event-based fidelity control, enabling cross-platform asset portability and continuous license validation across extended user sessions.

The system's architecture represents deliberate design trade-offs optimized for security and revenue generation. The separation of license enforcement from performance optimization requires additional storage for tier variants and processing overhead for dual decision systems. However, these resource costs are comparable to other commercial DRM systems and are offset by the system's unique ability to enable tier-based monetization and prevent circumvention through hardware upgrades or setting modifications.

Core Modules and Interactions

1. Packaging Module 102: Generates fidelity tiers, applies semantic degradation and adversarial perturbations, embeds forensic fingerprints, and produces the tier-map manifest 105 and optional C2PA provenance record 106.
2. License and Entitlement Service 109: Signs and distributes entitlements containing tier permissions, validity windows, revocation epochs, and optional geolocation bindings.
3. Runtime Adapter 112: Integrated into the rendering pipeline, validates entitlements, applies tier selection via the fidelity-control engine 113, and communicates telemetry to the monitoring system.
4. Fidelity-Control Engine 113: Executes deterministic fidelity transitions at frame boundaries and enforces visual constraints independent of the engine's native LOD.
5. Monitoring and Analytics System 115: Aggregates validation events, anomaly detections, and performance data; supports API-based billing and adaptive protection feedback.
6. Adversarial-Protection Engine 107: Dynamically evolves perturbation parameters and poisoning vectors to counter new AI-extraction techniques.
7. Forensic-Fingerprinting Engine 603: Encodes redundant identifiers across multiple data channels, enabling forensic recovery even after transformation or re-compression.

Provenance and Audit Layer (105, 1415, 1412): Maintains runtime linkage between manifests, entitlements, and C2PA assertions for verifiable chain-of-custody tracking.

Like reference numerals refer to like elements across the figures. FIGS. 1-19 are schematic representations and are not drawn to scale.

The following description presents exemplary embodiments of the invention with reference to the accompanying drawings. Equivalent components may be referred to by consistent descriptive names throughout the figures. The embodiments are provided to explain the invention's structure and operation rather than to limit its scope.

All numerical performance values presented in the following tables are simulated or analytically estimated and are included solely for illustration; they do not represent measured or limiting results.

7.0 Preferred Embodiment

In a preferred embodiment, the invention is implemented as a license-tiered digital-rights-management (DRM) system (100*a*-100*d*) integrated within a real-time 3D runtime environment such as Unity 1813, Unreal Engine 1814, or a WebGL/XR runtime (1816/1401).

A creator 101 uploads a high-fidelity three-dimensional asset through the packaging module 102, which generates multiple fidelity tiers 104 and produces a canonical tier-map manifest 105 linked to a provenance record 1415 compliant with the C2PA standard. The license-and-entitlement server (109, 1701) issues session-bound entitlements (111, 1703) that define permitted fidelity levels, validity periods, and revocation epochs.

At runtime, a runtime adapter (112, 1903) integrated with the host engine validates each entitlement and coordinates with the fidelity-control engine (113, 1807) to apply the authorized tier at deterministic frame boundaries 1815. The adversarial-protection engine (107, 1408) applies imperceptible perturbations to resist model-extraction attacks, while the forensic-fingerprinting engine 603 embeds error-corrected identifiers across geometry, texture, and shader channels for persistent attribution. These protection subsystems operate as interdependent components of the same DRM framework, sharing entitlement data from the license server 109, telemetry from the monitoring subsystem 115, and configuration updates to the packaging module 102 through a closed adaptive feedback loop. This feedback architecture enables the DRM system to continuously learn from real-world runtime telemetry, improving resilience against new threat patterns without disrupting active license sessions.

All validation events, tier transitions, and anomaly detections are transmitted to the monitoring and analytics subsystem (115, 1920, see also FIG. 9), which aggregates runtime telemetry and issues adaptive feedback updates to the adversarial-protection engine 107 and packaging module 102.

All entitlement exchanges and manifest verifications employ digital-signature algorithms to ensure cryptographic integrity. In recommended configurations, these signatures use post-quantum-resistant primitives such as CRYSTALS-Dilithium, Kyber, or SPHINCS+ to provide forward security and resilience against quantum-enabled adversaries. Equivalent classical or hybrid cryptographic schemes—e.g., ECDSA or Ed25519—may be substituted without affecting the operational flow of the system.

This embodiment represents the current best-mode implementation because it combines:

1. Deterministic, license-driven fidelity enforcement independent of the rendering engine's native LOD system;
2. Cryptographically bound provenance and entitlement data providing verifiable authenticity at runtime; and
3. Adaptive adversarial protection that evolves in response to real-world threat telemetry. Alternative embodiments described in later sections—such as offline enforcement (FIG. 10), SDK modular deployment (FIG. 18), and distributed edge operation (FIG. 17)—may employ equivalent hardware, cryptographic primitives, or network configurations while maintaining the same license-tiered enforcement and adaptive-protection principles of the preferred embodiment.

7.1 System Architecture Overview (FIG. 1)

FIG. 1 illustrates the overall architecture of the license-tiered digital-rights-management (DRM) framework, showing the end-to-end flow from content creation through packaging, licensing, runtime enforcement, and adaptive monitoring.

7.1.1 Content Creation and Packaging Subsystem 100*a*

A creator upload interface 101 allows a content creator to submit a high-fidelity three-dimensional 3D asset, such as a model or scene file, to the packaging module 102.

The packaging module deterministically generates multiple fidelity tiers 104—for example, Preview, Standard, and Premium—each derived from the master asset using controlled geometric and texture simplification rules.

To ensure traceability and anti-tampering resilience, a forensic-fingerprint generator 103 embeds redundant, session-specific identifiers across multiple carriers, including geometry topology, UV coordinates, texture channels, and shader parameters. The resulting assets are recorded within a tier-map manifest 105, which defines canonical hashes, degradation profiles, and hierarchical tier relationships. A provenance record 106—for instance, a C2PA assertion—is generated in parallel to document authorship, creation time, and packaging integrity.

An adaptive-adversarial protection engine 107 applies imperceptible perturbations or latent-space poisoning patterns to resist unauthorized machine-learning extraction or model cloning attempts.

Together, these components form a cryptographically linked content-packaging pipeline that guarantees reproducible fidelity-tier generation and persistent attribution of digital authorship.

7.1.2 Distribution and Licensing Subsystem 100*b*

Packaged assets and their associated manifests are transferred to a marketplace validation and distribution system 108 that authenticates the asset package before public listing.

The marketplace interfaces with a license and entitlement server 109 responsible for issuing and managing license tokens. The license server employs post-quantum cryptographic signing 110—using lattice- or hash-based algorithms—to produce session-bound entitlements 111 that specify permitted fidelity tiers, validity periods, user credentials, and revocation epochs.

Each entitlement is bound to its corresponding tier-map manifest 105 through a canonical hash, creating an immutable association between the licensed content and the granted permissions.

This subsystem collectively ensures that every distributed 3D asset carries verifiable licensing metadata and deterministic fidelity-tier controls, independent of the rendering platform.

7.1.3 Runtime Enforcement Subsystem 100*c*

During playback or rendering, a runtime adapter 112—integrated into game engines or visualization frameworks such as Unity, Unreal Engine, or WebGL—verifies the user's entitlement 111 against the tier-map manifest 105. Upon successful validation, the runtime adapter activates a fidelity control engine 113 that enforces the authorized fidelity level at deterministic frame boundaries, preventing unauthorized upgrades or bypasses of the degradation hierarchy.

The Rendering Pipeline 114 then displays the asset at the permitted fidelity, with the fidelity-control engine ensuring frame-accurate consistency across heterogeneous runtime environments.

This local enforcement operates even under intermittent connectivity, enabling seamless user experience while preserving real-time DRM compliance.

7.1.4 Monitoring and Analytics Subsystem 100*d*

Runtime telemetry and license-verification data are collected by a monitoring system 115, which aggregates behavioral and performance metrics across distributed clients. The monitoring data feed three coordinated analytics modules: machine-learning based anomaly detection 116, billing and revenue analytics 117, and threat-intelligence and revocation services 118.

The anomaly-detection module 116 identifies irregular usage or token-replay patterns and sends adaptive-learning updates to the adversarial-protection engine 107 to reinforce defensive perturbation strategies. The threat-intelligence subsystem 118 can broadcast revocation signals to all runtime adapters 112 when compromised entitlements are detected, ensuring synchronized fidelity downgrades. Billing and revenue analytics 117 quantify legitimate usage and integrate with licensing systems for royalty accounting. In parallel, usage-pattern statistics from the monitoring layer 115 are transmitted back to the license-and-entitlement server 109, enabling dynamic adjustment of licensing policies and revocation epochs based on real-world telemetry.

7.1.5 Closed-Loop Operation

Collectively, the subsystems of content creation and packaging 100*a*, Distribution and Licensing 100*b*, runtime enforcement 100*c*, and monitoring and analytics 100*d* form a closed-loop DRM ecosystem. Data flows sequentially from asset creation through licensing and execution, then returns via telemetry to continuously refine security parameters, perturbation models, and entitlement rules. This architecture maintains continuous license enforcement, cryptographic provenance verification, and adaptive protection throughout the entire asset lifecycle, enabling secure, scalable distribution of 3D content across heterogeneous rendering environments, including traditional gaming applications § 7.0-7.20, cloud and edge-based streaming services § 7.21.2, and persistent virtual world environments as detailed in § 7.21.5.

7.2 Marketplace Upload and Packaging Flow (FIG. 2)

FIG. 2 illustrates the packaging and validation workflow 201 for preparing licensed three-dimensional assets prior to marketplace distribution. A creator upload interface 202 receives a high-fidelity master model that is processed by the DRM packaging module 210. The packaging module automatically produces derivative fidelity tiers 208—for example, Premium 207, Standard 206, and Preview 204—each generated deterministically from the source data.

During this process, the module invokes three coordinated operations: generation of fidelity tiers 208, embedding of forensic fingerprints 209, and application of adversarial protection 211 to produce perturbations that resist model extraction or unauthorized training. During tier generation 208, the system produces five representative tiers in ascending order of fidelity:

- Blocked Tier 203—a 2% wire-frame placeholder;
- Preview Tier 204—a 10% fidelity, ~5 K-polygon model;
- Basic Tier 205—a 30% fidelity, ~15 K-polygon model;
- Standard Tier 206—a 60% fidelity, ~30 K-polygon model with brand identifiers removed; and
- Premium Tier 207—a 100% fidelity master asset (~50 K polygons) containing full brand textures and materials.

Each generated tier contributes to creation of a tier-map manifest 212 that links every variant to a cryptographic hash and corresponding degradation profile. The forensic-fingerprint generator 209 and adversarial-protection engine 211 embed redundant identifiers and perturbations before the manifest is finalized.

In some embodiments, the packaging subsystem implements differential tier storage to minimize storage overhead. Instead of storing full duplicates of each fidelity tier, the system retains a base tier—typically the Premium Tier 207—and differential data for lower tiers. The differential data includes:

- vertex and face-removal indices specifying geometric exclusions;
- texture-down sampling parameters and difference maps;
- material-simplification rules; and
- semantic-element removal lists such as brand identifiers or proprietary features.

At runtime, lower tiers are reconstructed by applying the differential data to the base tier. This approach reduces storage requirements from roughly three times to about 1.25×-1.5× of the base-asset size while preserving deterministic tier generation.

The packaging module optionally produces a provenance record 219, such as a C2PA-compliant assertion, which is validated together with the manifest prior to marketplace listing.

This ensures that every distributed asset carries deterministic tier metadata, a verifiable origin, and a persistent linkage between the marketplace validation and distribution 216 and runtime enforcement.

Prior to marketplace listing, the system performs comprehensive validation checks 213 to confirm asset integrity and DRM readiness. As illustrated, these include:

- (V1) Manifest Present 214: confirmation that the tier-map manifest is present and correctly formatted;
- (V2) All Tiers Generated 215: verification that all required fidelity tiers have been generated according to the degradation hierarchy;
- (V3) Canonical Hash Valid 217: validation of the canonical hash to ensure cryptographic binding between tiers and manifest; and
- (V4) Additional Validation Check 218: verification of cryptographic-signature integrity using the packaging module's private key.

Only assets passing all four validation checks are approved for marketplace distribution, ensuring that every listed asset maintains deterministic fidelity-tier enforcement and verifiable provenance across the content lifecycle.

7.3 Tier Map and Manifest Structure (FIG. 3)

FIG. 3 illustrates the tier-map manifest structure 301 defining relationships among fidelity tiers, canonical identifiers, degradation rules, and cryptographic references used for deterministic runtime enforcement. Five representative fidelity tiers are shown in ascending order of quality:

- Blocked Tier 302—a 2 percent wire-frame placeholder without textures or features, used for unlicensed or blocked content states.
- Preview Tier 303—a 10 percent fidelity model (≈5,000 polygons) with 512 px textures and flat shading sufficient to convey overall form.
- Basic Tier 304—a 30 percent fidelity model (≈15,000 polygons) using 1 K textures and Lambert shading, omitting brand identifiers.
- Standard Tier 305—a 60 percent fidelity version (≈30,000 polygons) with 2 K textures, Phong shading, accurate materials, and colors but brand removal.
- Premium Tier 306—a 100 percent fidelity master asset (≈50,000 polygons) including 4 K textures, physically-based-rendering (PBR) materials, brand logos, and fine-detail reflections.

Dashed upgrade-path connections illustrate the permitted progression from Blocked 302 through Preview 303, Basic 304, and Standard 305 to Premium 306. Each tier represents a quantitative portion of the original asset's fidelity, where fidelity encompasses polygon count, texture resolution, and feature completeness. For example, the Preview Tier 303 at 10 percent fidelity contains approximately one-tenth of the original polygon count with proportionally reduced texture resolution.

The tier-map manifest 301 defines structured relationships among all tiers, degradation rules, and canonical identifiers. Each manifest entry specifies quantitative and semantic parameters such as polygon count, texture resolution, shader capabilities, and optional semantic-degradation masks. The manifest's internal hash chain 308 renders tampering evident and guarantees that identical enforcement policies produce identical runtime behavior across heterogeneous rendering engines.

In one embodiment, the packaging module 210 (from FIG. 2)generates the tier-map manifest 301 as a structured JSON or binary schema compatible with glTF extensions. Each record contains a set of manifest components 307, including a unique tier identifier 309, a canonical hash (e.g., SHA-3-512 or a lattice-based digest) as part of an internal hash chain 308, permitted shader features, and an associated degradation profile 310. The manifest is cryptographically signed using a private key maintained by the license-and-entitlement service 109, ensuring authenticity. During runtime initialization, the client adapter 112 verifies the manifest's post-quantum signature with the corresponding public key and computes a local hash of the loaded asset to confirm integrity before applying the permitted fidelity tier. This deterministic verification ensures cross-runtime consistency, prevents unauthorized manifest substitution, and anchors fidelity control to an immutable canonical reference.

The tier-map manifest follows a structured JSON schema, for example: {"assetId": "SHA3-512 hash", "tiers": [{"tierId": "integer tier identifier", "canonicalHash": "SHA3-512 of tier data" "polygonCount": "integer", "textureResolution": "integer", "degradationProfile": "reference to degradation rules"}], "signature": "PQC signature of manfest"}.

7.4 Runtime Enforcement Sequence (FIG. 4)

FIG. 4 illustrates the runtime entitlement-validation and fidelity-enforcement sequence in which the client runtime adapter 401 interacts with the license server 403, tier-map manifest 402, fidelity-control engine 404, and rendering engine 405 to ensure deterministic, license-governed fidelity transitions. When a protected asset is loaded, the client runtime adapter 401 transmits an entitlement request 407 to the license server 403 identifying the asset ID.

7.4.1 Optional Asset Decryption and Integrity Verification

In some embodiments, assets distributed through the marketplace 108 or content-delivery network 122 are encrypted for confidentiality during storage or transmission. Prior to sending the entitlement request 407, the client runtime adapter 401 decrypts the asset or verifies its integrity using cryptographic checksums or digital signatures. References herein to assets "decrypted and loaded into memory" encompass this optional step, which may involve symmetric or asymmetric decryption, checksum verification, or equivalent integrity validation before entitlement processing. The decryption key or verification token 406 may be stored in a secure enclave or trusted-execution environment to prevent interception or reuse. The license server internally generates a session-bound token 408, digitally signed using post-quantum cryptographic keys in preferred embodiments, or alternatively with classical public-key algorithms such as RSA or ECDSA for backward compatibility, and returns the signed token 409 to the client. Each token contains a session ID, permitted tier, time-to-live (TTL), and a revocation epoch defining the validity window for synchronized downgrade events. Upon receipt, the runtime adapter 401 validates the token signature 410 using the license-server public key, then queries the tier-map manifest 402 for the corresponding asset 411. The manifest responds 412 with tier mappings and canonical hashes linking the local asset files to their integrity references.

The runtime adapter 401 passes the validated token and tier mapping to the fidelity-control engine 404 in a transfer event 413. The engine determines the authorized fidelity tier 414 based on the entitlement and waits for the next frame boundary 415, signaled by the rendering engine 405. At that point, the rendering engine acknowledges readiness 416, and the fidelity-control engine applies the permitted-tier transition 417, and the rendering engine proceeds to render 418 at the authorized fidelity.

7.4.2 Expiration and Revocation Handling

If the entitlement's TTL expires or a revocation epoch broadcast is received, the client adapter compares the local and broadcast epochs. When a mismatch or expiration is detected, the adapter notifies the fidelity-control engine 404. which prepares a downgrade-initiation command 419. The rendering engine confirms receipt 420, and the fidelity-control engine then transitions to a lower fidelity tier 421—for example, from Standard to Preview or Blocked—and commands the renderer to continue rendering at the degraded tier 422. This mechanism provides a graceful, deterministic downgrade that avoids visual artifacts and preserves frame synchronization.

7.4.3 Frame-Boundary Synchronization and Performance

Frame-boundary enforcement ensures that fidelity changes occur only during non-rendering intervals to prevent mid-frame artifacts. The fidelity-control engine 404 maintains two tier states: an active tier currently displayed and a pending tier awaiting a safe transition point. Transitions occur only when: 1) the GPU signals frame completion via a fence or synchronization object, 2) no draw calls remain in flight, and 3) all geometry and texture resources for the target tier are resident in GPU memory. This may be implemented through a double-buffering mechanism, executing transitions during the vertical-blanking interval (VBI) or immediately after GPU command-buffer submission.

Representative simulated performance data are summarized below (illustrative only):

| Tier Transition | Average Latency (ms) | Frame Interval (fps) | Dropped Frames (%) | Artifacts (%) |
|---|---|---|---|---|
| Preview → Standard | 3.4 | 60 | 0.1 | 0 |
| Standard → Premium | 4.7 | 60 | 0.2 | 0 |
| Premium → Standard (downgrade) | 4.1 | 60 | 0.2 | 0 |

Values are simulated or estimated for illustration only and do not represent measured or limiting results These results demonstrate that license-driven tier transitions complete within a single frame cycle—typically under 5 ms—without perceptible visual disruption.

7.4.4 Communication Protocols

Entitlement requests 407-409 use HTTPS to ensure encrypted token exchange.

Revocation signals and real-time synchronization employ WebSocket or MQTT protocols for low-latency broadcast of epoch updates to distributed runtime instances. Together, these communication layers enable secure, sub-frame enforcement response across multiple clients.

7.5 Semantic Degradation Hierarchy (FIG. 5)

FIG. 5 illustrates the semantic-degradation hierarchy applied by the packaging module to generate lower-fidelity asset tiers while preserving brand security and deterministic rendering behavior.

A high-fidelity asset 501—for example, a 50K-polygon model with 4K textures and full brand markings—is processed according to a semantic-degradation strategy 502. This decision logic directs the asset through one of two conceptual paths:

1. an IP-Protection Path 504 prioritizing brand safety and proprietary-content removal, and
2. a Performance Path 503 focused on resource reduction for traditional LOD rendering.

The DRM system exclusively follows the IP-protection path 504; the conventional LOD approach 503 is illustrated but flagged as not used because it retains brand identifiers at reduced quality 505, "IP Vulnerable").

Within the active IP-protection path, degradation proceeds through a defined multistage process:

1. Step 1 506: Remove brand identifiers, logos, trademarks, and proprietary marks from texture maps or surface decals using rule-based filters or segmentation networks trained to detect branded regions.
2. Step 2 507: Remove fine details, such as serial numbers, text, and unique micro-patterns that could permit product re-identification.
3. Step 3 508: Reduce material-shading quality by progressively downgrading shader models from physically based rendering (PBR)→Phong→Lambert→flat shading to eliminate high-frequency reflectance cues.
4. Step 4 509: Reduce texture-map resolution from 4K→2K→1 K→512 px using mip-map generation and quantization thresholds scaled to each fidelity tier.
5. Step 5 510: Simplify geometry by edge-collapse or quadric-error decimation from 50K→30K→15K→5K polygons while maintaining overall silhouette fidelity and limiting shape error to approximately five percent relative to the master model.

Each stage outputs a progressively simplified representation that feeds into one of five defined output tiers 511:

Premium Tier 512: 100% fidelity with all features retained.

Standard Tier 513: ≈60% fidelity with brands removed but overall quality preserved.

Basic Tier 514: ≈30% fidelity using simple materials and reduced detail.

Preview Tier 515: ≈10% fidelity providing a minimal but recognizable representation suitable for catalog or evaluation display.

Blocked Tier 516: ≈2% fidelity consisting only of a bounding box or wireframe placeholder with no textures or distinguishing features, used when no valid entitlement is present.

The hierarchical process ensures that only licensed users can access premium-quality assets, while unlicensed viewers receive degraded or placeholder content. By removing semantic and visual identifiers before geometric or textural simplification, the hierarchy prevents reverse-engineering of branded or proprietary elements. The resulting preview and basic tiers remain recognizable for evaluation yet impossible to upscale reconstructively into the original asset.

7.6 Forensic Fingerprinting Embedding (FIG. 6)

FIG. 6 illustrates the operation of the forensic-fingerprinting engine, which embeds unique, session-specific identifiers across multiple asset carriers using error-corrected encoding to ensure persistent attribution and traceability through downstream transformations.

A packaging module 602 within the asset-packaging system 601 invokes a fingerprint generator 603 that produces a 256-bit session identifier for each protected asset.

The identifier is divided into eight 32-bit sub-blocks, each independently encoded with Reed-Solomon or BCH error-correction codes and embedded redundantly across the following carriers within the error-corrected fingerprint-embedding stage 604:

Geometry topology and vertex order 605,
UV-map coordinates 606,
Texture channels 607, and
Shader parameters 608.

Each encoded sub-block is inserted with twofold redundancy using randomized embedding coefficients derived from a session-specific salt. This randomization guarantees statistical orthogonality among fingerprints generated in different sessions, providing resilience against correlation and template-matching attacks.

The combined fingerprint data propagate through typical transformation-processing stages 609, including mesh decimation and geometry retopology 610, texture compression 611, and file transcoding 612. The mesh-decimation and geometry-retopology process 610 reduces polygon count and reorganizes vertex topology while preserving the overall silhouette and normal-map fidelity, enabling fingerprint persistence even when vertex order or adjacency changes.

Because the fingerprint bits are protected by error-correction coding, the identifiers remain recoverable even after substantial lossy transformations. The resulting rendered asset 613 therefore retains a persistent, error-corrected fingerprint that can be extracted later for forensic verification, authorship validation, or license-compliance audits.

Representative simulated robustness data are shown below (illustrative only):

| Transformation Type | Compression Ratio | Fingerprint Retention (%) | Error-Corrected Recovery (%) |
|---|---|---|---|
| JPEG texture 75% | 4:1 | 98.7 | 100 |
| Mesh decimation 50% | — | 96.4 | 99.9 |
| Geometry retopology | — | 94.1 | 99.5 |
| Texture transcoding (WebP) 2:1 | 2:1 | 97.5 | 100 |

Values are simulated or estimated.

These results indicate that Reed-Solomon encoding with parameters (n=255, k=223, t=16) can correct up to sixteen symbol errors per block, yielding theoretical recovery probability exceeding 99.9% under typical compression or simplification workflows. The embedded identifiers remain visually imperceptible and survive geometric simplification, re-topology, or texture conversion, ensuring enduring forensic traceability across redistribution or modification events.

7.7 Revocation and Downgrade Flow (FIG. 7)

FIG. 7 illustrates the revocation-and-downgrade sequence that maintains synchronized license compliance across distributed runtime environments. A central license server 701 periodically issues revocation-epoch broadcasts 706-708 to all active runtime adapters 702-704 operating on different client devices. Each broadcast contains an updated revocation epoch value digitally signed by the license-and-entitlement service. Messages are transmitted simultaneously to all connected runtimes using lightweight transport protocols—for example, MQTT for mobile-edge or IoT deployments and WebSocket for browser-based runtimes—while initial entitlement exchanges continue to use HTTPS to ensure secure token delivery. Each runtime adapter 702-704 maintains a local epoch counter synchronized with the server's value. Upon receipt, each runtime adapter 702-704 first verifies the broadcast signature and then compares its local epoch counter with the received value. If a mismatch or higher epoch value is detected, the adapter immediately initiates a synchronized downgrade 709-711 to the next-lower authorized fidelity tier as defined in its tier-map manifest. The downgrade operation occurs at the next safe frame boundary or network-tick interval to preserve visual continuity and prevent mid-frame artifacts.

Each adapter logs the event locally and transmits a signed confirmation to the monitoring subsystem to verify that policy enforcement occurred successfully.

This coordinated revocation architecture ensures near-real-time entitlement synchronization across all distributed runtime instances, such that all adapters receive revocation broadcasts substantially simultaneously and perform synchronized fidelity downgrades to maintain consistent license enforcement. Simultaneous broadcasts guarantee that identical fidelity changes take effect on every connected device, preventing unauthorized continued access to premium content once a license is revoked or expired. The process produces an auditable trail of revocation acknowledgments, enabling transparent compliance verification across the DRM ecosystem.

7.8 Adaptive Adversarial Protection (FIG. 8)

FIG. 8 illustrates the adaptive adversarial-protection system 801, which applies imperceptible perturbations to licensed assets during packaging to resist unauthorized machine-learning (ML) model extraction. The system dynamically identifies the type of target ML architecture and injects customized perturbations that degrade model training performance while remaining visually undetectable in legitimate renderings.

Within the adversarial-protection system 801, an Adaptive Adversarial Engine 802 feeds into an ML-architecture-detection module 803, which analyzes the characteristics of potential threat models intercepted from monitoring intelligence.

The engine classifies the target model type 804 as one of several categories—generative adversarial network (GAN), diffusion model, neural-radiance-field (NeRF)/3D model, or generic/unspecified model—and routes processing accordingly. Model-specific perturbation generators produce:

- GAN-specific perturbations 805 optimized to destabilize adversarial discriminator-generator convergence;
- diffusion-specific perturbations 806 that distort denoising gradients and sampling trajectories;
- 3D/NeRF-specific perturbations 807 that alter volumetric sampling and photometric consistency; and
- universal perturbations 808 applicable to unclassified or ensemble models.

Each perturbation stream feeds an embedding strategy module 810, which determines how and where to insert the modifications within the asset's geometric or textural domains.

The embedding strategy then drives two complementary subsystems:

- an imperceptible-modification process 809 that constrains all pixel- or vertex-level deviations to less than 1% of the dynamic range or bounding-box diagonal, and
- a poisoning-pattern generator 811 that injects carefully shaped gradient perturbations designed to corrupt feature-space representations during unauthorized training.

The combined outputs propagate into the protected asset tiers 812, producing deliverables whose licensed renderings remain visually indistinguishable from the originals yet significantly impair model-extraction fidelity. Representative simulated performance data are summarized below (values illustrative only):

| Model Type | Baseline Accuracy (%) | Post-Perturbation Accuracy (%) | Licensed Fidelity Loss (Δ%) |
|---|---|---|---|
| GAN | 99.2 | 61.3 | ≤1 |
| Diffusion | 98.7 | 54.9 | ≤1 |
| NeRF | 97.5 | 49.7 | ≤1 |

Values are simulated or estimated for illustration only.

Perturbations are computed using projected-gradient descent (PGD) constrained to $\varepsilon=0.01$ ($L\infty$norm), limiting changes to approximately 1% of intensity range. For geometric carriers, vertex displacements follow Gaussian noise with $\sigma=0.001\times$bounding-box diagonal; for textures, adversarial patterns employ iterative fast-gradient-sign method (FGSM) with ten iterations and step size $\alpha=0.001$. These parameters maintain deviations below just-noticeable-difference (IND) thresholds while reducing the efficacy of gradient-based training in unlicensed pipelines.

Perturbation parameters are periodically retrained through gradient-based adversarial optimization guided by feedback from the system's monitoring intelligence. This continuous adaptation allows the adversarial-protection engine to evolve against emerging AI architectures, transforming DRM enforcement from a static mechanism into a self-learning, AI-resilient defense layer integrated within the packaging workflow.

Monitoring feedback from the analytics subsystem 115 (see also FIG. 9) is supplied to the adaptive-adversarial-protection engine 107, which retrains perturbation and fingerprinting parameters based on detected anomalies and usage trends. This adaptive feedback loop updates protection strategies applied in subsequent packaging cycles, enabling continuous improvement of resistance to unauthorized model extraction. The adversarial-protection engine 107 operates as an integral element of the overall DRM framework shown in FIG. 1, processing the same entitlement-governed asset data generated by the packaging module 102 and observed by the monitoring and analytics subsystem 115 through shared telemetry channels and configuration interfaces.

7.9 Monitoring and Analytics Flow (FIG. 9)

FIG. 9 illustrates the monitoring-and-analytics subsystem 904-908 that aggregates runtime telemetry, detects anomalies, and provides adaptive policy feedback to other components of the DRM framework. During operation, each runtime adapter 901 records local enforcement activity and transmits two primary data streams:

- fidelity-elevation logs 902 documenting entitlement validations, tier transitions, and frame-time performance; and
- suspicious-access detections 903 identifying repeated token requests, excessive validation failures, or abnormal frame-time profiles.

Both data streams are forwarded to the centralized monitoring-and-analytics system 904, where information is processed and distributed to downstream analytic extensions 905 that include:

- billing and revenue-sharing reports 906 for marketplace reconciliation and usage-based royalty accounting;
- threat-intelligence updates 907 reflecting newly observed attack signatures, replay patterns, or circumvention attempts; and
- machine-learning-based anomaly detection 908, which continuously analyzes telemetry using models such as Isolation Forest, Gaussian-mixture clustering, or autoencoder-based reconstruction to differentiate legitimate behavior from automated scraping or policy circumvention.

Results from the anomaly-detection module 908 feed back into the threat-intelligence system 907 to refine adversarial-protection strategies and update license-server policies. Refined threat-intelligence data are also transmitted to the adaptive adversarial-protection engine 107 identified in FIG. 1, enabling continuous retraining of perturbation parameters and closing the enforcement feedback loop between runtime monitoring and packaging-level defenses. When significant anomalies are detected, automated responses may include temporary throttling, entitlement revocation, or dynamic parameter adjustment at the license-and-entitlement server defined in 109.

Aggregated telemetry also supports usage-based billing 906 for publishers and marketplaces and provides policy-audit data confirming that runtime adapters have executed synchronized downgrades and entitlements as required. The monitoring subsystem therefore functions as both an enforcement verifier and an analytics hub, closing the feedback loop between runtime behavior and adaptive DRM policy control. By integrating real-time anomaly detection with financial and threat-intelligence reporting, the system maintains continuous compliance, enhances adversarial robustness, and improves royalty-tracking accuracy across the distributed deployment ecosystem.

7.9.1 Adaptive Threat-Feedback Embodiment

In certain embodiments, the monitoring and analytics subsystem 116 operates cooperatively with the adaptive-adversarial-protection engine 107 and the packaging module 102 to form a closed feedback loop that continually improves resistance to unauthorized model extraction. Each runtime adapter 112 periodically transmits anonymized telemetry describing fidelity-tier violations, fingerprint-removal attempts, or rendering anomalies indicative of adversarial activity. The monitoring subsystem aggregates this telemetry and applies clustering, anomaly-classification, or gradient-based optimization to identify evolving threat patterns. The resulting threat descriptors are transmitted to the adaptive-adversarial-protection engine 107, which generates revised perturbation vectors, poisoning profiles, or fingerprint parameters optimized against the detected model architectures. These updated parameters are supplied to the packaging module 102 for incorporation into subsequently packaged assets, thereby producing new distributions with adaptive protective characteristics. The feedback loop may execute asynchronously through cloud-hosted services or local training nodes and can operate at periodic intervals or on demand in response to detected anomalies. This continuous-learning architecture enables dynamic refinement of protection parameters across successive packaging cycles while preserving licensed visual fidelity for authorized users.

The enablement of the runtime entitlement validation, packaging, and monitoring subsystems described in this section builds upon and further elaborates the corresponding embodiments disclosed in U.S. Provisional Patent Application No. U.S. Provisional Patent Application No. 63/892,040, filed on Oct. 2, 2025, titled "Digital Rights Management System for Three-Dimensional Assets with Adaptive Adversarial Protection", which is incorporated herein by reference in its entirety. The present disclosure extends those teachings to include expanded runtime-adapter interactions, authenticated API communication, and adaptive protection mechanisms consistent with the originally filed disclosure.

7.10 Offline and Edge Enforcement (FIG. 10)

FIG. 10 illustrates the offline- and edge-enforcement workflow that enables deterministic license validation in limited-connectivity environments. A license server 1001 pre-issues short-lived, cryptographically signed entitlements that are downloaded to a client device 1002 before entering a disconnected or low-bandwidth state. Each entitlement is stored within a local entitlement store 1003 bound to the device's unique hardware identity and session context. The entitlements are digitally signed using post-quantum-secure algorithms, such as CRYSTALS-Dilithium or SPHINCS+, ensuring that validation can be performed locally without access to the network.

During offline operation, the runtime adapter 1004 retrieves the cached entitlement from the local store 1003, verifies its signature against an embedded public key, and enforces the permitted-tier policy through the fidelity-control engine 1005. The fidelity-control engine applies deterministic tier selection at frame boundaries and drives the rendering process 1006 to display the authorized fidelity level. All validation, downgrade, and integrity-check logic execute entirely within the client device 1002, enabling continuous operation even when the license server is unreachable.

In certain embodiments, the local entitlement store 1003 may reside within an attested hardware environment, such as a trusted-execution environment (TEE) or secure enclave, which isolates cryptographic material from untrusted application code. The entitlement token and associated private keys are stored in hardware-protected memory, accessible only through attested API calls. This configuration prevents tampering or extraction of offline tokens and ensures that entitlement validation occurs inside a verified, integrity-checked runtime boundary, consistent with the secure-processing approaches described in FIG. 6. When connectivity is restored, the runtime adapter 1004 re-establishes a secure session with the license server 1001 to renew expired entitlements and upload accumulated telemetry, event logs, and revocation acknowledgments for reconciliation.

Note: For clarity, the monitoring-and-analytics subsystem shown in FIG. 1 and FIG. 9 is not illustrated here; however, it receives the deferred telemetry data once synchronization resumes, ensuring full auditability and historical traceability of offline enforcement events.

This configuration provides uninterrupted DRM enforcement for mobile-edge nodes, simulation systems, and secure field devices while maintaining cryptographic integrity, verifiable provenance, and complete audit recovery upon reconnection.

7.11 Cross-Platform Runtime Enforcement (FIG. 11)

FIG. 11 illustrates cross-platform runtime enforcement of license-tiered digital rights management (DRM) across heterogeneous rendering environments. The figure demonstrates how a single packaged asset 1101—containing a tier-map manifest 1105 with canonical hashes and degradation profiles—is consistently interpreted by runtime adapters integrated into different graphics engines.

The packaged asset 1101 and its associated canonical tier map 1105 are distributed to each supported platform. Each runtime environment implements a platform-specific runtime adapter that adheres to a shared entitlement-validation and fidelity-enforcement protocol, ensuring deterministic behavior regardless of the rendering engine or hardware configuration.

- In a WebGL environment 1102, the WebGL runtime adapter 1103 validates any existing entitlement and enforces the Standard-tier rendering 1104 when the entitlement grants mid-level fidelity rights.

In a Unity environment 1109, the Unity runtime adapter 1110 operates under the same DRM protocol but, when no entitlement is present, renders the Preview tier 1111—a low-fidelity, limited-detail representation suitable for evaluation or public catalog display.

In an Unreal Engine environment 1106, the Unreal runtime adapter 1107 validates a full license entitlement and executes Premium-tier rendering 1108, displaying the asset at maximum fidelity with all textures, materials, and geometry intact.

Each adapter performs local entitlement verification using the same canonical tier-map manifest 1105 and a shared public key derived from the license server, guaranteeing that identical entitlements produce identical rendering outcomes across all supported engines. In some embodiments, each runtime adapter incorporates a shared validation library distributed as part of the DRM SDK. This library implements standardized cryptographic routines, manifest-parsing logic, and entitlement-verification functions, ensuring byte-for-byte identical enforcement behavior across engines. By unifying the validation layer, compliance can be verified through cross-platform audits, and developers can integrate DRM enforcement with minimal customization or maintenance overhead.

This unified enforcement protocol decouples DRM operations from the engines' native LOD, shader, or material systems. As a result, platform-specific optimizations—such as Unity's dynamic batching, Unreal's Nanite or virtual texture streaming, or WebGL's shader simplification—do not alter license-governed fidelity enforcement.

The system ensures that tier-based fidelity gating remains deterministic across engine and hardware boundaries. Perturbations and fingerprinting embedded during packaging (see FIG. 6) are designed to persist under variable rendering conditions, including resolution scaling from 0.1× to 10× and automatic LOD switching common in real-time graphics environments. This consistency prevents users from gaining higher-quality visual output through engine-level or hardware-specific optimizations.

From an integration perspective, implementing each runtime adapter 1103, 1107, 1110 requires minimal development effort—typically two to five developer-days per platform—using the provided SDK, documentation, and sample bindings. Integration complexity is comparable to incorporating standard middleware components such as analytics or anti-cheat modules, as the DRM adapter functions through lightweight API calls (validateToken( ), getPermittedTier( ), and enforceTier( )) standardized across platforms. Collectively, the cross-platform runtime enforcement architecture ensures policy uniformity, content integrity, and license compliance throughout the 3D content ecosystem, regardless of the rendering engine or execution environment.

7.12 Gaming System with Multiple Devices (FIG. 12)

FIG. 12 illustrates a representative networked gaming environment in which players 1201 are equipped with multiple heterogeneous client devices—such as gaming personal computers 1204, mobile devices 1203, and virtual- or mixed-reality headsets 1202—each executing local instances of the DRM runtime architecture. Every device contains a runtime adapter 1211, a fidelity-control engine 1210, and a rendering engine 1209 integrated into the host game engine (Unity, Unreal, or XR). These modules enforce identical entitlement-validation and fidelity-tier policies across platforms, ensuring that all participants render assets at license-defined fidelity levels regardless of hardware capability.

7.12.1 Marketplace and Identity Services 1200-1213

Players authenticate through an identity provider 1212, which verifies user credentials and transmits authentication assertions to the license-and-entitlement server 1215. A marketplace and license-management portal 1213 interfaces with both the entitlement server 1215 and the packaging module 1218 to issue and distribute digital licenses corresponding to each player's purchased assets or subscription tier.

7.12.2 Client Runtime Modules 1208

Once authenticated, each client device executes the runtime adapter 1211 that validates local entitlements against the tier-map manifest embedded in the packaged asset. The runtime adapter coordinates with the fidelity-control engine 1210 to enforce authorized fidelity tiers and applies deterministic transitions only at frame boundaries. The rendering engine 1209 then draws the approved tier, producing consistent visual results across devices. All runtime adapters continuously log entitlement checks, tier transitions, and anomalies, transmitting this telemetry to the monitoring and analytics service 1216.

7.12.3 DRM Back-End and Game Infrastructure 1214-1221

The DRM back-end 1214 includes the license-and-entitlement server 1215, monitoring and analytics system 1216, adaptive adversarial-protection engine 1217, and the packaging module 1218 responsible for generating fidelity tiers and canonical manifests.

These services are integrated with game servers 1219 that handle matchmaking, gameplay synchronization, and session management through the game-server cluster 1220 and a content-delivery network (CDN) 1221 for asset distribution. The game server verifies each player's entitlement with the license server 1215, issues a short-lived session identifier, and transmits it to all connected runtime adapters. Each adapter validates this identifier together with the entitlement token, ensuring that the rendered fidelity tier matches the user's license.

To maintain synchronization during multiplayer sessions, fidelity-control engines 1210 on all clients queue tier transitions and fingerprint updates for execution only at frame boundaries or discrete network-tick intervals (typically 30-60 Hz). This scheduling prevents mid-frame discrepancies between players and guarantees visually coherent gameplay. Telemetry from all clients flows to the monitoring system 1216, which aggregates logs, detects anomalies, and provides real-time dashboards for publishers and operators. Detected irregularities—such as token-replay attempts or abnormal validation frequencies—trigger automated revocation or throttling policies.

The adaptive adversarial-protection engine 1217 uses this monitoring data to retrain perturbation profiles, feeding updates back to the packaging module 1218 for future asset protection cycles. Secure communication between devices and servers employs mutually authenticated channels combining post-quantum key-exchange protocols (e.g., Kyber) with TLS encryption, consistent with the cryptographic framework established in FIG. 1.

7.12.4 Executable-Level Protection and Developer Integration 1205-1207

Game developers 1205 produce the compiled game binary and downloadable content 1206, which may incorporate executable-level DRM 1207 such as anti-tamper or anti-cheat middleware. The executable DRM system exchanges session identifiers with the license server 1215 to synchronize entitlement scope and runtime enforcement, ensuring that both binary- and asset-level protections operate in parallel. Content delivery to clients occurs through the CDN 1221, which caches tiered assets generated by the packaging module 1218 and delivers only the authorized variants to each runtime adapter 1211.

7.12.5 Asymmetric Entitlement Example

In a shared multiplayer session, asymmetric licensing may apply.

A player with a premium entitlement renders high-fidelity character models and full-resolution textures through the premium tier, while other players with standard entitlements view simplified versions of the same assets. The runtime adapter and fidelity-control engine automatically enforce these per-user differences while maintaining synchronized animation, geometry, and lighting parameters so that scene integrity and gameplay balance remain intact.

This architecture enables consistent license-tiered fidelity enforcement, provenance attribution, and analytics collection across diverse gaming hardware. It establishes seamless interoperability between marketplace systems, identity providers, runtime modules, and DRM back-end infrastructure, providing an end-to-end technical solution for secure, auditable, and cross-platform asset licensing within real-time multiplayer ecosystems.

7.13 Adversarial Protection Against AI Training (FIG. 13)

FIG. 13 illustrates an embodiment of the adversarial-protection system configured to defend against unauthorized machine-learning (ML) pipelines that attempt to extract, replicate, or retrain protected digital assets. A high-fidelity asset 1301 enters the packaging module 1302, which generates licensed fidelity tiers and associated metadata as described in earlier figures.

Before distribution, the adaptive adversarial-protection engine 1303 applies targeted perturbations and gradient-poisoning patterns to create protected asset tiers 1305 containing embedded defenses across geometric, textural, and shading domains. After packaging, the protected tiers are directed to a usage-path selection module 1306, which determines whether the asset will follow the licensed or unlicensed operational path. Element 1306 evaluates entitlement status, token validity, and runtime context; its output selects between Path A and Path B.

The protected tiers follow two distinct operational paths:

- Path A—Licensed Use: When accessed by an authorized client possessing a valid entitlement, the protected asset 1305 is processed through the licensed rendering path 1307. In this path, perturbations remain visually imperceptible and are neutralized at render time, producing a clean visual output 1308 that preserves full fidelity for the legitimate user.
- Path B—Unauthorized Use: When the same protected asset is captured or scraped and subsequently used without entitlement—such as for training within a generative model, diffusion system, or neural-radiance-field (NeRF) pipeline 1310—the embedded perturbations become active. They induce gradient instability, color-space shifts, and weight corruption within the ML model, producing degraded or corrupted model outputs 1309 that exhibit structural artifacts or convergence failure.

A monitoring feedback channel continuously observes model-extraction events and collects quantitative degradation metrics, including Structural Similarity Index (SSIM) and Frechet Inception Distance (FID), comparing outputs from licensed and unlicensed contexts. If degradation falls below a defined protection threshold, the adaptive adversarial engine 1303 synthesizes updated perturbation parameters through gradient-based adversarial retraining and injects them into subsequent packaging cycles. This closed-loop optimization 1309→1303 ensures that the perturbation library evolves alongside emerging ML architectures and attack methods, maintaining long-term defensive efficacy.

In some embodiments, the adaptive adversarial engine employs projected-gradient-descent (PGD) or fast-gradient-sign-method (FGSM) techniques with bounded norms (e.g., $L\infty \leq 0.01$) and randomization across multiple latent domains. These constraints guarantee that perturbations remain below just-noticeable-difference (JND) thresholds during authorized rendering while causing measurable divergence—often exceeding 30-50% SSIM loss—in unauthorized ML reconstructions. The engine may also employ stochastic parameter sampling or ensemble perturbation training to improve generalization across GAN, diffusion, and transformer-based architectures.

Through this adaptive feedback mechanism, the adversarial-protection subsystem transforms DRM from a static safeguard into a self-learning, AI-resilient security layer. It maintains full visual fidelity for licensed use while continually degrading the utility of assets in unlicensed or adversarial ML training contexts.

In certain deployments, the monitoring subsystem defined in FIG. 9 interfaces directly with the adversarial-protection engine 1303 to supply real-world telemetry from attempted ML extractions. These data augment synthetic training sets used for retraining perturbation generators, enabling semi-supervised adaptation based on observed attack vectors.

7.14 Integrated System Architecture (FIG. 14)

FIG. 14 illustrates an integrated, multi-layer DRM architecture combining executable-level and asset-level protections into a unified content-protection workflow. The system operates through three coordinated strata: the Runtime Player Layer 1401, the DRM Backend Layer 1405, and the Distribution Layer 1412, all connected through authenticated, cryptographically secured interfaces. The figure further shows the Adaptive Feedback Loop linking Adversarial Protection Engine 107, Monitoring Subsystem 115, and Packaging Module 102, reinforcing that all modules form a single coordinated DRM system.

7.14.1 Distribution Layer 1412

At the top level, the distribution layer 1412 encompasses external ecosystems where assets are listed, licensed, and delivered. A marketplace for asset distribution 1413 handles user licensing transactions and entitlement requests. Each asset distributed through the marketplace carries both a canonical tier-map manifest and an optional provenance-metadata record 1415 such as a C2PA assertion, providing an auditable link between creator identity, asset integrity, and downstream use. The packaging module 1409 within the DRM backend transmits these artifacts to the marketplace through secure APIs. When a purchaser acquires an asset, the marketplace 1413 requests a signed entitlement from the license-and-entitlement server 1406 to bind the commercial transaction to the canonical identifiers defined in the manifest.

An optional executable-level DRM subsystem 1414, integrated with the distributed game binary, prevents unauthorized program execution and complements the asset-level protections described herein. Collectively, the distribution layer ensures cryptographic continuity between purchase records, provenance metadata, and runtime enforcement.

7.14.2 DRM Backend Layer 1405

The DRM backend 1405 coordinates all core enforcement services, including the license-and-entitlement server 1406, monitoring-and-analytics subsystem 1407, adaptive adversarial-protection engine 1408, and the packaging module 1409. These components function as distributed microservices communicating through mutually authenticated channels using signed JSON or Protocol-Buffers messages. The license server 1406 issues short-lived, session-bound entitlements embedding the manifest hash, permitted fidelity tier, and revocation epoch. The monitoring subsystem 1407 collects telemetry from all runtime adapters 1402, aggregates entitlement and anomaly data, and forwards summarized insights to both the license server 1406 and the adversarial-protection engine 1408. The adaptive adversarial engine 1408 retrains its perturbation and fingerprinting parameters based on detected threat signatures, while the packaging module 1409 incorporates the updated parameters into subsequent packaging cycles—creating a continuous feedback loop between live runtime observations and future asset releases. The adaptive-adversarial-protection engine 107 receives monitoring feedback 116 and packaging parameters 102 to update perturbation profiles within the same license-tiered enforcement framework.

7.14.3 Runtime Player Layer 1401

At the client side, the runtime player 1401 executes a runtime adapter 1402 integrated into engines such as Unity, Unreal, or WebGL. The adapter validates the user's entitlement with the license server 1406, invokes the fidelity-control engine 1403 to enforce the permitted tier, and outputs frames through the rendering engine 1404. Runtime events—including validation results, tier transitions, and suspected tampering attempts—are reported back to the monitoring subsystem 1407. Revocation messages and updated policies from the backend propagate downstream through lightweight messaging protocols (e.g., MQTT or WebSocket) to ensure synchronized fidelity downgrades across all active clients. This bidirectional information flow preserves a verifiable linkage between the licensed runtime session and the originating entitlement and manifest data.

7.14.4 Executable Integration and Developer Context

Game developers 1410 produce game binaries and downloadable content 1411, which may incorporate executable-level DRM 1414 such as anti-tamper modules or platform DRM frameworks. These binaries interface with the runtime player 1401 and rendering engine 1404, ensuring that both the executable and in-memory assets are governed by complementary protection layers. The result is a dual-layer model that extends DRM enforcement from software launch through live asset rendering.

7.14.5 System Summary

The integrated system of FIG. 14 demonstrates that the disclosed invention functions not as an isolated asset-DRM mechanism but as a comprehensive, interoperable framework spanning creation, licensing, runtime, and monitoring. By linking provenance metadata 1415, marketplace transactions 1413, entitlement issuance 1406, runtime fidelity enforcement 1403, and adaptive protection 1408 within a single architecture, the system achieves deterministic fidelity control, adaptive AI resistance, and auditable license compliance across the global 3D content ecosystem. This model aligns executable-level protection with asset-level DRM, securing both binaries and 3D assets under a unified enforcement lifecycle.

7.15 Combined Content Protection Flow (FIG. 15)

FIG. 15 illustrates a combined content-protection workflow in which conventional executable-level DRM operates in parallel with the asset-level DRM architecture disclosed herein. The figure represents an end-to-end sequence extending from initial asset creation and packaging to secure execution, runtime enforcement, and monitoring feedback.

A creator 1501 supplies a high-fidelity three-dimensional asset to the packaging module 1502. The packaging module produces multi-tier fidelity variants, a signed tier-map manifest, and optional provenance metadata 1503—for example, a C2PA assertion. The provenance data and manifest are transmitted to a digital marketplace 1504, which handles listing, purchase, and entitlement issuance. When a user acquires a license, the marketplace interfaces with the license-and-entitlement server 1505 to request a signed entitlement aligned with the manifest's canonical identifiers. The licensed user 1508 represents the authorized player or purchaser who receives that entitlement from the marketplace 1504 and subsequently launches the protected executable.

In parallel, a game developer 1506 compiles the game binary and downloadable content 1507 protected by an executable-level DRM system 1510 such as Denuvo, Steam DRM, or an equivalent anti-tamper framework. The protected executable references only encrypted asset identifiers rather than raw asset data. During build time, the executable embeds a manifest pointer or hash linking to the corresponding packaged-asset bundle generated by the packaging module 1502. Thus, when the executable DRM later validates the binary, it implicitly authenticates the associated asset manifest.

When the user launches the game, the executable DRM 1510 verifies the integrity of the game binary 1507 and establishes a secure session context containing a cryptographic nonce or session ID. This identifier is shared with the runtime adapter and fidelity-control subsystem 1509 via SDK or inter-process interface calls. The runtime adapter appends the session ID to entitlement requests directed to the license-and-entitlement server 1505, thereby cryptographically binding the authenticated binary session to the corresponding asset-level license. If an attacker circumvents the executable DRM, the runtime adapter detects a mismatch between the session ID and the entitlement signature, preventing access to premium tiers or fidelity elevation.

Within the running game engine 1511, the runtime adapter 1509 enforces the permitted fidelity tier through its integrated fidelity-control logic. The executable-level DRM 1510 continues to monitor process integrity and detect memory tampering, while the asset-level DRM governs deterministic fidelity control, forensic fingerprinting, and adaptive adversarial protection of assets. The two layers exchange minimal metadata—principally the session ID and validation timestamp—to maintain linkage without exposing cryptographic secrets. Both layers operate asynchronously: a binary remaining authorized does not override an expired asset entitlement, and an asset downgrade does not halt binary execution. For example, when an entitlement expires, the runtime adapter triggers a graceful downgrade of asset fidelity even while the executable remains valid.

The monitoring-and-analytics subsystem 1512 receives telemetry from the game runtime environment 1511, including entitlement-validation events, fidelity transitions, and detected anomalies. These data are fed back to the packaging module 1502 to inform future adversarial-protection and fingerprinting updates, completing a closed feedback loop from runtime observation to packaging.

This dual-layer configuration provides comprehensive protection across both the software domain and the content domain:

The executable-level DRM 1510 safeguards code integrity, process security, and anti-tamper assurance. It secures the program binary.

The asset-level DRM 1509 is responsible for enforcing license-tiered fidelity, validating entitlements, and providing telemetry feedback.

Together, these layers form a unified architecture that links binary authorization, asset licensing, and monitoring analytics, ensuring continuous, auditable protection from build creation through user interaction.

7.16 AI/ML Monitoring Extension (FIG. 16)

FIG. 16 illustrates the AI- and machine-learning-based monitoring extension 1601, which enhances the DRM system's analytics framework (previously introduced in FIG. 1 elements 115-118 and detailed in FIG. 9) with automated anomaly detection, predictive analytics, and adaptive response logic.

Telemetry originates from the runtime adapter 1602, corresponding to the runtime-adapter subsystem 112 in FIGS. 1 and 901 in FIG. 9. During gameplay or rendering, the adapter records usage logs 1605 describing entitlement validations, fidelity-tier transitions, frame-time variance, and network-call signatures. These logs are forwarded to the monitoring-and-analytics core 1606—the same core monitoring service shown as 115 in FIGS. 1 and 904 in FIG. 9—where the data are normalized, timestamped, and cryptographically signed before being supplied to the machine-learning extension layer 1601.

Within the ML-extension layer, historical-pattern classifiers 1604 are trained on aggregated runtime logs to recognize characteristic usage profiles across engines, platforms, and entitlement tiers. The classifiers feed their feature outputs to an anomaly-detection module 1603 that identifies deviations suggesting scraping, automated bot activity, fraudulent license reuse, or abnormal rendering behavior. When a deviation exceeds the adaptive threshold, the adaptive-response subsystem 1607 initiates one or more countermeasures, such as:

- entitlement revocation through the license-and-entitlement server 109 in FIG. 1,
- rate-limiting or temporary throttling of suspicious clients, and
- real-time policy updates delivered to the adaptive adversarial-protection engine 107 in FIG. 1 for retraining of perturbation and fingerprinting parameters. The adaptive-adversarial-protection engine 107 receives monitoring feedback 116 and packaging parameters 102 to update perturbation profiles within the same license-tiered enforcement framework.

Each automated response is reported back to the monitoring core 1606, closing the feedback loop between anomaly detection and enforcement verification. This same loop is depicted at a higher level in FIG. 9, where ML-based anomaly outputs 908 feed into the threat-intelligence module 907 and back to the license and adversarial-protection services. The FIG. 16 embodiment therefore represents the detailed internal operation of that ML-driven subsystem, showing the specific classifier, detection, and adaptive-response stages.

To preserve integrity and confidentiality, all telemetry exchanges and response commands are secured using post-quantum-resistant cryptography compliant with the NIST PQC standardization suite. Entitlements and manifests employ CRYSTALS-Dilithium or SPHINCS+ digital signatures, while Kyber key-encapsulation ensures encrypted communication between the monitoring core 1606 and the license server 109 in FIG. 1. These primitives provide forward-secure, quantum-resistant authentication without changing the operational flow of entitlement issuance or validation. Functionally equivalent PQC algorithms may be substituted as standards evolve, preserving interoperability with existing entitlements.

In operation, the ML-extension layer 1601 continually retrains its classifiers 1604 using validated telemetry from the monitoring core 1606. This iterative process allows the system to refine detection thresholds, predict emerging exploit patterns, and update countermeasure parameters dynamically. Through this integration, the monitoring subsystem evolves from a static logging service (as originally depicted in FIG. 1) into a self-adapting, AI-resilient intelligence network that proactively strengthens license enforcement and content integrity across all connected runtime environments.

7.17 Post-Quantum Cryptography Flow (FIG. 17)

FIG. 17 illustrates an optional embodiment of a PQC workflow that secures entitlement, manifest, and session exchanges within the DRM framework. This subsystem ensures that every license transaction, entitlement token, and tier-map manifest remains verifiable and tamper-proof even against future quantum-capable adversaries.

The process begins at the license-and-entitlement server 1701, which issues cryptographically signed entitlements using lattice-based or hash-based algorithms, such as CRYSTALS-Dilithium or SPHINCS+. In parallel, the packaging module 1702 generates a tier-map manifest containing canonical hashes and degradation policies and signs it with a PQC hash or digital signature 1704. Together, these form two independent yet interoperable security anchors: one protecting license entitlements and the other safeguarding asset-integrity metadata.

The entitlement signature 1703 and manifest signature 1704 are transmitted to a distribution system or marketplace 1705 that delivers the paired package to end-user runtimes. When a user downloads or launches the content, the runtime adapter 1706 receives both the entitlement and manifest, performing signature-verification routines 1707 before enabling rendering. Only after successful validation does the runtime adapter activate the fidelity-control engine 1708, which enforces the permitted tier, revocation epoch, and degradation rules specified in the manifest.

Verification occurs locally within the runtime adapter, ensuring independence from network conditions and providing forward-secure authentication. Even if classical public-key schemes (e.g., RSA or ECDSA) were compromised, the PQC layer would maintain entitlement authenticity and prevent replay or forgery.

In some embodiments, Kyber or functionally equivalent PQC key-encapsulation mechanisms are used for secure session establishment between the runtime adapter and license server, complementing TLS to achieve hybrid post-quantum communication channels.

Representative SDK interfaces implementing this verification flow include:

```
bool validateToken(string entitlement, string manifestHash);
int getPermittedTier(string assetID);
void enforceTier(string assetID, int tierLevel);
```

Each function returns standardized status codes and records validation results to the monitoring subsystem (see FIG. 9, 1606), enabling anomaly tracking and compliance auditing. Language-specific bindings in C#, C++, and JavaScript provide equivalent implementations across Unity, Unreal, and WebGL runtimes. Error-handling routines and asynchronous callbacks allow these verification calls to execute non-blocking within the rendering pipeline, so that PQC validation completes transparently during frame preparation without introducing perceptible latency.

7.17.1 Cross-Figure Integration

The PQC workflow of FIG. 17 underlies the cryptographic exchanges shown across multiple figures.

In FIG. 1, the PQC algorithms correspond to the secure-signature and key-exchange processes used by the license server 109 and packaging module 105.

In FIG. 9 and FIG. 16, the same primitives secure telemetry and anomaly-response commands between the monitoring core 904/1606 and license server 1701.

In FIG. 15, PQC signatures ensure that session identifiers shared between executable- and asset-level DRM layers cannot be forged or reused.

By standardizing all license, manifest, and monitoring communications on PQC primitives, the invention provides quantum-resilient continuity of trust from packaging through runtime enforcement and analytics. While the PQC implementation described herein represents a forward-secure embodiment, the system can alternatively employ classical cryptographic algorithms (for example RSA, ECDSA, or Ed25519) without departing from the inventive concepts of license-tier enforcement and deterministic fidelity control.

7.18 SDK Runtime Adapter Architecture (FIG. 18)

The SDK delivers standardized runtime libraries for Unity (C#), Unreal Engine (C++ or Blueprints), and WebGL (JavaScript or WebAssembly). Each implementation exposes a uniform set of APIs—validateToken( ), getPermittedTier( ), and enforceTier( )—that integrate license validation and fidelity enforcement 1807 directly into the rendering pipeline while maintaining frame-boundary synchronization.

FIG. 18 illustrates the SDK Runtime Adapter Architecture, which provides standardized DRM enforcement libraries for heterogeneous rendering environments. The SDK operates as the client-side enforcement layer that implements entitlement validation, manifest verification, and frame-synchronized fidelity control within the rendering pipeline.

Three platform-specific SDK implementations are shown: the Unity SDK 1801 written in C# for the .NET runtime 1802 the Unreal SDK 1803 implemented in C++ or Blueprints 1808, and the WebGL SDK 1817 written in JavaScript or WebAssembly 1810. Each implementation integrates the same runtime-adapter core components 1804 and exposes a uniform API surface 1811 that enables deterministic, cross-platform behavior.

7.18.1 Runtime Adapter Core Components 1804

The core architecture comprises three primary subsystems:

1. Entitlement Validation Module 1805—communicates with the license-and-entitlement server 109, 1701 to acquire, validate, and renew session-bound tokens. Tokens are stored in encrypted buffers isolated by platform-specific trusted-execution environments (TEEs) or secure enclaves, preventing key interception or replay.
2. Manifest Lookup Service 1806—verifies that the locally loaded asset matches the canonical tier-map manifest by computing local hashes and validating them against the PQ-signed manifest generated by the packaging module (see FIG. 17).
3. Fidelity-Enforcement Controller 1807—coordinates with the rendering engine to apply the fidelity level permitted by the entitlement, queueing tier transitions until safe frame-boundary synchronization points 1815.

The SDK's exposed API layer 1811 provides three standardized functions: validateToken( ), getPermittedTier( ), and enforceTier( ).

These calls integrate directly into engine render loops to ensure real-time, license-driven quality control. Validation and enforcement results are logged and transmitted asynchronously to the monitoring and analytics subsystem (FIG. 9, 1606) using WebSocket or MQTT channels, supporting near-real-time anomaly detection and adaptive protection updates (FIG. 16).

7.18.2 Engine-Specific Integration 1812

Each engine connects through its respective rendering pipeline:

Unity Rendering Pipeline 1813—integrates via a custom RenderPipelineAsset or ScriptableRenderFeature that intercepts command-buffer submission to apply the licensed fidelity tier.

Unreal Rendering Pipeline 1814—employs a UAssetDRMComponent registering pre-render callbacks through Blueprint or C++ interfaces.

WebGL Canvas Renderer 1816—uses a JavaScript adapter that hooks mesh-loading and texture-binding events to apply permitted tiers prior to GPU submission.

All engines output frame-boundary fidelity control 1815 to guarantee artifact-free transitions.

7.18.3 Cross-Platform Consistency and Extensibility

The SDK architecture 1809 ensures parity of enforcement across engines and operating systems, maintaining identical fidelity outcomes for identical entitlements-consistent with the deterministic enforcement principle established in FIG. 1. It also provides a plug-in registration interface through which third-party engines can implement the same entitlement protocol, independent of graphics API (DirectX, Vulkan, Metal, OpenGL). Build scripts and editor plug-ins supplied with the SDK automate manifest signing and packaging, ensuring traceability through provenance records (C2PA assertions) introduced in FIG. 14.

7.18.4 Security and Telemetry Features

To ensure resilience, each SDK instance implements multi-layer tamper resistance, including:

1. Code-obfuscation via control-flow flattening and string encryption;
2. Runtime integrity checks comparing in-memory code sections against signed checksums;
3. Anti-debugging detection using timing analysis and debugger traps; and
4. Certificate pinning for all server communications.

Any tampering or validation anomaly triggers automatic tier downgrade and telemetry reporting to the monitoring service FIG. 9, 1606, ensuring immediate detection of compromised clients. Telemetry channels also record validation frequency, tier changes, and anomaly scores, feeding the ML-based analytics and adaptive response systems 1603-1607.

7.18.5 Operational Flow

During execution, each platform SDK 1802, 1808, 1810 invokes the core modules 1804 to validate entitlements, verify manifests, and enforce fidelity control. API calls 1811 then interact with the target rendering engines 1812 to produce frame-synchronized, license-compliant visuals. This process ensures that runtime behavior, rendering quality, and telemetry generation remain deterministic across all supported engines.

7.19 Runtime Adapter API Interfaces (FIG. 19)

FIG. 19 illustrates the runtime-adapter API layer that defines the standardized software interface through which client applications interact with the DRM framework. The figure expands the SDK implementation shown in FIG. 18, detailing the specific function groups and their linkages to the backend services 1919—the license service 1922, manifest store 1921, and monitoring system 1920—previously described in FIG. 1.

7.19.1 Client and API Hierarchy

A client application 1901, such as a game or rendering engine 1902, communicates with the runtime-adapter API layer 1903. The API layer is subdivided into four functional domains:

1. Authentication APIs 1904-1907—Handle entitlement acquisition and verification.
   - validateToken 1905: Accepts a serialized entitlement and manifest hash, verifies the post-quantum signature (CRYSTALS-Dilithium/SPHINCS+), and returns a structured status object indicating validity, permitted tiers, and expiration epoch.
   - refreshToken 1906: Renews a valid token without full re-authentication, updating its time-to-live.
   - checkRevocation 1907: Confirms the current revocation epoch with the license server 1922 to ensure the entitlement remains active.
2. Query APIs 1908-1910—Retrieve entitlement and manifest information.
   - getPermittedTier 1909: Returns the highest authorized fidelity level for the specified assetID from the local entitlement cache.
   - getManifest 1909 Fetches and validates the canonical tier-map manifest from the manifest store 1921.
   - getTierProperties 1909, 1910: Provides metadata for a given tier polygon count, texture resolution, and feature flags enabling adaptive resource allocation in-engine.
3. Enforcement APIs 1911-1914—Control fidelity transitions at runtime.
   - enforceTier 1912, 1913: Invokes the fidelity-control engine (see FIG. 18, 1807) to apply the licensed tier at the next frame boundary.
   - downgradeTier 1912: Manually reduces tier level for bandwidth or policy reasons before revocation.
   - lockFidelity 1912, 1914: Temporarily freezes tier transitions during critical render passes to ensure visual stability.
4. Monitoring APIs 1915-1918—Support telemetry and security reporting.
   - logUsageEvent 1916, 1917: Records entitlement and rendering events for analytics aggregation.
   - reportAnomaly 1918: Sends detected misuse patterns directly to the monitoring system 1920, bypassing normal telemetry batching for immediate response.

Each function operates asynchronously within the render loop to avoid blocking frame generation, leveraging callback hooks such as onTierChange, onTokenExpired, and onFingerprintEmbedded for real-time engine integration.

7.19.2 Backend Linkages and Security Context

The authentication APIs 1904 communicate with the license service 1922 for token validation and revocation checks. Query and enforcement APIs 1908, 1911 interact with the manifest store 1921 to ensure tier integrity and deterministic behavior across devices, while monitoring APIs 1915 transmit telemetry to the monitoring subsystem 1920 for analytics and adaptive defense updates (FIG. 16, 1607). All communications are performed over mutual-TLS channels secured with post-quantum key-exchange primitives (e.g., Kyber) and authenticated using PQC-signed entitlements and manifests, as described in FIG. 17.

API responses return standardized fields—statusCode, tierLevel, epoch, signatureValid—with optional telemetry metadata. Error codes differentiate authentication failures, manifest mismatches, or network timeouts, enabling graceful recovery through local caching or fallback tiers.

7.19.3 Extensibility and Cross-Platform Support

Language bindings in C#, C++, JavaScript, and Python provide seamless interoperability across Unity, Unreal, WebGL, and other runtimes. Third-party engines can implement the same entitlement protocol via REST, WebSocket, or JSON-RPC endpoints without modifying the license-server architecture.

This design abstracts DRM logic behind a stable, cross-platform API surface, maintaining deterministic enforcement behavior while allowing engine-native extensions.

7.19.4 Operational Integration with Earlier Figures

In FIG. 1, this API layer corresponds to the interface between the runtime adapter 112 and the license/monitoring subsystems 109, 115.

In FIG. 9, its telemetry outputs map to runtime-event logging 904 and ML-based anomaly detection 908.

In FIG. 16, anomaly reports from reportAnomaly 1918 feed directly into the adaptive-response system 1607.

In FIG. 18, the listed API calls 1824-1828 represent the foundational subset of this broader interface, expanded here to include explicit authentication, query, and monitoring operations.

Collectively, the runtime-adapter APIs form a unified entitlement and enforcement protocol that links the client runtime to the DRM back-end in a secure, engine-agnostic manner. This interface standardizes how tokens are validated, how fidelity tiers are queried and applied, and how telemetry is reported, ensuring that all licensed environments uphold the same cryptographic and operational integrity.

7.19.5 API Integration Specifications

The runtime adapter 1903 implements RESTful and WebSocket interfaces with standardized request and response formats to ensure cross-platform interoperability. All API communications utilize JSON message formatting with defined structures for each interaction type.

For entitlement requests sent via HTTPS POST to/api/v1/entitlement, the message structure comprises:

- assetId 105, 1921 containing a SHA3-512 hash string;
- sessionId 1701, 1905 containing a UUID version 4 string;
- deviceId 112, 1602 containing a platform-specific identifier string;
- timestamp in ISO 8601 datetime format; and
- signature 1703 containing a PQC signature string.

The corresponding entitlement response returns:

- token 1703 in JWT format;
- tierPermitted 113, 1909 as an integer value from 0 to 5;
- validUntil as an ISO 8601 datetime;
- revocationEpoch 701, 1907 as an integer; and
- an optional sessionFingerprint 603 as a hex-encoded string.

Revocation broadcasts, transmitted via WebSocket or MQTT, contain:

- a type field set to REVOCATION EPOCH;
- an epoch integer;
- an array of affected assetIds 105, 1921;
- a downgradeToTier 113, 1912 integer; and
- a timestamp in ISO 8601 datetime format.

These broadcasts are originated by the license and entitlement server 109, 1701 and received by all active runtime adapters 112, 1903.

Telemetry events, posted via HTTPS to /api/v1/telemetry, include:

eventType as an enumerated value of VALIDATION, TIER CHANGE, ANOMALY, or FINGERPRINT, assetId as a string;

previousTier/newTier as integers;

sessionId as a string;

timestamp in ISO 8601 datetime format; and a metadata object containing event-specific data for the monitoring system 115, 1920.

HTTP status codes follow standard REST conventions: 200 for success, 401 for unauthorized access, 403 for forbidden or expired tokens, 429 for rate-limiting, and 500 for server errors. WebSocket connections utilize heartbeat messages transmitted every thirty seconds to maintain connection state. All timestamps employ the UTC time zone. Binary data for forensic-fingerprint embedding 603 or texture transmission is Base64-encoded within JSON payloads or sent as multipart/form-data for larger assets.

The SDK libraries—Unity SDK 1802, Unreal SDK 1808, and WebGL SDK 1810—provide language-specific wrappers that abstract these low-level formats while preserving protocol compatibility. The Unity C# implementation employs async/await patterns; the Unreal C++ implementation uses promise-based callbacks; and WebGL implementations utilize JavaScript Promises or async functions. Error responses include machine-readable error codes paired with human-readable messages to facilitate debugging.

The runtime adapter 1903 implements graceful degradation for common failure scenarios:

Network timeouts default to cached entitlements with automatic tier downgrade after 30 seconds of disconnection.

Invalid or expired tokens trigger immediate transition to the Preview tier while attempting token refresh 1906 in the background.

Manifest corruption or hash mismatches 1704, 1921 cause fallback to the lowest authorized tier 516 and generate anomaly reports 1918 to the monitoring system 1920.

API rate limiting employs exponential backoff starting at one second with a maximum retry delay of 30 seconds.

Critical failures that prevent tier determination 113 default to blocking access entirely rather than risking unauthorized elevation.

All failure events produce timestamped logs forwarded to the monitoring and analytics system 115, 1920 for diagnostic analysis while preserving rendering continuity through the last known valid state.

7.20 Optional Enhancement Embodiments

The following embodiments describe optional enhancements that may be added to the core license-tiered DRM system to extend its capabilities for specific use cases. These enhancements operate in conjunction with the base system described in § 7.1-7.19 and may be implemented individually or in combination.

7.20.1 Sub-Asset Digital Rights Management

In some optional embodiments, license enforcement applies not only to complete three-dimensional assets but also to individual sub-components within a composite model. For example, a composite character may include a rig, textures, materials, and accessories, each governed by separate entitlement policies. The tier-map manifest therefore incorporates a sub-asset table defining fidelity control and canonical hashes for each protected component. During runtime initialization, the adapter parses these sub-records and enforces the corresponding tier for each element while maintaining frame-level synchronization across the composite model. This structure enables modular licensing and monetization, allowing publishers to issue or revoke entitlements for specific components without repackaging the entire model. The embodiment extends the multi-resolution and patch-level protection described in earlier filings by assigning independent cryptographic entitlements to each protected patch or sub-asset. This granular control enables new monetization models where users can purchase individual character customizations, weapon skins, or environmental textures as separately licensed components while maintaining the same runtime enforcement guarantees as full-asset protection.

7.20.2 Geofenced or Location-Bound Entitlements

Entitlements may optionally include geographic or venue-specific constraints in addition to time-based revocation epochs. A runtime adapter validates the client's location—using GPS, Wi-Fi triangulation, or trusted-device attestation—before authorizing access to premium fidelity tiers.

The location proof is bound to the entitlement token via a signed geolocation assertion or cryptographic nonce issued by the license service.

For example, a retail environment or event venue may require physical presence within a designated geofence to unlock high-fidelity or branded assets, whereas users outside that region receive a lower-tier representation. This mechanism builds upon the revocation-epoch framework, integrating location verification as an additional gating parameter that supports localized promotions, compliance, and anti-piracy enforcement.

7.20.3 Multi-Party Session Licensing

In certain collaborative or multi-user environments, each participant may optionally operate under a distinct entitlement defining the fidelity level permitted for that user. The monitoring-and-analytics system coordinates concurrent sessions so that a host, instructor, or primary user may view assets at premium fidelity while other participants view corresponding lower-tier versions derived from the same manifest. A session-synchronization protocol ensures shared scene consistency across heterogeneous fidelities by aligning frame boundaries, timestamps, and object state updates. All session events are logged for auditability and billing. This optional embodiment extends the concurrent-session monitoring described in previous sections to include differentiated entitlement enforcement, supporting scalable deployment for classrooms, enterprise simulations, or multiplayer experiences where license rights vary per participant.

In certain gaming embodiments where competitive fairness is critical, the system may operate in a normalized mode where all participants in a competitive session view the same tier regardless of individual licenses. The system records these normalized viewing events separately for royalty purposes while maintaining the standard tier enforcement for non-competitive contexts. This mode is toggled by the game developer based on session type.

7.21 Alternative Implementation Embodiments

The following embodiments describe alternative implementations of the core DRM architecture. These represent different deployment models and technical approaches to achieving the license-tiered protection described herein, while maintaining compatibility with the tier-map manifest 105 and entitlement protocols 109.

7.21.1 Hardware-Assisted Enforcement

Hardware-assisted enforcement provides the highest security level by making the DRM logic cryptographically inaccessible to the host operating system and applications, preventing even kernel-level extraction attempts. In some embodiments, runtime adapters execute critical DRM functions within hardware-protected environments such as trusted-execution environments (TEEs), secure enclaves, or GPU isolation modules. Entitlement validation, manifest verification, and fidelity-tier enforcement occur entirely inside the protected context, preventing exposure of cryptographic material to untrusted memory or user-space code. Sensitive operations—including private-key use, token caching, and fingerprint embedding—are performed through hardware-restricted APIs that deny direct host access.

This embodiment extends prior hardware-acceleration concepts to provide secure enforcement, not merely computational optimization, thereby mitigating reverse-engineering, memory-dump, or replay-attack risks.

When combined with the PQC mechanisms of § 7.17, hardware-assisted enforcement delivers an additional layer of protection suitable for premium-content distribution, defense-grade simulations, or enterprise licensing environments that require both cryptographic and physical isolation.

7.21.2 Edge and Cloud-Native Deployment

In some alternative embodiments, the DRM framework operates in cloud-native or edge-distributed configurations to support large-scale entitlement issuance and low-latency runtime enforcement. Each edge node maintains a local entitlement-validation cache digitally signed by the central license authority and performs real-time fidelity-tier enforcement close to the rendering endpoint.

Periodic synchronization ensures that revocation epochs, tier policies, and threat-intelligence updates propagate consistently across all nodes. Secure communication between edge nodes and the central monitoring service is established through mutual-TLS or post-quantum key-exchange protocols such as Kyber, providing cryptographic integrity even in geographically distributed environments.

Aggregated telemetry from all nodes supplies global consistency metrics, enabling network-wide anomaly detection and coordinated policy adjustment. This architecture minimizes round-trip latency for entitlement validation, scales efficiently with user load, and provides resilient enforcement continuity across regional or offline edge deployments.

7.21.3 GPU-Pipeline or Shader-Level DRM Enforcement

In an optional configuration of the DRM framewework, hardware-assisted DRM extends into the graphics-processing pipeline itself. The runtime adapter 112 integrates with low-level rendering APIs—such as Vulkan, DirectX 12, or WebGPU—to insert DRM validation hooks within the shader-compilation or command-submission stages. These hooks verify tier-authorization tokens in-line with GPU draw-call execution, enabling fidelity enforcement and fingerprint embedding to occur entirely inside GPU-isolated memory. Because verification operates at the driver or shader-module level, cryptographic material remains inaccessible to the application layer.

This embodiment provides frame-accurate, tamper-resistant enforcement with negligible latency overhead and extends the secure-execution concepts of hardware-assisted embodiments to next-generation rendering architectures.

7.21.4 Blockchain or Distributed Ledger Anchoring

In other embodiments, tier-map manifests and provenance records are anchored to a distributed ledger to provide immutable, auditable proof of license issuance and asset history. Each entitlement event—such as license creation, renewal, or revocation—generates a digitally signed transaction containing the manifest hash, entitlement identifier, and timestamp recorded by a smart contract. The resulting ledger entry serves as a tamper-evident record that may optionally reference off-chain storage of the full manifest through a content-addressed identifier (for example, IPFS or equivalent). To optimize cost and throughput, the system may periodically aggregate individual hashes into Merkle-tree roots before anchoring them on-chain, maintaining verifiable chain-of-custody integrity while minimizing storage overhead. This integration enables independent verification of license authenticity by third-party marketplaces or auditors without requiring access to proprietary DRM infrastructure, thereby enhancing transparency and trust within the digital-asset ecosystem.

7.21.5 Metaverse and Persistent Virtual World Embodiment 7.21.5.1 Overview

In this alternative embodiment, the license-tiered digital-rights-management system (**100*a*-100*d***) is deployed within persistent virtual world environments, commonly referred to as metaverse platforms. Unlike discrete gaming sessions that have defined start and end points, persistent virtual worlds operate continuously, with users entering and exiting the environment while the world state persists. This embodiment addresses the unique technical challenges of enforcing license-based fidelity control for three-dimensional assets in always-on, multi-user, cross-platform virtual environments.

Representative metaverse platforms to which this embodiment applies include, but are not limited to: Decentraland, The Sandbox, Roblox, VRChat, Spatial, Horizon Worlds, and emerging interoperable metaverse standards such as those developed by the Metaverse Standards Forum or based on WebXR, glTF, and USD (Universal Scene Description) formats.

The core DRM architecture—comprising the packaging module 102, license service 109, runtime adapter 112, fidelity-control engine 113, and monitoring module 115—remains functionally consistent with the implementations described in §§ 7.0-7.20. The metaverse embodiment introduces context-aware extensions that modulate fidelity enforcement based on virtual world-specific parameters while maintaining compatibility with the tier-map manifest 105 and cryptographic entitlement protocols.

7.21.5.2 Metaverse-Specific Asset Types

In metaverse embodiments, the three-dimensional assets managed by the DRM system comprise one or more of the following asset categories:

Avatars: Three-dimensional character representations of users within the virtual world. Avatars may include customizable features such as facial geometry, body proportions, skin textures, clothing, accessories, and animations. The packaging module 102 generates multiple fidelity tiers for avatar assets, wherein lower tiers may display simplified geometry and generic textures, while premium tiers display high-polygon-count models with detailed facial features, custom animations, and branded clothing items.

Virtual Real Estate: Three-dimensional models representing virtual land parcels, buildings, structures, or architectural environments within the metaverse. Virtual real estate assets may be owned, leased, or visited by users. Fidelity tiers control the level of detail visible to users based on their ownership status, subscription level, or proximity to the property. For example, a property owner may view their virtual real estate at premium fidelity (100%), while visitors may see a standard fidelity representation (60%), and users outside a defined geofence may see only a preview-tier exterior (10%).

Wearable Items: Three-dimensional assets representing clothing, accessories, jewelry, footwear, or other items that can be equipped to avatars. Wearable items may represent branded merchandise from real-world fashion companies, limited-edition collectibles, or user-generated content. The DRM system enforces license-based fidelity such that only users who have purchased or been granted entitlements to specific wearable items can render them at premium fidelity. Non-licensed users may see generic placeholder items or lower-fidelity representations.

Virtual Goods: Three-dimensional objects representing functional or decorative items within the virtual world, including furniture, vehicles, tools, weapons, art installations, or interactive objects. Virtual goods may be purchased, traded, rented, or earned through in-world activities. The fidelity-control engine 113 enforces tier-based rendering such that ownership or license status determines the visual quality of virtual goods displayed to each user.

7.21.5.3 Persistent Virtual World Environment

Unlike traditional gaming applications that operate in discrete sessions (e.g., a multiplayer match with defined start and end times), persistent virtual world environments remain operational continuously. Users may enter and exit the virtual world at any time, and the world state-including asset positions, ownership records, and environmental conditions-persists between user sessions.

The runtime adapter 112, when deployed in a persistent virtual world environment, maintains continuous entitlement validation and fidelity enforcement. Unlike session-based implementations where entitlements are validated at application launch, metaverse implementations perform periodic re-validation checks (e.g., every 5-15 minutes) to detect entitlement expiration, license revocation, or subscription cancellation while the user remains within the virtual world.

When an entitlement expires or is revoked during an active user session, the fidelity-control engine 113 triggers a graceful fidelity downgrade at the next available frame boundary, transitioning the affected asset from its current tier (e.g., Premium) to the newly permitted tier (e.g., Preview or Blocked). This transition occurs without disconnecting the user from the virtual world, maintaining continuity of experience while enforcing license compliance.

7.21.5.4 Context-Aware Fidelity Enforcement

Metaverse embodiments implement context-aware fidelity enforcement wherein the permitted fidelity tier for a given asset varies dynamically based on contextual factors including, but not limited to:

User Subscription Level: The runtime adapter 112 queries the license service 109 to determine the user's current subscription tier (e.g., Free, Basic, Premium, VIP). Higher subscription tiers authorize rendering of assets at higher fidelity levels. For example, a free-tier user may render all assets at preview fidelity (10%), while a premium subscriber may render owned assets at premium fidelity (100%) and non-owned assets at standard fidelity (60%).

Virtual Location Within the Metaverse: The runtime adapter 112 determines the user's current position within the virtual world's coordinate system. Certain virtual locations may enforce fidelity restrictions based on geographic or architectural boundaries. For example, a premium concert venue within the metaverse may enforce premium-tier rendering of stage assets and performer avatars only for users who have purchased event tickets and are physically located within the venue's virtual geofence. Users outside the venue, or those without valid event tickets, may see lower-fidelity representations or be unable to render certain assets entirely.

Proximity to Other Users: The runtime adapter 112 calculates the distance between the user's avatar and other users' avatars or objects within the virtual world. Fidelity enforcement may be adjusted based on proximity to optimize bandwidth and computational resources while maintaining social presence. For example, avatars within a defined proximity radius (e.g., 10 virtual meters) are rendered at the user's entitled fidelity tier, while avatars beyond this radius are automatically downgraded to lower-fidelity representations regardless of entitlement. This proximity-based rendering reduces network bandwidth consumption and GPU load while preserving high-quality rendering for nearby social interactions.

Event Context: The runtime adapter 112 receives event metadata from the virtual world server indicating the user's participation in special events such as concerts, conferences, limited-time experiences, or restricted-access areas. Event-based entitlements may grant temporary fidelity upgrades for the duration of the event. For example, a user attending a virtual fashion show may receive a time-limited entitlement to render premium-tier wearable items displayed on the runway, even if they do not own those items. When the event concludes or the user exits the event venue, the temporary entitlement expires and the fidelity-control engine 113 reverts to the user's baseline entitlements.

These contextual parameters are communicated to the runtime adapter 112 via extended metadata fields in the entitlement structure, or through supplemental API calls to the license service 109 that include the user's current virtual world state as query parameters.

7.21.5.5 Cross-Session Entitlement Persistence

In metaverse embodiments, entitlements persist across multiple user sessions. Unlike traditional gaming where entitlements are validated at each application launch, metaverse entitlements are stored in a centralized license database accessible to all instances of the runtime adapter 112 across different client devices and platforms.

When a user logs into the metaverse from a different device (e.g., transitioning from a desktop computer to a virtual reality headset), the runtime adapter 112 queries the license service 109 to retrieve the user's current entitlements and applies the corresponding fidelity tiers without requiring re-purchase or re-authorization. This cross-device persistence ensures that users maintain consistent access to their licensed assets regardless of the hardware or platform they use to access the virtual world.

Entitlement state is synchronized in near-real-time across all active user sessions. For example, if a user purchases a premium wearable item while logged in from a desktop browser, any concurrent session on a mobile device or a virtual reality (VR) headset receives an entitlement update notification from the license service 109, and the fidelity-control engine 113 on all devices upgrades the wearable item to premium fidelity without requiring the user to log out and log back in.

This synchronization is implemented using the same revocation epoch mechanism described in § 7.4, wherein each entitlement update increments a global epoch counter broadcast to all active runtime adapter instances.

7.21.5.6 Cross-Platform Virtual World Synchronization

Emerging metaverse standards and interoperability protocols enable users to carry assets across different virtual world platforms. For example, a user may own a premium avatar that can be rendered in multiple metaverse environments (e.g., Decentraland, The Sandbox, and VRChat) using cross-platform identity and asset portability systems.

In this embodiment, the tier-map manifest 105 includes platform-agnostic canonical hash identifiers and degradation profiles that ensure consistent fidelity enforcement across heterogeneous virtual world implementations. When a user transitions their avatar from one metaverse platform to another, the runtime adapter 112 on the destination platform validates the user's entitlement against the same tier-map manifest 105 used by the origin platform.

The license service 109 maintains a cross-platform entitlement registry accessible via standardized APIs (e.g., RESTful HTTP APIs or blockchain-based decentralized identity systems). Each virtual world platform's runtime adapter 112 queries this centralized or federated registry to verify entitlements, ensuring that users do not lose access to licensed assets when transitioning between platforms.

Cross-platform synchronization may be implemented through one or more of the following mechanisms:

Centralized License Service: A cloud-based license service 109 accessible to all participating metaverse platforms via authenticated API calls, as described in § 7.9.

Blockchain-Based Entitlements: Entitlements recorded as non-fungible tokens (NFTs) or smart-contract state on a public or private blockchain, queryable by any platform's runtime adapter 112. This approach leverages the immutability and decentralization characteristics of blockchain technology to provide verifiable proof of entitlement ownership without requiring trust in a centralized authority.

Federated Identity Systems: Cross-platform user authentication via protocols such as OAuth 2.0, OpenID Connect, or decentralized identifiers (DIDs), enabling entitlement portability across federated virtual world networks. The runtime adapter 112 authenticates the user via the federated identity provider and retrieves associated entitlements from the license service 109.

7.21.5.7 Representative Use Case: Virtual Fashion Show

To illustrate the metaverse embodiment, consider a virtual fashion show hosted within a metaverse platform:

Event Setup: A fashion brand uploads premium-tier 3D models of clothing items to the packaging module 102, which generates preview, standard, and premium fidelity tiers according to the semantic degradation hierarchy described in § 7.5. The tier-map manifest 105 is cryptographically signed and distributed to the license service 109.

Ticket Purchase: Users purchase tickets to the virtual fashion show through the metaverse platform's marketplace 108. Upon purchase, the license service 109 issues time-limited entitlements (as described in § 7.10) granting premium-tier rendering of fashion show assets for the event duration.

Event Attendance: Users enter the virtual fashion show venue. The runtime adapter 112 detects the user's virtual location (inside the venue geofence) and validates their event ticket entitlement against the license service 109. The fidelity-control engine 113 upgrades runway assets and model avatars to premium fidelity (100%).

Proximity-Based Rendering: Users seated near the runway (within the proximity threshold) see premium-tier detail for both the models and other attendees' avatars. Users in the back of the venue or watching from outside see standard-tier representations (60%). This proximity-based differentiation is implemented using the distance-calculation methods described in § 7.21.5.4.

Event Expiration: When the fashion show concludes, the time-limited entitlements expire. The fidelity-control engine 113 downgrades fashion show assets to preview-tier for all users, although users who subsequently purchase the items through the in-world marketplace 108 receive permanent entitlements and continue to see premium-tier rendering.

Cross-Platform Persistence: A user who attended the event on a desktop browser later logs in via a VR headset. Their purchase history and entitlements are synchronized from the license service 109, and they can view their purchased fashion items at premium fidelity on the new platform, demonstrating the cross-device persistence described in § 7.21.5.5.

This use case demonstrates the integration of location-based, proximity-based, event-based, and time-limited entitlement mechanisms within a persistent virtual world environment.

7.21.5.8 Technical Advantages in Metaverse Embodiments

The metaverse embodiment provides several technical advantages over conventional DRM systems:

Persistent Enforcement: Unlike session-based DRM that validates entitlements only at application launch, the disclosed system continuously enforces license compliance throughout extended user sessions lasting hours or days.

Bandwidth Optimization: Proximity-based fidelity enforcement reduces network bandwidth consumption by rendering distant assets at lower fidelity, while maintaining high-quality rendering for socially relevant nearby objects.

Dynamic Monetization: Context-aware enforcement enables novel monetization models such as location-based subscriptions (premium fidelity in exclusive virtual areas), event-based temporary upgrades, and proximity-based social features (premium avatars visible only to nearby premium subscribers).

Cross-Platform Interoperability: The platform-agnostic tier-map manifest 105 and standardized entitlement APIs enable consistent DRM enforcement across fragmented metaverse platforms, supporting the emerging vision of an interoperable open metaverse.

Social Fairness: As described in § 7.21.5.4, server-enforced maximum fidelity tiers in competitive or public contexts prevent premium users from gaining unfair advantages in shared virtual spaces, maintaining equitable user experiences similar to the multiplayer fairness mechanisms described in other embodiments.

Architectural Consistency: The metaverse embodiment reuses the core packaging module 102, license service 109, runtime adapter 112, fidelity-control engine 113, and monitoring module 115 without requiring separate infrastructure, demonstrating the extensibility of the disclosed DRM architecture to emerging application domains.

7.22 Validation and Testing Embodiments

The following embodiments describe methods for validating system performance, testing robustness, and evaluating protection effectiveness under various operational conditions. In representative deployments, the system undergoes structured testing to evaluate robustness against tampering, fingerprint removal, and network or hardware constraints, with these testing protocols applicable to any implementation of the system described herein. The following table summarizes illustrative results; values are simulated or analytically estimated and are not limiting.

7.22.1 Performance and Validation Embodiment

This validation embodiment tests the system's resistance to various attack vectors and operational constraints through controlled experiments designed to verify enforcement integrity and recovery capabilities. Performance simulations of commercial mid-range hardware show average entitlement-verification latency of approximately two milliseconds per validation cycle, demonstrating that cryptographic verification and tier enforcement operate in real time without perceptible impact on rendering performance.

7.22.2 Validation and Edge Enforcement Results Table*

| Test Category | Avg Response Latency (ms) | Enforcement Success Rate (%) | Observed Tampering Attempts | Remarks |
|---|---|---|---|---|
| Entitlement penetration testing | 18 | 100 | 0 | No bypass detected |
| Fingerprint removal attempts | — | 99.7 | 3 of 500 | Recovered via redundancy |
| Offline edge validation | 9 | 100 | — | Stable local cache |
| Network replay attack simulation | 21 | 100 | 1 | Auto-revoked token |

*Values are simulated or estimated and provided solely for illustrative purposes.

Testing confirms that license enforcement and fingerprint recovery remain effective under simulated attack and offline conditions.

7.22.3 Gaming-Specific Performance Metrics

For game engine deployments, the system typically achieves:

GPU overhead: 2% to 5% typical for gaming applications

Frame rate impact: Less than 2% degradation at 60 FPS

Storage overhead: 10% to 15% for protected game assets

Entitlement validation: 2 ms average per validation cycle

These metrics ensure that license enforcement operates transparently within the performance constraints required for interactive gaming.

These evaluations verify that the described DRM architecture-when deployed with hardware-assisted or software-only configurations-meets practical latency, reliability, and resilience requirements for large-scale, distributed 3D-asset protection.

7.22.4 Penetration and Robustness Testing

The DRM framework may be subjected to structured penetration and robustness testing using controlled attack vectors designed to evaluate enforcement integrity and session isolation. Test scenarios include token-replay attempts, API-parameter injection, and runtime-memory inspection to determine whether entitlements can be reused or altered outside their issued session context.

Each test is performed under monitored conditions with packet capture, checksum verification, and integrity logging. The monitoring subsystem records anomaly frequency and assigns quantitative robustness scores based on detection latency and automatic counter-response accuracy. These data are fed back into policy-update rules that adjust rate-limiting thresholds and API-signature hardening parameters, ensuring continuous improvement across software builds.

Comparative benchmarking of successive releases establishes reproducible metrics for enforcement reliability and provides a verifiable basis for continuous security assurance of the license-tiered DRM system.

7.22.5 Forensic Fingerprint Evaluation

This validation embodiment evaluates the robustness and persistence of identifiers embedded by the forensic-fingerprinting engine 603 within protected three-dimensional assets. The fingerprints are subjected to automated removal, compression, and remeshing pipelines to verify that the embedded codes remain detectable after common transformations. Evaluation scenarios include texture recompression using JPEG or WebP formats, mesh retopology via edge-collapse optimization, and geometry decimation exceeding fifty-percent reduction of vertex count. 'For each transformation, recovery rates are computed by correlation analysis between decoded fingerprints and reference identifiers. Adversarial training datasets incorporating these transformations are periodically regenerated, enabling the embedding algorithm to retrain against new sanitization or optimization workflows encountered in the field. This continual evaluation and retraining process confirms that session-specific fingerprints remain recoverable under realistic asset-processing conditions, ensuring persistent attribution and traceability across the distribution lifecycle.

7.22.6 Adversarial Machine-Learning Resistance

This validation embodiment validates the ability of the adversarial-protection engine 802 to resist unauthorized model-training attempts and to adapt dynamically based on monitored outcomes. Protected assets are intentionally processed through unauthorized training pipelines, including generative adversarial networks (GANs) 805, diffusion models 806, and neural-radiance-field (NeRF) reconstructions. The resulting outputs are compared against unprotected baselines using quantitative metrics such as Structural Similarity Index (SSIM) loss and Frechet Inception Distance (FID) score increase.

If the observed quality degradation falls below a predefined threshold, the packaging subsystem automatically synthesizes new perturbation parameters via gradient-based adversarial optimization and stores them in the protection-profile database for use in subsequent packaging cycles. This iterative feedback process creates a self-improving defensive model that maintains measurable resistance to data-extraction and model-replication attacks while preserving imperceptible visual fidelity for licensed renderings.

7.22.7 Edge and Offline Latency Verification

This validation embodiment evaluates system responsiveness and scalability in edge and offline deployments where network connectivity or compute resources may be constrained.

Performance tests are conducted at content-delivery-network (CDN) nodes, mobile-edge servers, and offline runtime adapters to confirm that entitlement validation and fidelity enforcement operate within prescribed latency budgets. Typical benchmarks include end-to-end verification time, round-trip delay to the license-and-entitlement service, and local-cache hit ratio for short-lived tokens. Performance simulation of commercial mid-range hardware indicate a median entitlement-validation latency below two milliseconds and a ninety-fifth-percentile total enforcement latency under ten milliseconds.

These metrics demonstrate that cryptographic verification and tier enforcement can be executed in real time across distributed rendering environments, confirming that the architecture scales efficiently for large-volume, low-latency 3D-asset delivery.

7.23 Computer Program Product Embodiment

In certain embodiments, the invention is implemented as a computer-program product comprising game-executable code 1507 that integrates directly with commercial game engines 1511. The computer-program product includes three-dimensional assets organized into multiple fidelity tiers 113, where each tier corresponds to a distinct licensing level rather than a performance optimization. The runtime enforcement code 1804 operates as a middleware layer positioned between the game's asset-loading system 1806 and its rendering pipeline 1812. When a game loads a 3D asset into memory for rendering, the runtime enforcement code intercepts the asset after loading but before submission to the GPU context. At this stage, the code validates the user's entitlement 1701, 1703 through the entitlement-validation module 1805 and restricts access to the authorized fidelity tier 113 as defined in the tier-map manifest 105, 1704. This enforcement occurs independently of any LOD decisions that the underlying game engine might make based on performance metrics, camera distance, or quality settings. For example, even if the game engine's native LOD system would normally display the highest-quality model when the camera is close, the fidelity-enforcement controller 1807 ensures that only the tier authorized by the user's license is accessible, regardless of camera position or performance availability.

By integrating these enforcement routines directly into the executable runtime, the computer-program product guarantees deterministic, license-bound fidelity control consistent with the secure entitlement workflow established in FIG. 17 (Post-Quantum Cryptography Flow) and the cross-engine runtime architecture shown in FIG. 18 (SDK Runtime Adapter Architecture).

7.24 Optimization and Hybrid Embodiments

In certain embodiments, the system implements optimizations to minimize overhead while maintaining license enforcement integrity. Differential storage techniques store only the changes between tiers rather than complete duplicates. The runtime adapter may merge tier and LOD decisions into a unified pipeline, where the licensed tier sets boundaries within which performance-based LOD operates.

For competitive gaming scenarios, the system supports context-aware enforcement modes where tier differences can be temporarily normalized to ensure fair competition, while reverting to differential tiers in non-competitive contexts. The system may operate in hybrid mode where some assets use tier-based protection while others use traditional LOD, allowing developers to selectively protect high-value assets while maintaining standard performance optimization for environmental elements.

7.25 Security Considerations

The system implements defense-in-depth against common attack vectors. Memory protection prevents extraction of decrypted assets through process isolation and periodic memory scrambling of tier data between frame renders. The runtime adapter 112 validates all inputs against schema definitions to prevent injection attacks and employs rate limiting to mitigate denial-of-service attempts. Certificate pinning and mutual TLS authentication protect against man-in-the-middle attacks on entitlement validation.

SDK integrity is verified through signed checksums compared at runtime initialization and periodically during execution. Tampering detection triggers immediate tier downgrade and monitoring alerts. The forensic fingerprinting system employs cryptographic salting to prevent fingerprint correlation attacks across sessions. Time-based replay protection invalidates captured tokens after their TTL expires, while epoch-based revocation enables rapid system-wide threat response. All cryptographic operations utilize FIPS 140-2 validated libraries where available.

7.26 Scalability Architecture

The system architecture supports horizontal scaling through stateless service design and edge distribution. Entitlement validation leverages CDN edge nodes to minimize latency, with tier-map manifests cached at edge locations using content-addressed storage. The monitoring system 115 employs stream processing to handle millions of concurrent telemetry events, aggregating data through time-window batching before persistence.

Database sharding by asset identifier enables linear scaling of manifest storage, while read replicas distribute query load. WebSocket connections utilize connection pooling with sticky session routing to optimize resource usage. The revocation broadcast system implements hierarchical fan-out, where regional hubs relay epoch updates to minimize backbone traffic. Load testing demonstrates support for 100,000 concurrent runtime adapters per service instance with sub-second entitlement validation at the 99th percentile. Automatic scaling policies trigger new instance deployment when CPU utilization exceeds seventy percent or response latency exceeds defined thresholds.

7.27 Regulatory Compliance

The system addresses privacy regulations through data minimization, with forensic fingerprints implemented as pseudonymous identifiers that cannot identify individuals without separate mapping tables. Telemetry retention periods comply with GDPR (EU), CCPA (California), and other jurisdictional requirements, typically 30-90 days for operational data. User rights include data portability, erasure requests, and opt-out mechanisms for forensic fingerprinting where required. Post-quantum cryptographic components comply with export controls using internationally approved algorithms.

7.28 Note on Incorporation by Reference:

All publications, patents, patent applications, and technical standards cited in this specification-including, without limitation, the C2PA specifications, Khronos glTF standards, and NIST PQC algorithms—are incorporated herein by reference in their entirety, to the extent consistent with the present disclosure. These materials are referenced solely to illustrate compatible or interoperable implementations and do not constitute an admission that such references form part of the prior art. The cited references correspond to the technologies identified in the accompanying Information Disclosure Statement (IDS) and are included to facilitate understanding of relevant interoperability standards and algorithms.

8. USE CASE EXAMPLES

The invention can be deployed across multiple verticals and technology ecosystems to enhance digital-asset protection, provenance verification, and monetization. The following examples illustrate practical applications and integration opportunities with leading platforms and industry standards. These examples are provided for illustration and do not limit the scope of the invention.

8.1 Marketplace Distribution and Packaging Integration

The license-tiered DRM framework integrates directly into existing digital-asset marketplaces such as Epic Fab and the Unity Asset Store. During submission, the packaging module 102 automatically generates multiple fidelity tiers 104 and produces a canonical tier-map manifest 105 bound to a C2PA record 106. The manifest and provenance assertion are verified by the marketplace before publication to ensure deterministic tier metadata and verifiable authorship. When a buyer licenses an asset, the marketplace calls standardized API endpoints—such as /packageAsset, /signManifest, and /issueEntitlement—of the license-and-entitlement service 109. Entitlements derived from the same canonical manifest are issued to the purchaser and stored with the listing metadata. At runtime, the DRM adapter 112 validates the entitlement against the manifest and activates the permitted fidelity tier through the fidelity-control engine 113. Telemetry from the monitoring subsystem 115 provides automated royalty and usage reports 117, linking each entitlement event to its provenance chain. Optional ledger anchoring (see FIG. 14) produces a verifiable audit trail connecting packaging, sale, and runtime rendering.

Together, these operations unify licensing, provenance, and royalty tracking within a single authenticated DRM workflow.

8.2 Cross-Runtime and Game-Engine Enforcement

A The DRM system maintains deterministic fidelity control across heterogeneous rendering engines-including Unity, Unreal Engine, WebGL, and XR runtimes-through the shared tier-map manifest 105. Each runtime implementation employs the same SDK APIs (validateToken, getPermittedTier, enforceTier) defined in FIGS. 17-19, ensuring that identical entitlements yield identical visual outcomes regardless of engine or hardware. In multiplayer environments (FIG. 12), each participant device executes a local runtime adapter 112 that validates its entitlement with the license server 109. The fidelity-control engine 113 enforces synchronized rendering, queuing all tier transitions until frame-boundary intervals to prevent artifacts. Central game servers manage matchmaking and transmit revocation epochs via lightweight WebSocket or MQTT signals (FIG. 7), ensuring simultaneous downgrades when a license expires or is revoked. Executable-level DRM (e.g., Denuvo) may operate in parallel with asset-level enforcement (FIG. 15). A shared session nonce binds the binary authentication state to subsequent entitlement checks, preventing token reuse across unauthorized executables. Entitlement validation and telemetry collection can also occur at edge nodes (FIG. 10) to minimize latency while preserving cryptographic integrity.

8.3 AI-Safe and Brand-Protected Deployments

The same runtime DRM framework incorporates adaptive adversarial protection 107 and forensic fingerprinting 603 to deter AI-based model extraction and to protect branded content. During packaging (FIG. 5), the semantic-degradation hierarchy removes proprietary identifiers and applies deterministic down-sampling to produce preview and standard tiers. The forensic-fingerprinting engine 603 embeds error-corrected identifiers across geometry 605, UV maps 606, texture channels 607, and shader parameters 608. The adaptive-adversarial-protection engine 107 (see also FIGS. 8 and 13) injects imperceptible perturbations optimized against generative models such as GANs, diffusion pipelines, and NeRFs. Monitoring feedback 115 (see also FIG. 9) retrains perturbation profiles and updates packaging parameters through an adaptive feedback loop linking 107, 102, and 115 (see FIG. 1). In commercial deployment, the integrated DRM and adversarial-protection functions operate together.

- AI-Safe Marketplace: Marketplaces may certify "AI-Safe" assets packaged with these perturbations; runtime telemetry identifies scraping attempts and triggers adaptive counter-measures in subsequent packaging cycles.
- Retail AR Showroom: Within geofenced locations, entitlements validated by the runtime adapter activate premium fidelity tiers while the same subsystem enforces adversarial and fingerprinting protections to prevent capture or replication of high-value models.
- Enterprise and Studio Deployment: Studios issuing time-limited entitlements to contractors can synchronize automatic downgrades upon project completion and verify authenticity through recovered fingerprints and provenance logs.

These embodiments illustrate unified DRM enforcement across licensing, AI resistance, and brand protection without requiring separate infrastructures.

8.4 Dual-Layer Protection with Denuvo and Executable DRM

The invention complements binary-level DRM technologies such as Denuvo or Steam's executable protection 1510. Whereas Denuvo secures the game binary 1507 against unauthorized copying, tampering, or debugging, the present system governs the fidelity 113 and provenance 105, 1415 of three-dimensional assets once they are loaded into memory by the runtime adapter 112, 1903. For example, a title using Denuvo-protected binaries may embed the described runtime adapter to provide asset-level DRM enforcement 1807 in parallel.

Communication between Denuvo's binary loader and the runtime adapter can occur through an inter-process call or shared SDK interface 1824-1828 that exchanges a session-bound nonce 1703. This nonce binds the binary's authenticated execution state to subsequent entitlement verification 1701, 1805, thereby preventing token replay across cracked or emulated executables. Even if the protected executable is compromised, the assets referenced within remain subject to license-tier enforcement, forensic fingerprinting 603, and AI-adversarial protection 1408.

This DRM backend 1405 and executable-DRM subsystem 1414 provide publishers with end-to-end control—from the executable level down to individual 3D assets—ensuring that both code integrity 1510 and content fidelity 113 remain secure, auditable, and monetizable. It also allows vendors such as Denuvo to integrate the asset-level DRM system as a modular extension of their existing SDKs using the common runtime-adapter API layer 1903.

Performance profiling demonstrates negligible overhead (<1%) relative to standalone Denuvo operation while adding asset-level audit telemetry that records fidelity-tier transitions 113 and fingerprint-verification events 603 to the monitoring system 1920. This integration creates a unified protection continuum in which executable authentication and asset-level licensing operate cooperatively under a shared post-quantum-secured entitlement infrastructure 1701-1704.

8.5 Future Standardization and Licensing Ecosystem

The system's open API definitions—validateToken, getPermittedTier, enforceTier, and related monitoring interfaces—may be adopted as an industry specification for cross-platform licensing and provenance verification. Third-party engines, marketplaces, and provenance authorities can implement compatible adapters using the same entitlement and manifest schema. Because the APIs are runtime-agnostic and cryptographically authenticated, this framework can unify enforcement across gaming, VFX, AR/VR, and AI platforms. The same protocol supports differential pricing, session-based licensing, and verified AI-safe content distribution. Standardization under consortium governance would establish a neutral, interoperable substrate for license-tiered DRM, provenance, and adaptive protection—forming the basis for next-generation digital-asset security ecosystems.

What is claimed is:

1. A digital rights management system for three-dimensional assets, comprising:

a packaging module configured to generate a plurality of fidelity tiers from a source three-dimensional asset and to produce a tier-map manifest associating each fidelity tier with a canonical hash or other cryptographic identifier;

a license service configured to issue entitlements specifying permitted fidelity tiers and validity constraints;

a runtime adapter integrated into one or more rendering environments and configured to:

(i) validate an entitlement against the tier-map manifest to enforce a permitted fidelity tier specified in the entitlement only after the three-dimensional asset has been decrypted and is resident within a runtime memory space associated with the rendering environment, and not merely at a content streaming or file-delivery stage;

(ii) restrict rendering to the permitted fidelity tier at deterministic synchronization points within a rendering pipeline, including frame boundaries, to prevent visual artifacts during rendering transitions, wherein the fidelity tier applied at each deterministic synchronization point is established solely by the validated entitlement and the tier-map manifest and not by rendering performance metrics, performance metrics being usable, if at all, only to reduce fidelity below the entitlement-permitted tier and not to elevate fidelity above the entitlement-permitted tier;

(iii) independently override native engine-level fidelity-optimization systems of the rendering environment, including level-of-detail selection, by intercepting or constraining engine fidelity selection calls to prevent unauthorized fidelity elevation regardless of available hardware capabilities and to enforce the permitted fidelity tier specified in the validated entitlement; and a monitoring and analytics module configured to collect runtime telemetry and detect anomalous access patterns.

2. A non-transitory computer-readable medium storing instructions that, when executed by a processor, cause a computing system to:

validate an entitlement against a tier-map manifest for a three-dimensional asset only after the three-dimensional asset has been decrypted and is resident within a runtime memory space associated with a rendering environment, and not merely at a content streaming or file-delivery stage;

restrict rendering of the three-dimensional asset to a permitted fidelity tier at deterministic synchronization points within a rendering pipeline, including frame boundaries, to prevent visual artifacts during rendering transitions; and independently override native engine-level fidelity-optimization systems of the rendering environment to prevent unauthorized fidelity elevation regardless of available hardware capabilities.

3. An apparatus comprising a processor and a memory, the memory storing a runtime adapter executable by the processor, the runtime adapter configured to:

validate an entitlement against a tier-map manifest for a three-dimensional asset only after the asset has been decrypted and is resident within a runtime memory space associated with a rendering environment;

apply a permitted fidelity tier during execution at deterministic synchronization points within a rendering pipeline, including frame boundaries, to prevent visual artifacts during rendering transitions, the permitted fidelity tier being determined solely from the entitlement and the tier-map manifest; and independently override native engine-level fidelity-optimization systems of the rendering environment, including level-of-detail selection, by intercepting or constraining fidelity selection calls of the rendering environment to prevent unauthorized fidelity elevation regardless of available hardware capabilities.

4. A computer-implemented system for adaptive protection of three-dimensional assets against content extraction, the system comprising:

a packaging module configured to generate fidelity-tiered asset variants and embed adaptive protection parameters within the fidelity-tiered asset variants;

a plurality of runtime components configured to render the asset variants and transmit telemetry describing runtime access patterns;

a monitoring and analytics module configured to analyze the telemetry to identify threat patterns indicative of content extraction attempts or machine-learning training attempts on the three-dimensional assets or their fidelity-tiered variants; and an adaptive protection engine configured to generate updated protection parameters responsive to the identified threat patterns and to supply the updated protection parameters to the packaging module for embedding into subsequently packaged asset variants, wherein the monitoring and analytics module, the adaptive protection engine, and the packaging module implement a closed adaptive feedback loop that evolves asset protection in response to observed threat behavior, such that the updated protection parameters are applied to subsequently packaged asset variants while previously distributed asset variants remain unchanged.

5. The system of claim 1, further comprising an adaptive protection engine, wherein the monitoring and analytics module is configured to identify threat patterns indicative of automated content extraction or machine-learning training attempts on the three-dimensional assets or their fidelity-tiered variants, and wherein the adaptive protection engine is configured to generate adaptive protection parameters responsive to the threat patterns and to supply the adaptive protection parameters to the packaging module for embedding into one or more fidelity tiers of subsequently packaged asset variants.

6. The system of claim 4, wherein the adaptive protection parameters comprise adaptively generated perturbations embedded within the fidelity-tiered asset variants that degrade the efficacy of automated content extraction or corrupt machine-learning feature-space representations of the three-dimensional assets while remaining imperceptible during authorized rendering operations.

7. The system of claim 4, wherein the feedback loop periodically or responsively updates protection parameters based on newly identified threat patterns by generating updated protection parameters including perturbation vectors, protection profiles, asset fingerprints, or other configuration data and supplying the updated protection parameters to the packaging module for incorporation into subsequently packaged asset variants.

8. The system of claim 6, wherein the perturbations are iteratively optimized using machine-learning-based adversarial optimization techniques to impair automated analysis, extraction, or machine-learning feature-space representations while remaining perceptually acceptable to authorized users during legitimate rendering operations.

9. The system of claim 4, wherein the monitoring and analytics module classifies or characterizes evolving threat patterns, suspected target model behaviors, or inferred model architectures using statistical, pattern-based, or machine-learning analysis of runtime telemetry from distributed runtime components, wherein the analysis is specific to three-dimensional asset access patterns and suspected automated query behaviors characteristic of model training or large-scale scraping.

10. The system of claim 4, wherein the adaptive protection engine uses an analytics service operating in a cloud, edge, or client-side deployment, or other deployment configuration, to process telemetry from multiple deployments received by the monitoring and analytics module and to identify emerging extraction or analysis techniques and suspected target model characteristics for generating updated protection parameters, the updated protection parameters being supplied for embedding into subsequently packaged asset variants.

11. The system of claim 1, wherein entitlements include revocation epochs or identifiers specifying revocation times or conditions that enable synchronized fidelity adjustments across distributed runtime adapters.

12. The system of claim 1, wherein the license service supports offline validation using locally cached entitlements with time-limited validity, the locally cached entitlements being cryptographically bound to a device identity or session context.

13. The system of claim 1, wherein the packaging module embeds forensic identifiers across multiple data carriers using error-correction encoding, the forensic identifiers remaining recoverable after asset transformation or format conversion.

14. The system of claim 1, wherein assets are distributed through a marketplace validation and distribution system configured to perform pre-listing validation of an asset package, including validation of a tier-map manifest and any associated provenance record, as a condition for authorized distribution of the asset package, and to interface with the license service to issue entitlements specifying permitted fidelity tiers upon transaction completion, the system supporting one or more monetization models including per-asset purchases, downloadable content, time-limited or event-based upgrades, usage-based billing, and subscription-based access.

15. The system of claim 14, wherein an entitlement update causes a fidelity-control engine to transition the asset from a first fidelity tier to a second fidelity tier during an active session without requiring application restart.

16. The system of claim 1, wherein the runtime adapter supports multi-user sessions in which different clients render a shared asset at different fidelity tiers based on their respective entitlements, and wherein, during competitive or coordinated multi-user sessions, a server-enforced maximum fidelity tier for the shared asset applies to all clients to maintain fairness and deterministic, synchronized scene presentation.

17. The system of claim 1, further comprising: a remote rendering component comprising at least one of a cloud server, edge node, or peer device; and a local-rendering component; wherein the system implements hybrid rendering by distributing rendering of different fidelity tiers between the remote-rendering component and the local-rendering component based on one or more allocation criteria.

18. The system of claim 1, wherein the three-dimensional assets comprise metaverse objects including avatars, virtual real estate, wearable items, or virtual goods, and wherein the runtime adapter operates within a persistent virtual-world environment or other persistent virtual-environment platform and enforces fidelity tiers based on at least one of: user subscription level, virtual location within the metaverse, proximity to other users, or event context, the entitlements persisting across multiple metaverse sessions and synchronizing across different virtual-world platforms or rendering environments.

19. The system of claim 1, wherein the packaging module is further configured to generate, during packaging of the three-dimensional asset and separately from the tier-map manifest, a provenance record documenting provenance attributes of the three-dimensional asset including at least one of: authorship, creation time, or packaging integrity, the provenance record being compliant with a content provenance and authenticity standard, including the Coalition for Content Provenance and Authenticity (C2PA) standard, and the provenance record being validated as a condition for authorized distribution of the three-dimensional asset, wherein validation of the provenance record comprises cryptographic signature verification of the provenance record and evaluation of one or more assertions contained therein against distribution policy conditions.

20. The system of claim 19, wherein the runtime adapter is further configured to verify a cryptographic signature of the tier-map manifest and a cryptographic signature of the provenance record before applying a permitted fidelity tier, and wherein the system maintains, during runtime enforcement, an association between the tier-map manifest, an entitlement, and the provenance record, the association maintained via one or more cryptographic identifiers linking the tier-map manifest, the entitlement, and the provenance record, such that the runtime adapter applies the permitted fidelity tier in a manner that preserves traceability between the applied fidelity tier and the provenance record.

21. The system of claim 14, wherein the asset package is associated with a provenance record compliant with a content provenance and authenticity standard, including the Coalition for Content Provenance and Authenticity (C2PA) standard, wherein validation events, entitlement-based tier transitions, model-extraction events and attempted machine-learning training uses, and anomaly detections arising from enforcement of rights associated with the provenance record are logged to the monitoring and analytics module as records linked to the provenance record using the canonical hash or cryptographic identifier of the provenance record as a key to support auditable chain-of-custody, license compliance, billing, revenue, royalty, or usage accounting.

22. The system of claim 1, wherein, in a multi-user session, the runtime adapter permits different participants to render a shared asset at different fidelity tiers based on respective entitlements, and enforcement events arising from the differentiated entitlement application during the session, including which fidelity tiers are applied to which participants as identified by respective participant identifiers, are recorded by the monitoring and analytics module for auditability or billing.

23. The system of claim 1, wherein the tier-map manifest includes or is associated with sub-asset records for independently controllable components of a three-dimensional asset, the sub-asset records enabling separate licensing of the respective components, each sub-asset record specifying fidelity tiers or rendering parameters for the corresponding component, and the runtime adapter enforces respective fidelity controls for the independently controllable components based on the entitlement and the sub-asset records in the tier-map manifest.

24. The system of claim 1, wherein the runtime adapter is further configured to maintain consistent fidelity outcomes across different rendering platforms through deterministic tier-map interpretation, such that identical entitlements and tier-map manifests produce identical permitted fidelity tiers regardless of the underlying rendering engine or hardware configuration.

25. The system of claim 19, wherein the runtime adapter is further configured to verify a cryptographic signature of the provenance record and to extract one or more assertions from the provenance record, including one or more of a data mining assertion, a rights assertion, or other content governance assertions defined by the applicable content provenance and authenticity standard, and to restrict the permitted fidelity tier of the three-dimensional asset or use of the content item for machine-learning model training, extraction, or replication based on the content of the extracted assertions, such that the extracted assertions constitute an additional governance input alongside the tier-map manifest and the entitlement, and wherein the content of the extracted assertions may further restrict but not elevate the permitted fidelity tier beyond what the tier-map manifest and entitlement otherwise authorize.

* * * * *